(12) United States Patent
Yang et al.

(10) Patent No.: US 11,001,657 B2
(45) Date of Patent: May 11, 2021

(54) UNBRIDGED INDACENYL METALLOCENES

(71) Applicant: ExxonMobil Chemical Patents Inc., Baytown, TX (US)

(72) Inventors: Jian Yang, Houston, TX (US); Gregory J. Karahalis, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 88 days.

(21) Appl. No.: 16/153,256

(22) Filed: Oct. 5, 2018

(65) Prior Publication Data

US 2019/0119418 A1    Apr. 25, 2019

Related U.S. Application Data

(60) Provisional application No. 62/577,046, filed on Oct. 25, 2017.

(51) Int. Cl.
| | | |
|---|---|---|
| *C07F 17/00* | (2006.01) | |
| *C08F 4/6592* | (2006.01) | |
| *C08F 210/16* | (2006.01) | |
| *C08F 210/14* | (2006.01) | |
| *C08F 4/659* | (2006.01) | |

(52) U.S. Cl.
CPC ............ *C08F 210/14* (2013.01); *C07F 17/00* (2013.01); *C08F 210/16* (2013.01); *C08F 4/6592* (2013.01); *C08F 4/65912* (2013.01); *C08F 4/65916* (2013.01)

(58) Field of Classification Search
CPC ..... C07F 17/00; C08F 4/65925; C08F 210/16
See application file for complete search history.

(56) References Cited

U.S. PATENT DOCUMENTS

| | | | |
|---|---|---|---|
| 7,452,949 B2 | 11/2008 | Okumura et al. ............ 526/160 |
| 7,601,666 B2 | 10/2009 | Rix et al. ...................... 502/117 |
| 7,842,764 B2 | 11/2010 | Nifant'ev et al. ............ 526/160 |
| 8,785,575 B2 | 7/2014 | Resconi et al. ............... 526/160 |
| 8,809,563 B2 | 8/2014 | Holtcamp et al. ............... 556/22 |
| 9,266,910 B2 | 2/2016 | McCullough ............ C01F 7/00 |
| 9,458,254 B2 | 10/2016 | Canich et al. ....... C08F 4/65912 |
| 9,796,795 B2 | 10/2017 | Canich et al. |
| 9,803,037 B1 | 10/2017 | Canich et al. |
| 9,938,364 B2 | 4/2018 | Canich et al. ........ C08F 210/02 |
| 10,280,240 B2 | 5/2019 | Hagadorn et al. .... C08F 110/06 |
| 2006/0024518 A1 | 2/2006 | Kong et al. ................... 428/500 |
| 2006/0024520 A1 | 2/2006 | Kong et al. ................... 428/517 |
| 2007/0276110 A1 | 11/2007 | Michie et al. |
| 2015/0284489 A1 | 10/2015 | Nagy et al. ........... C08F 210/16 |
| 2015/0284490 A1 | 10/2015 | Nagy |
| 2015/0322184 A1 | 11/2015 | Hlavinka et al. |
| 2018/0094088 A1 | 4/2018 | Crowther et al. .... C08F 210/02 |
| 2019/0144571 A1 | 5/2019 | Yang et al. ............. C08F 10/02 |
| 2019/0161560 A1 | 5/2019 | Yang et al. ......... C08F 4/65927 |
| 2019/0263953 A1 | 8/2019 | Li et al. ................ C08F 210/16 |
| 2019/0284311 A1 | 9/2019 | Canich et al. ......... C08F 4/6592 |
| 2019/0284318 A1 | 9/2019 | Canich et al. ........ C08F 210/16 |

FOREIGN PATENT DOCUMENTS

| | | |
|---|---|---|
| WO | 2011/012245 | 2/2011 |
| WO | 2016/196331 | 12/2016 |
| WO | 2017/204830 | 11/2017 |

OTHER PUBLICATIONS

U.S. Appl. No. 62/914,209, filed Oct. 11, 2019, Yang, J. et al.
Araneda, J. F. et al. (2009) "Synthesis, Characterization of a new Carbonylated Zirconium Metallocene using a Dichloro-Zirconocene Derived from Partially Alkylated s-indacene," *Jrnl. of the Chilean Chem. Soc.*, v. 54(3), pp. 269-273.
Araneda, J. F. et al. (2015) "A New Series of Zirconium Metallocenes Derived from Partially Alkylated s-indacene with Potential Applications in the Polymerization of Ethylene," *Inorganica Chimica Acta*, v. 434, pp. 121-126.
Oehninger, L. et al. (2013) "Novel Titanocene Derived from a Partially Alkylated s-indacene: Synthesis, Characterization and Comparative Study with its Zirconium Analog," *Inorganica Chimica Acta*, v. 396, pp. 35-39.
Calhoun et al., "Molecular Characterization of Polymers," Polymer Chemistry, Chapter 5, pp. 77-102.
Kaplan et al., "Synthesis and Characterization of a Bis(imino)-N-heterocyclic Carbene Analogue to Bis(imino)pyridine Iron Complexes," Organometallics, 2012, vol. 31, pp. 7343-7350.
Manna et al., "High Molecular Weight Poly(lactic acid) Produced by an Efficient Iron Catalyst Bearing a Bis(amidinato)-N-Heterocyclic Carbene Ligand," Polyhedron, 2014, vol. 84, pp. 160-167.
Thagfi et al., "Preparation and Reactivity Study of Chromium(III), Iron(II), and Cobalt(II) Complexes of 1,3-Bis(imino)benzimidazol-2-ylidene and 1,3-Bis(imino)pyrimidin-2-ylidene," Organometallics, 2012, vol. 31 , pp. 7351-7358.
Baker et al., "Magnetic Circular Dichroisrn and Density Functional Theory Studies of Iron (II)-Pincer Complexes: Insight into Electronic Structure and Bonding Effects of Pincer N-Heterocyclic Carbene Moieties," Organometallics, 2016, vol. 35, pp. 3692-3700.
Drake, et al., "Spin Transitions in Bis(amidinato)-N-heterocyclic Carbene Iron(II) and Iron (III) Complexes," Dalton Transactions, 2015, vol. 44, pp. 16703-16707.
Kaplan et al., "Electron-donating Capabilities and Evidence for Redox Activity in Low Oxidation State Iron Complexes Bearing Bis(amidine)pyrimidylidene Ligands," Journal of Coordination Chemistry, 2016, vol. 69, Nos. 11-13, pp. 2047-2058.

*Primary Examiner* — Caixia Lu

(57) ABSTRACT

The present disclosure provides novel unbridged group 4 indacenyl-containing metallocene compounds. The catalyst system may be used for olefin polymerization processes.

30 Claims, 3 Drawing Sheets

UNBRIDGED INDACENYL METALLOCENES

PRIORITY CLAIM

This application claims priority to and the benefit of U.S. Ser. No. 62/577,046, filed Oct. 25, 2017 and is incorporated herein by reference in its entirety.

FIELD OF THE INVENTION

The present disclosure provides novel unbridged group 4 indacenyl-containing metallocene compound. The catalyst system may be used for olefin polymerization processes.

BACKGROUND OF THE INVENTION

Polyolefins are widely used commercially because of their robust physical properties. For example, various types of polyethylenes, including high density, low density, and linear low density polyethylenes, are some of the most commercially useful. Polyolefins are typically prepared with a catalyst that polymerizes olefin monomers.

Other references of interest include: US 2015/0322184, A. Calhoun, et al. Polymer Chemistry, Chapter 5, pages 77-87; US 2016/0244535; U.S. Ser. No. 15/145,320, filed May 3, 2016; WO 2011/012245, and PCT/US2016/034784.

There is a need for new and improved catalyst systems for the polymerization of olefins, in order to achieve increased activity or enhanced polymer properties, to increase conversion or comonomer incorporation, or to alter comonomer distribution. There is also a need for supported catalyst systems and processes for the polymerization of olefins (such as ethylene) using such catalyst systems to provide ethylene polymers having the unique properties of high stiffness, high toughness and good processability.

SUMMARY OF THE INVENTION

The present disclosure provides novel unbridged group 4 indacenyl-containing metallocene compounds. The novel unbridged group 4 indacenyl-containing metallocene compounds are represented by Formula (I):

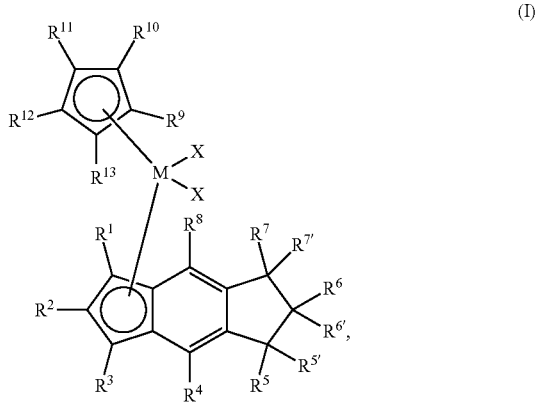

(I)

wherein:
M is a group 4 metal;
each of $R^1$, $R^2$, $R^3$, $R^4$, and $R^8$ is independently hydrogen, halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, —R$^\#$—SiR'$_3$, where $R^\#$ is $C_1$-$C_{10}$ alkyl and each R' is hydrogen, halogen, $C_1$-$C_{10}$ alkyl, or $C_6$-$C_{10}$ aryl;

each of $R^5$, $R^{5'}$, $R^6$, $R^{6'}$, $R^7$ and $R^{7'}$ is independently hydrogen, halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, —R$^\#$—SiR'$_3$, where $R^\#$ is $C_1$-$C_{10}$ alkyl and each R' is hydrogen, halogen, $C_1$-$C_{10}$ alkyl, or $C_6$-$C_{10}$ aryl;

each X is independently a leaving group, or two Xs are joined and bound to the metal atom to form a metallocycle ring, or two Xs are joined to form a chelating ligand, a diene, or an alkylidene; and each of $R^9$, $R^{10}$, $R^{11}$, $R^{12}$, and $R^{13}$ is hydrogen, halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, —R$^\#$—SiR'$_3$, where $R^\#$ is $C_1$-$C_{10}$ alkyl and each R' is hydrogen, halogen, $C_1$-$C_{10}$ alkyl, or $C_6$-$C_{10}$ aryl, or $R^9$ and $R^{10}$ or $R^{12}$ and $R^{13}$ together form a substituted or unsubstituted 5-8 membered saturated or unsaturated cyclic or polycyclic ring structure.

The present disclosure also provides a process for polymerization of monomers (such as olefin monomers) comprising contacting one or more monomers with catalyst systems comprising the above catalyst compounds.

The present disclosure also provides a process to produce ethylene polymer compositions comprising: i) contacting in a single reaction zone, in the gas phase or slurry phase, ethylene and $C_3$ to $C_{20}$ comonomer with a catalyst system comprising a support, an activator, and one or more catalyst compounds described above, and ii) obtaining an ethylene polymer composition having at least 50 mol % ethylene, preferably having a density of 0.89 g/cc or more (alternately 0.90 g/cc or more, 0.908 g/cc or more, 0.91 g/cc or more, 0.918 g/cc or more, or 0.935 g/cc or more).

The present disclosure also provides polymer compositions produced by the methods and catalyst systems described herein that preferably have a broad molecular weight distribution for easier processing while maintaining sufficient comonomer incorporation to provide good stiffness and good toughness.

DETAILED DESCRIPTION

Figure 1:
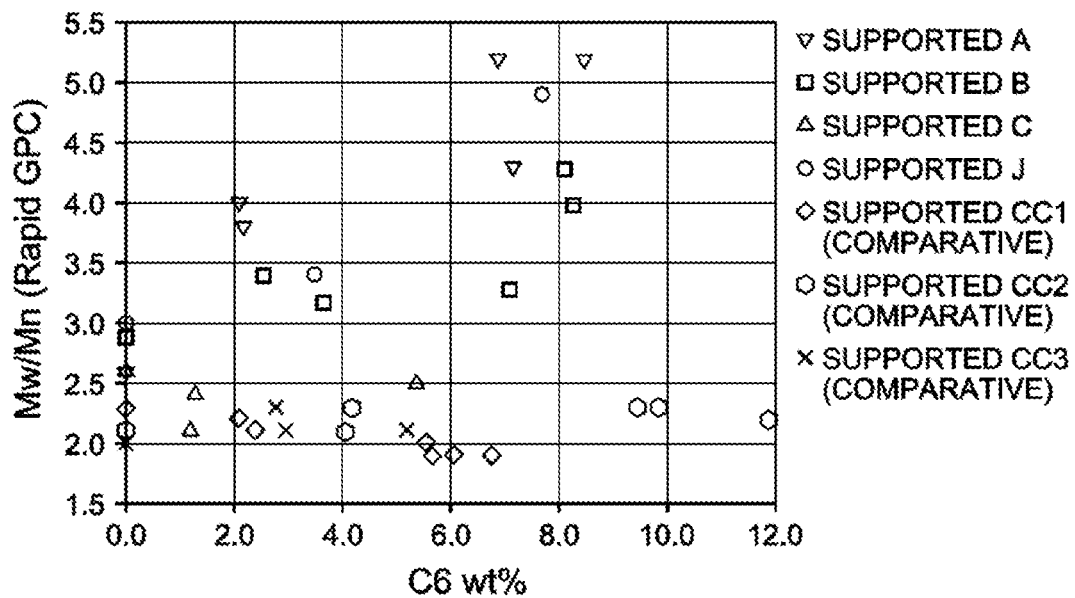
FIG. 1 is a graph comparing the polydispersity index (Mw/Mn) at various $C_6$ wt % for polymers prepared with catalysts of the present disclosure with polymers made under the same conditions prepared with comparative catalysts.

The present disclosure provides novel unbridged group 4 indacenyl-containing metallocene compounds. The catalyst systems may be used for olefin polymerization processes. Catalyst systems of the present disclosure can provide increased activity or enhanced polymer properties, to increase conversion or comonomer incorporation, or to alter comonomer distribution. Catalyst systems and processes of the present disclosure can provide ethylene polymers having the unique properties of high stiffness, high toughness and good processability.

For purposes of the present disclosure, a "catalyst system" is a combination of one or more catalyst compounds, an activator, and optional support material. The catalyst systems may further comprise one or more additional catalyst compounds. For purposes of the present disclosure, when catalyst systems are described as comprising neutral stable forms of the components, it is well understood by one of ordinary skill in the art, that the ionic form of the component is the form that reacts with the monomers to produce polymers.

The term "complex" is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization function using an activator which is believed to create a cation as a result of the removal of an anionic group, often referred to as a leaving group, from the transition metal. "Complex," as used herein, is also often referred to as "catalyst precursor," "pre-catalyst," "catalyst," "catalyst compound," "metal compound," "metal catalyst compound", "transition metal compound," or "transition metal complex." These words are used interchangeably. "Activator" and "cocatalyst" are also used interchangeably.

The terms "hydrocarbyl radical," "hydrocarbyl" and "hydrocarbyl group" are used interchangeably throughout this document. Likewise the terms "group," "radical," and "substituent" are also used interchangeably in this document. For purposes of the present disclosure, "hydrocarbyl radical" is defined to be $C_1$-$C_{100}$ radicals, that may be linear, branched, or cyclic, and when cyclic, aromatic or non-aromatic.

For purposes of the present disclosure, unless otherwise indicated, the term "substituted" means that a hydrogen group has been replaced with a heteroatom, or a heteroatom containing group. For example, substituted hydrocarbyl radicals are radicals in which at least one hydrogen atom of the hydrocarbyl radical has been substituted with at least one functional group such as Cl, Br, F, I, $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like (where $R^*$ is H or a $C_1$ to $C_{20}$ hydrocarbyl group), or where at least one heteroatom has been inserted within a hydrocarbyl ring.

The term "ring atom" means an atom that is part of a cyclic ring structure. By this definition, a benzyl group has six ring atoms and tetrahydrofuran has 5 ring atoms.

A "ring carbon atom" is a carbon atom that is part of a cyclic ring structure. By this definition, a benzyl group has six ring carbon atoms and para-methylstyrene also has six ring carbon atoms.

The term "aryl" or "aryl group" means a six carbon aromatic ring and the substituted variants thereof, including but not limited to, phenyl, 2-methyl-phenyl, xylyl, 4-bromo-xylyl.

Likewise, heteroaryl means an aryl group where a ring carbon atom (or two or three ring carbon atoms) has been replaced with a heteroatom, preferably N, O, or S.

A "heterocyclic ring" is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

As used herein the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

The term "continuous" means a system that operates without interruption or cessation. For example, a continuous process to produce a polymer would be one where the reactants are continually introduced into one or more reactors and polymer product is continually withdrawn.

As used herein, the numbering scheme for the Periodic Table groups is the new notation as set out in Chemical and Engineering News, 63(5), 27, (1985).

An "olefin," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. "Different" is used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For purposes of the present disclosure, an ethylene polymer having a density of 0.86 g/cm³ or less is referred to as an ethylene elastomer or elastomer; an ethylene polymer having a density of more than 0.86 to less than 0.910 g/cm³ is referred to as an ethylene plastomer or plastomer; an ethylene polymer having a density of 0.910 to 0.940 g/cm³ is referred to as a low density polyethylene; and an ethylene polymer having a density of more than 0.940 g/cm³ is referred to as a high density polyethylene (HDPE). Density is determined according to ASTM D 1505 using a density-gradient column on a compression-molded specimen that has been slowly cooled to room temperature (i.e., over a period of 10 minutes or more) and allowed to age for a sufficient time that the density is constant within +/−0.001 g/cm³).

Polyethylene in an overlapping density range, i.e., 0.890 to 0.930 g/cm³, typically from 0.915 to 0.930 g/cm³, which is linear and does not contain long chain branching is referred to as "linear low density polyethylene" (LLDPE) and has been produced with conventional Ziegler-Natta catalysts, vanadium catalysts, or with metallocene catalysts in gas phase reactors and/or in slurry reactors and/or in solution reactors. "Linear" means that the polyethylene has no long chain branches, typically referred to as a branching index ($g'_{vis}$) of 0.97 or above, preferably 0.98 or above. Branching index, $g'_{vis}$, is measured by GPC-4D as described below.

For purposes of the present disclosure, ethylene shall be considered an α-olefin.

As used herein, $M_n$ is number average molecular weight, $M_w$ is weight average molecular weight, and $M_z$ is z average molecular weight, wt % is weight percent, and mol % is mole percent. Unless otherwise noted, all molecular weights (e.g., Mw, Mn, Mz) are reported in units of g/mol. Molecular weight distribution (MWD), also referred to as polydispersity index (PDI), is defined to be Mw divided by Mn.

Unless otherwise indicated, room temperature is approx. 23° C.

The following abbreviations may be used herein: Me is methyl, Et is ethyl, t-Bu and $^tBu$ are tertiary butyl, iPr and $^iPr$ are isopropyl, Cy is cyclohexyl, THF (also referred to as thf) is tetrahydrofuran, Bn is benzyl, Ph is phenyl, Cp is cyclopentadienyl, Cp* is pentamethyl cyclopentadienyl, Ind is indenyl, Flu is fluorenyl, and MAO is methylalumoxane.

The present disclosure provides novel bridged group 4 metallocene compounds represented by Formula (I):

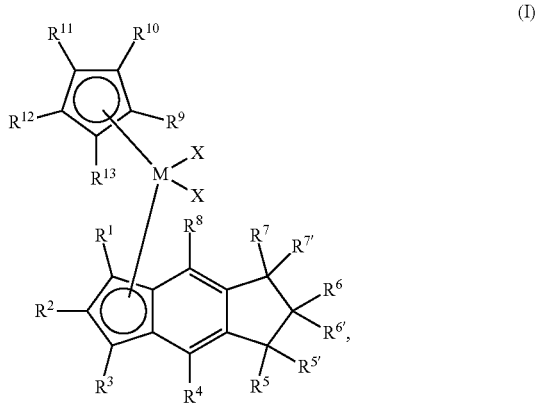

wherein:
M is a group 4 metal, preferably HF, Zr or Ti, preferably Hf or Zr;
each of $R^1$, $R^2$, $R^3$, $R^4$, and $R^8$ is independently hydrogen, halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, —R$^\#$—SiR'$_3$, where R$^\#$ is $C_1$-$C_{10}$ alkyl and each R' is hydrogen, halogen, $C_1$-$C_{10}$ alkyl, or $C_6$-$C_{10}$ aryl;
each of $R^5$, $R^{5'}$, $R^6$, $R^{6'}$, $R^7$, and $R^{7'}$ is independently hydrogen, halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, —R$^\#$—SiR'$_3$, where R$^\#$ is $C_1$-$C_{10}$ alkyl and each R' is hydrogen, halogen, $C_1$-$C_{10}$ alkyl, or $C_6$-$C_{10}$ aryl;
each X is independently a leaving group, or two Xs are joined and bound to the metal atom to form a metallocycle ring, or two Xs are joined to form a chelating ligand, a diene, or an alkylidene; and
each of $R^9$, $R^{10}$, $R^{11}$, $R^{12}$, and $R^{13}$ is hydrogen, halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, —R$^\#$—SiR'$_3$, where R$^\#$ is $C_1$-$C_{10}$ alkyl and each R' is hydrogen, halogen, $C_1$-$C_{10}$ alkyl, or $C_6$-$C_{10}$ aryl, or $R^9$ and $R^{10}$ or $R^{12}$ and $R^{13}$ together form a substituted or unsubstituted 5-8 membered saturated or unsaturated cyclic or polycyclic ring structure.

Useful embodiments of the metallocene compound of Formula (I) are represented by Formula (II):

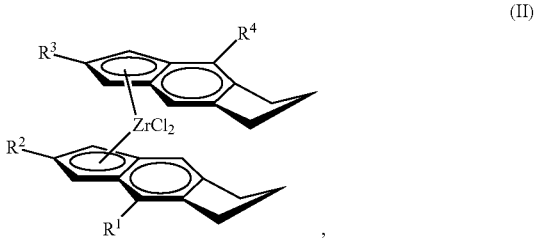

wherein:
each of $R^1$, $R^2$, $R^3$, and $R^4$ is independently halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, —R$^\#$—SiR'$_3$, where R$^\#$ is $C_1$-$C_{10}$ alkyl and each R' is hydrogen, halogen, $C_1$-$C_{10}$ alkyl, or $C_6$-$C_{10}$ aryl. Optionally, $R^2$ and $R^3$ can be hydrogen, one of the $R^1$ and $R^4$ can be hydrogen, or $R^2$, $R^3$ and at least one of $R^1$ and $R^4$ are hydrogen.

The present disclosure further provides a process for polymerization of olefin monomers comprises contacting one or more monomers with catalyst systems comprising activator, one or more catalyst compounds represented by the Formula I and a support.

The present disclosure provides a process to produce ethylene polymer compositions comprising: contacting in a single reaction zone, in the gas phase or slurry phase, ethylene and $C_3$ to $C_{20}$ comonomer with a catalyst system comprising a support, an activator, and one or more catalyst compounds described above, and obtaining an olefin polymer (such as ethylene homo- or co-polymer).

The Novel Unbridged Indacenyl-Containing Metallocenes

The novel catalyst compounds of the present disclosure are represented by Formula (I):

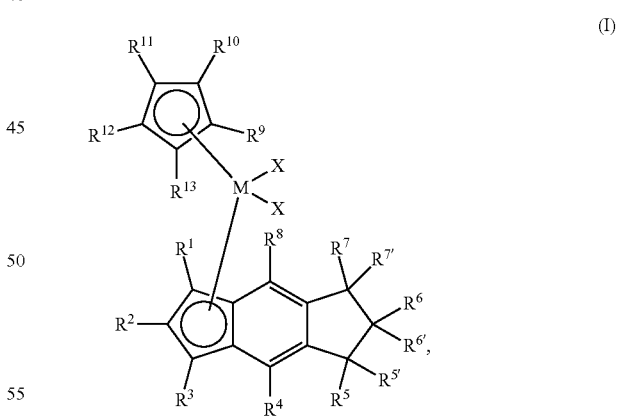

wherein:
M is a group 4 metal, preferably Hf or Zr;
each of $R^1$, $R^2$, $R^3$, $R^4$, and $R^8$ is independently hydrogen, halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, —R$^\#$— SiR'$_3$, where R$^\#$ is $C_1$-$C_{10}$ alkyl (preferably $C_1$ to $C_{10}$ alpha olefin, preferably, methyl, ethyl, propyl, butyl, pentyl, hexyl, heptyl, octyl, nonyl, decyl, or an isomer thereof) and each R' is hydrogen, halogen, $C_1$-$C_{10}$ alkyl, or $C_6$-$C_{10}$ aryl (preferably each of $R^1$, $R^2$, $R^3$, $R^4$, and $R^8$ is independently is H, or a $C_1$ to $C_{40}$ alpha olefin, preferably, $C_2$ to $C_{20}$ alpha olefin, preferably, $C_2$ to $C_{12}$ alpha olefin, preferably, methyl, ethyl, propyl, butyl, pentyl, hexyl, heptyl, octyl, nonyl, decyl, undecyl, dodecyl or an isomer thereof);

each of $R^5$, $R^{5'}$, $R^6$, $R^{6'}$, $R^7$, and $R^{7'}$ is independently hydrogen, halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, —R$^\#$—SiR'$_3$, where R$^\#$ is $C_1$-$C_{10}$ alkyl (preferably $C_1$ to $C_{10}$ alpha olefin, preferably, methyl, ethyl, propyl, butyl, pentyl, hexyl, heptyl, octyl, nonyl, decyl, or an isomer thereof), each R' is hydrogen, halogen, $C_1$-$C_{10}$ alkyl, or $C_6$-$C_{10}$ aryl (preferably each of $R^5$, $R^{5'}$, $R^6$, $R^{6'}$, $R^7$, and $R^{7'}$ is independently is H, or a $C_1$ to $C_{40}$ alpha olefin, preferably, $C_2$ to $C_{20}$ alpha olefin, preferably, $C_2$ to $C_{12}$ alpha olefin, preferably, methyl, ethyl, propyl, butyl, pentyl, hexyl, heptyl, octyl, nonyl, decyl, undecyl, dodecyl or an isomer thereof);

each X is independently a leaving group, or two Xs are joined and bound to the metal atom to form a metallocycle ring, or two Xs are joined to form a chelating ligand, a diene, or an alkylidene (preferably each X is independently a halide, such as Cl or Br, or a $C_1$ to $C_{40}$ alpha olefin, preferably, $C_2$ to $C_{20}$ alpha olefin, preferably, $C_2$ to $C_{12}$ alpha olefin, preferably, methyl, ethyl, propyl, butyl, pentyl, hexyl, heptyl, octyl, nonyl, decyl, undecyl, dodecyl or an isomer thereof); and each of $R^9$, $R^{10}$, $R^{11}$, $R^{12}$, and $R^{13}$ is independently hydrogen, halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, —R$^\#$—SiR'$_3$, where R$^\#$ is $C_1$-$C_{10}$ alkyl (preferably $C_1$ to $C_{10}$ alpha olefin, preferably, methyl, ethyl, propyl, butyl, pentyl, hexyl, heptyl, octyl, nonyl, decyl, or an isomer thereof) each R' is hydrogen, halogen, $C_1$-$C_{10}$ alkyl, or $C_6$-$C_{10}$ aryl (alternately each of $R^9$, $R^{10}$, $R^{11}$, $R^{12}$, and $R^{13}$ is independently H, $C_6$-$C_{10}$ aryl, or a $C_1$ to $C_{40}$ alpha olefin, alternately, $C_6$-$C_{10}$ aryl, $C_2$ to $C_{20}$ alpha olefin, alternately, $C_6$-$C_{10}$ aryl or $C_2$ to $C_{12}$ alpha olefin, alternately, phenyl, naphthyl, methyl, ethyl, propyl, butyl, pentyl, hexyl, heptyl, octyl, nonyl, decyl, undecyl, dodecyl or an isomer thereof), or $R^9$ and $R^{10}$ or $R^{12}$ and $R^{13}$ together form a substituted or unsubstituted 5-8 membered saturated or unsaturated cyclic or polycyclic ring structure, such as structures represented by the formula:

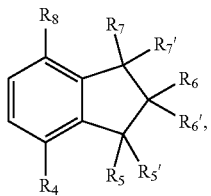

where $R^4$, $R^8$, $R^5$, $R^{5'}$, $R^6$, $R^{6'}$, $R^7$, and $R^{7'}$ are as defined above.

In embodiments, M is a group 4 metal (such as Zr or Hf); each of $R^1$, $R^2$, $R^3$, $R^4$, and $R^5$ is independently hydrogen, halogen, $C_1$-$C_{20}$ substituted or unsubstituted hydrocarbyl, halocarbyl or silylcarbyl; each of $R^5$, $R^{5'}$, $R^6$, $R^{6'}$, $R^7$, and $R^{7'}$ is independently hydrogen or a $C_1$-$C_{10}$ alkyl; each X is independently a leaving group, or two Xs are joined and bound to the metal atom to form a metallocycle ring, or two Xs are joined to form a chelating ligand, a diene, or an alkylidene; and each of $R^9$, $R^{10}$, $R^{11}$, $R^{12}$, and $R^{13}$ is hydrogen or $C_1$-$C_{20}$ substituted or unsubstituted hydrocarbyl, or $R^9$ and $R^{10}$ or $R^{12}$ and $R^{13}$ together form a substituted or unsubstituted 5-8 membered saturated or unsaturated cyclic or polycyclic ring structure.

Preferably, $R^2$ is hydrogen or a $C_1$ to $C_{12}$ alkyl group, such as methyl, ethyl, propyl, butyl, pentyl, hexyl, heptyl, octyl, nonyl, decyl, undecyl, dodecyl or an isomer thereof.

In embodiments, $R^9$ and $R^{10}$ together form an unsaturated cyclic ring structure. Alternatively, the unsaturated cyclic ring may be substituted with bromo or phenyl which may be substituted or unsubstituted.

In embodiments, each of $R^5$, $R^{5'}$, $R^6$, $R^{6'}$, $R^7$, and $R^{7'}$ is independently is H, or methyl, ethyl, propyl, butyl, pentyl, hexyl, heptyl, octyl, nonyl, decyl, undecyl, dodecyl or an isomer thereof).

In preferred embodiments, each of $R^5$, $R^{5'}$, $R^6$, $R^{6'}$, $R^7$, and $R^{7'}$ is H, alternately $R^5$, $R^{5'}$, $R^7$, and $R^{7'}$ are H, and $R^6$ and $R^{6'}$ are independently, methyl, ethyl, propyl, butyl, pentyl, hexyl, heptyl, octyl, nonyl, decyl, undecyl, dodecyl or an isomer thereof.

Alternatively, $R^{12}$ is $C_1$-$C_{20}$ unsubstituted hydrocarbyl, preferably butyl.

Alternatively, each X may be, independently, a halide, a hydride, an alkyl group, an alkenyl group or an arylalkyl group.

Alternatively, $R^4$ is —R$^\#$—SiR'$_3$, where R$^\#$ is $C_1$-$C_{10}$ alkyl (preferably, $C_1$ to $C_{10}$ alpha olefin, preferably, methyl, ethyl, propyl, butyl, pentyl, hexyl, heptyl, octyl, nonyl, decyl, or an isomer thereof) and R' is, halogen, $C_1$-$C_{10}$ alkyl or $C_6$-$C_{10}$ aryl, preferably, methyl, ethyl, propyl, butyl, pentyl, hexyl, heptyl, octyl, nonyl, decyl, phenyl or an isomer thereof), preferably $R^4$ is CH$_2$SiMe$_3$.

Alternatively, $R^{12}$ is —R$^\#$—SiR'$_3$, where R$^\#$ is $C_1$-$C_{10}$ alkyl (preferably, $C_1$ to $C_{10}$ alpha olefin, preferably, methyl, ethyl, propyl, butyl, pentyl, hexyl, heptyl, octyl, nonyl, decyl, or an isomer thereof) and R' is, halogen, $C_1$-$C_{10}$ alkyl or $C_6$-$C_{10}$ aryl, preferably, methyl, ethyl, propyl, butyl, pentyl, hexyl, heptyl, octyl, nonyl, decyl, phenyl or an isomer thereof), preferably $R^{12}$ is CH$_2$SiMe$_3$.

Alternatively, each X is independently selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof, (two Xs may form a part of a fused ring or a ring system), preferably each X is independently selected from halides, aryls and $C_1$ to $C_5$ alkyl groups, preferably each X is a phenyl, methyl, ethyl, propyl, butyl, pentyl, bromo, or chloro group.

In a preferred embodiment of Formula I:
M is a group 4 metal;
each of $R^1$, $R^2$, $R^3$, $R^4$, and $R^8$ is independently hydrogen, halogen, $C_1$-$C_{20}$ substituted or unsubstituted hydrocarbyl, halocarbyl or silylcarbyl;
each of $R^5$, $R^{5'}$, $R^6$, $R^{6'}$, $R^7$, and $R^{7'}$ is independently hydrogen or a $C_1$-$C_{10}$ alkyl;
each X is independently a leaving group, or two Xs are joined and bound to the metal atom to form a metallocycle ring, or two Xs are joined to form a chelating ligand, a diene, or an alkylidene; and
each of $R^9$, $R^{10}$, $R^{11}$, $R^{12}$, and $R^{13}$ is hydrogen or $C_1$-$C_{20}$ substituted or unsubstituted hydrocarbyl, or $R^9$ and $R^{10}$ or $R^{12}$ and $R^{13}$ together form a substituted or unsubstituted 5-8 membered saturated or unsaturated cyclic ring.

In embodiments of Formula I, $R^9$ and $R^{10}$ together form an unsaturated cyclic ring structure, preferably the unsaturated cyclic ring is substituted with bromo or phenyl which may be substituted or unsubstituted.

In embodiments of Formula I, $R^4$ is selected from aryl, alkyl, bromo, chloro, or fluoro.

In embodiments of Formula I, $R^{12}$ is $C_1$-$C_{20}$ unsubstituted hydrocarbyl, preferably $R^{12}$ is butyl.

In embodiments of Formula I, $R^2$ is $C_1$-$C_{20}$ unsubstituted hydrocarbyl, preferably $R^2$ is methyl.

In embodiments of Formula I, $R^2$ is hydrogen.

Useful asymmetric catalysts are preferably such that a mirror plane cannot be drawn through the metal center and the cyclopentadienyl moieties bridged to the metal center are structurally different.

Catalyst compounds useful herein are represented by one or more of:

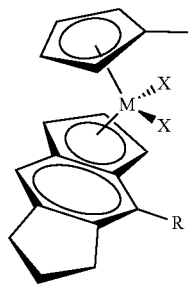

M = Zr or Hf
R = Cl, Br, Me, nPr, Ph or Cyclopropyl
X = Cl, Br or Me

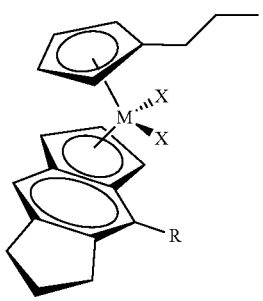

M = Zr or Hf
R = Cl, Br, Me, nPr, Ph or Cyclopropyl
X = Cl, Br or Me

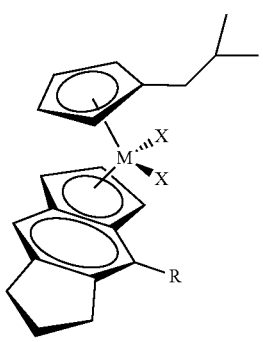

M = Zr or Hf
R = Cl, Br, Me, nPr, Ph or Cyclopropyl
X = Cl, Br or Me

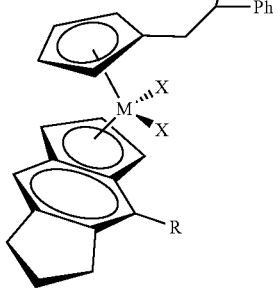

M = Zr or Hf
R = Cl, Br, Me, nPr, Ph or Cyclopropyl
X = Cl, Br or Me

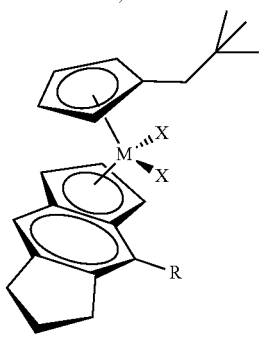

M = Zr or Hf
R = Cl, Br, Me, nPr, Ph or Cyclopropyl
X = Cl, Br or Me

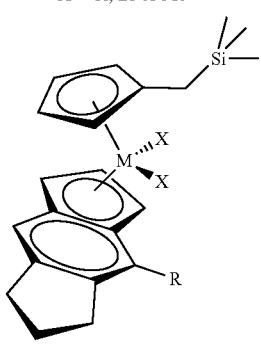

M = Zr or Hf
R = Cl, Br, Me, nPr, Ph or Cyclopropyl
X = Cl, Br or Me

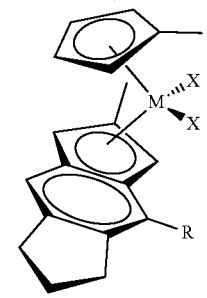

M = Zr or Hf
R = Cl, Br, Me, nPr, Ph or Cyclopropyl
X = Cl, Br or Me

-continued

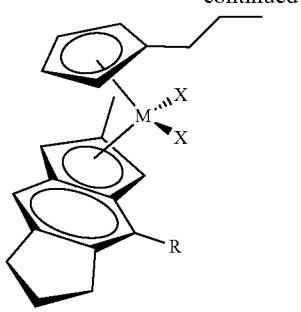

M = Zr or Hf
R = Cl, Br, Me, nPr, Ph or
Cyclopropyl
X = Cl, Br or Me

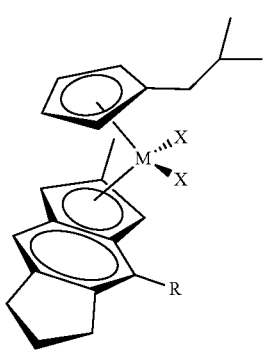

M = Zr or Hf
R = Cl, Br, Me, nPr, Ph or
Cyclopropyl
X = Cl, Br or Me

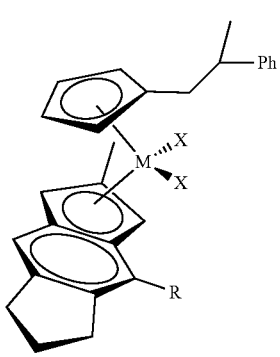

M = Zr or Hf
R = Cl, Br, Me, nPr, Ph or
Cyclopropyl
X = Cl, Br or Me

-continued

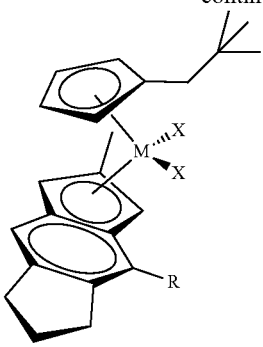

M = Zr or Hf
R = Cl, Br, Me, nPr, Ph or
Cyclopropyl
X = Cl, Br or Me

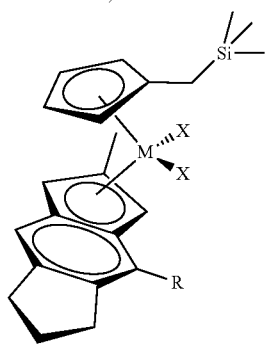

M = Zr or Hf
R = Cl, Br, Me, nPr, Ph or
Cyclopropyl
X = Cl, Br or Me

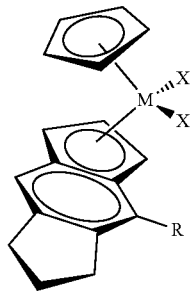

M = Zr or Hf
R = Cl, Br, Me, nPr, Ph or
Cyclopropyl
X = Cl, Br or Me

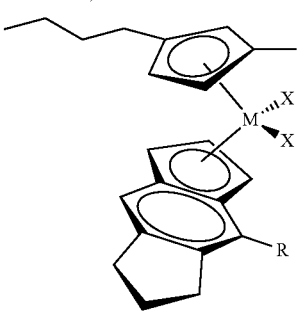

M = Zr or Hf
R = Cl, Br, Me, nPr, Ph or
Cyclopropyl
X = Cl, Br or Me

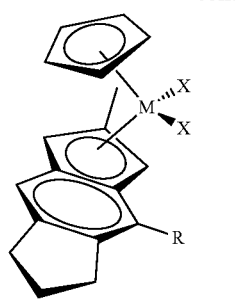
M = Zr or Hf
R = Cl, Br, Me, nPr, Ph or Cyclopropyl
X = Cl, Br or Me
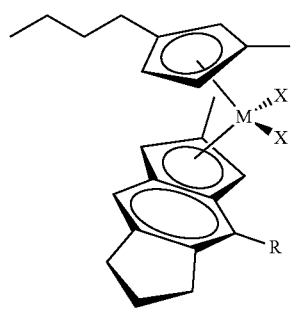
M = Zr or Hf
R = Cl, Br, Me, nPr, Ph or Cyclopropyl
X = Cl, Br or Me
Catalyst compounds useful herein are represented by one or more of:
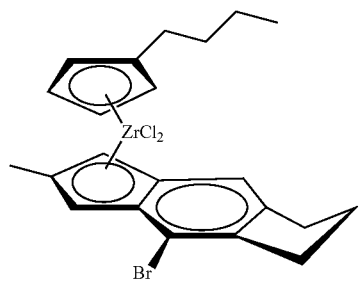
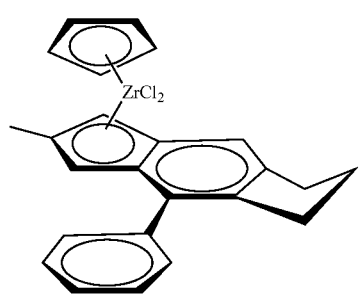
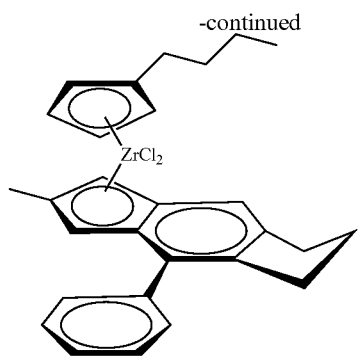
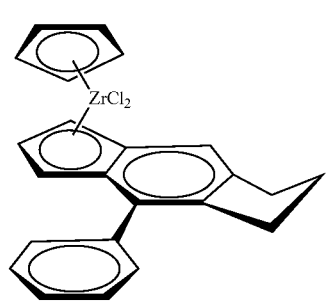
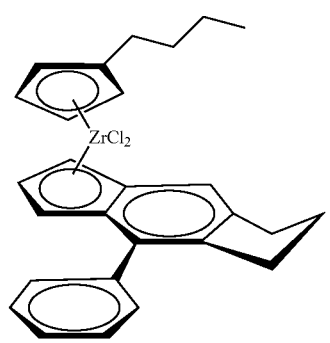
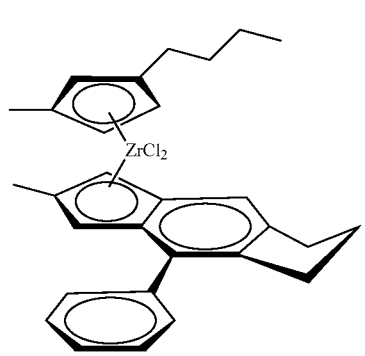
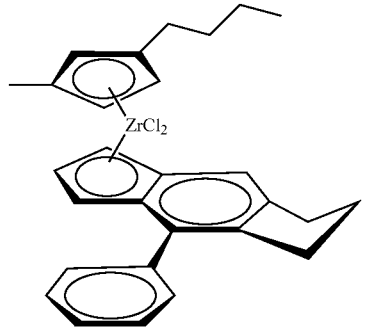

-continued
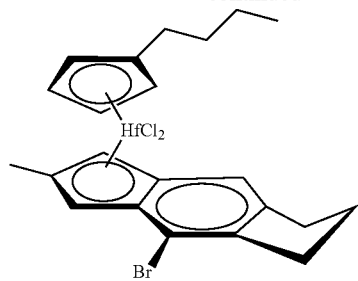
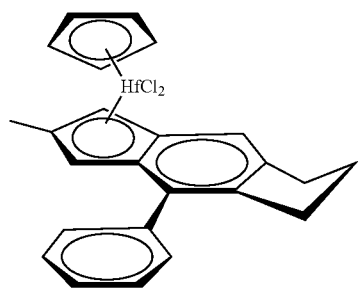
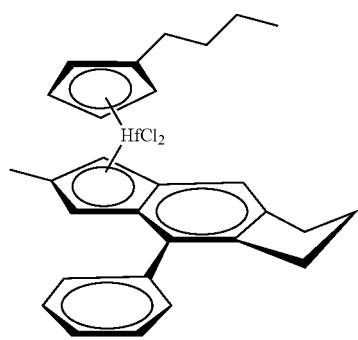
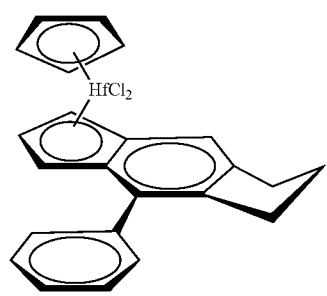
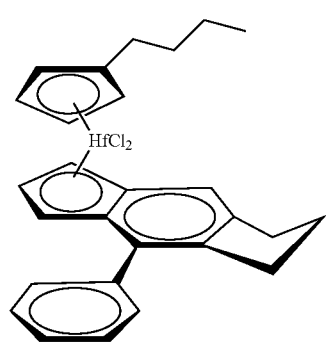
-continued
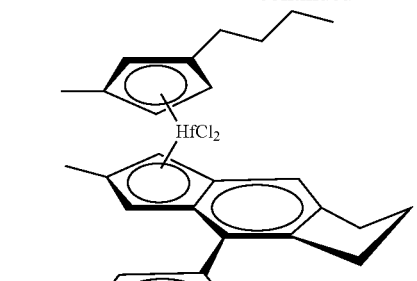
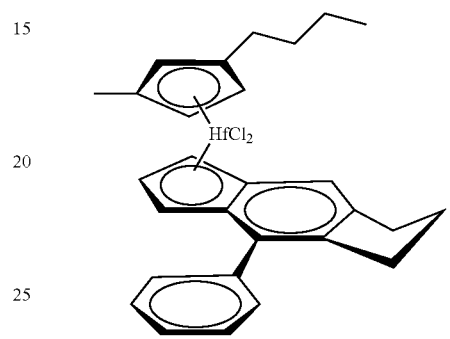
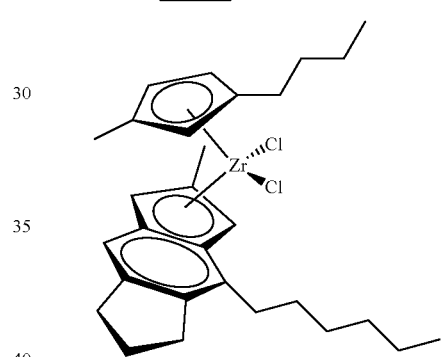
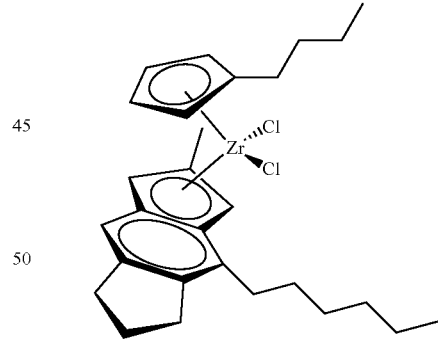
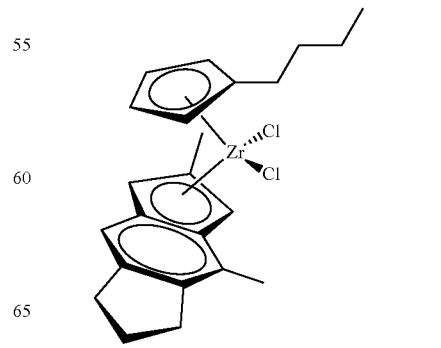

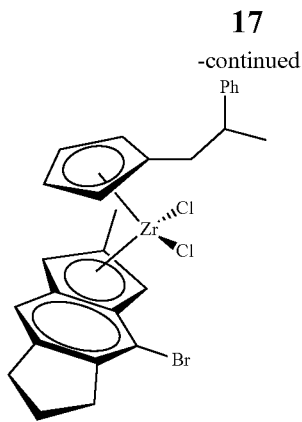
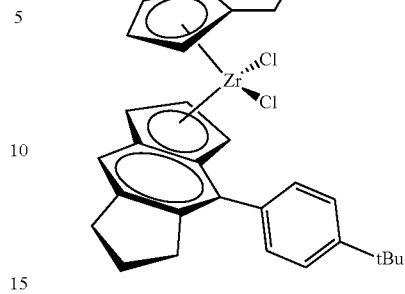
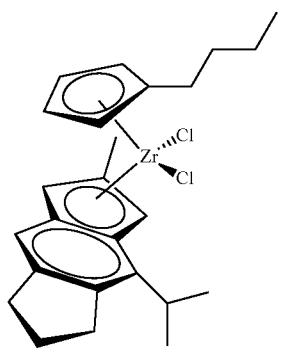
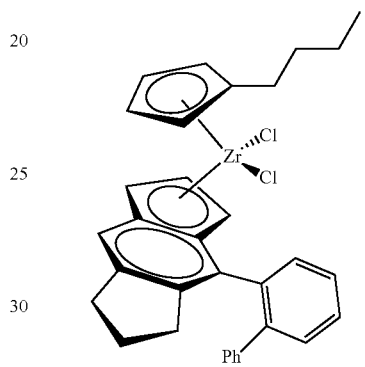
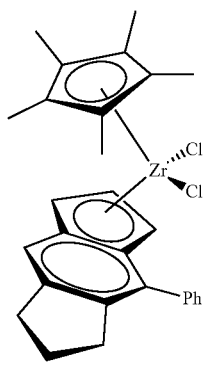
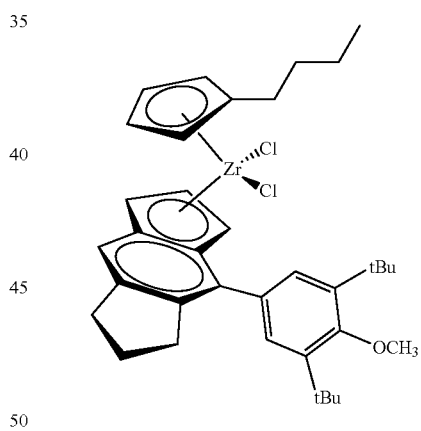
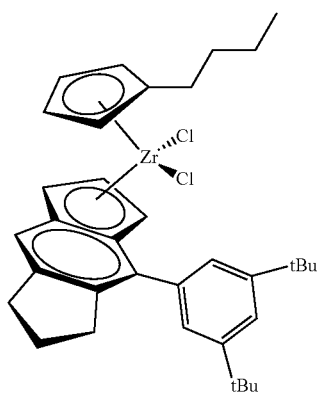
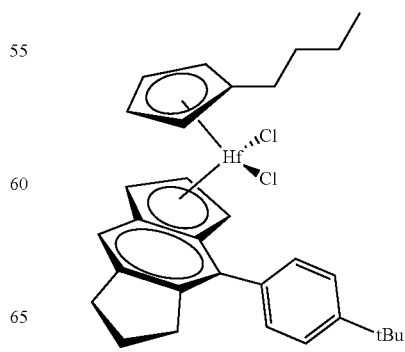

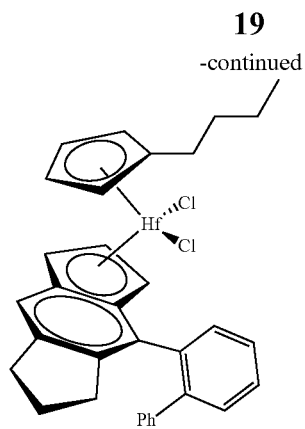
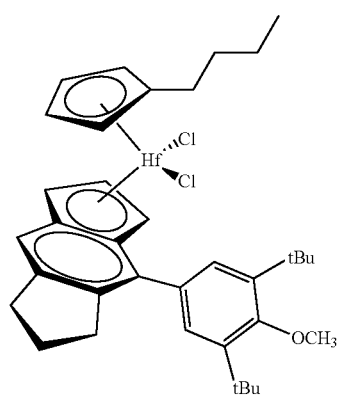
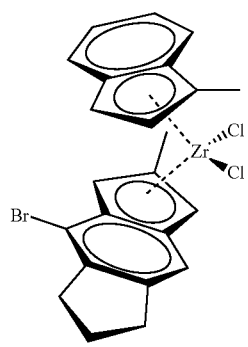
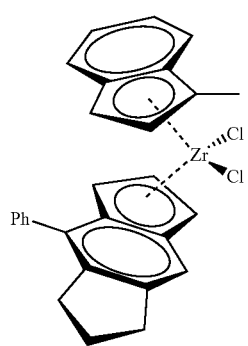
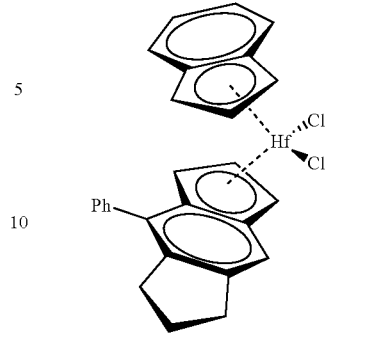
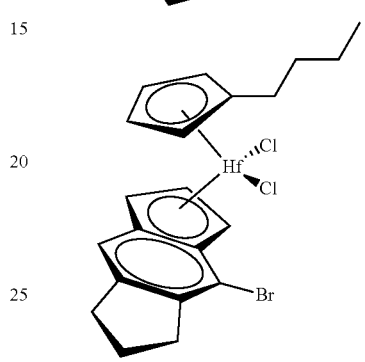
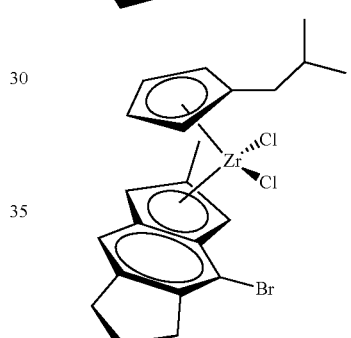
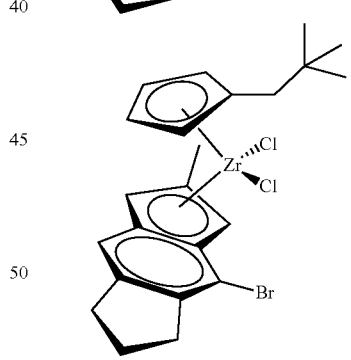
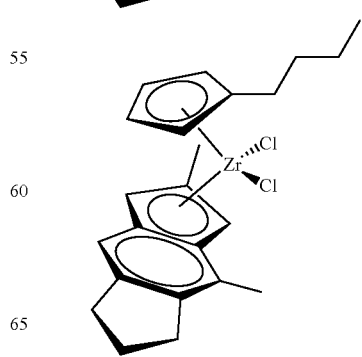

-continued

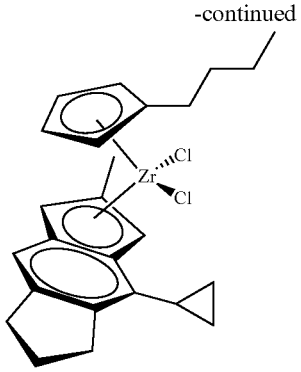

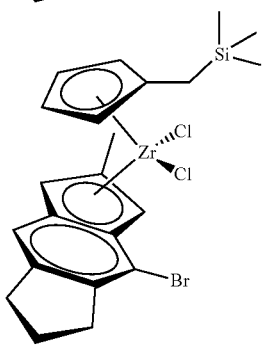

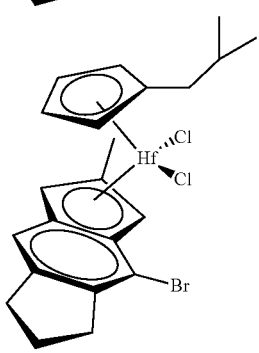

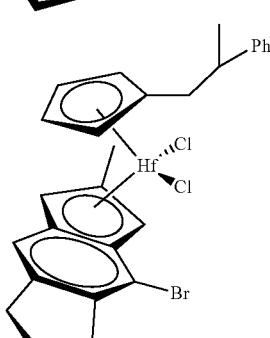

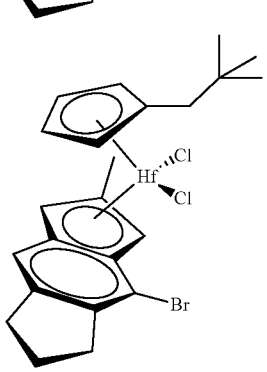

Preferred catalyst compounds useful herein are represented by Formula (II):

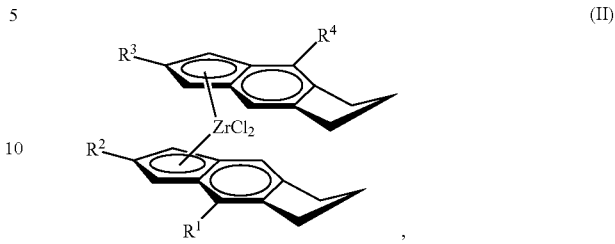

(II)

wherein:
each of $R^1$, $R^2$, $R^3$, and $R^4$ is independently halogen, $C_1$-$C_{40}$ hydrocarbyl or $C_1$-$C_{40}$ substituted hydrocarbyl, —$NR'_2$, —SR', —OR, —$OSiR'_3$, —$PR'_2$, where each R' is hydrogen, halogen, $C_1$-$C_{10}$ alkyl, or $C_6$-$C_{10}$ aryl (preferably each of $R^1$, $R^2$, $R^3$, and $R^4$, is independently H, $C_6$-$C_{10}$ aryl, or a $C_1$ to $C_{40}$ alpha olefin, preferably, $C_6$-$C_{10}$ aryl, or $C_2$ to $C_{20}$ alpha olefin, preferably, $C_6$-$C_{10}$ aryl, or $C_2$ to $C_{12}$ alpha olefin, preferably, phenyl, naphthyl, methyl, ethyl, propyl, butyl, pentyl, hexyl, heptyl, octyl, nonyl, decyl, undecyl, dodecyl or an isomer thereof).

Optionally, $R^2$ and $R^3$ can be hydrogen, one of the $R^1$ and $R^4$ can be hydrogen, or $R^2$, $R^3$ and at least one of $R^1$ and $R^4$ are hydrogen.

In embodiments of Formula II, $R^1$ is substituted or unsubstituted aryl or halogen, such as substituted or unsubstituted phenyl, chloro, idodo, or bromo.

In embodiments of Formula II, $R^4$ is substituted or unsubstituted aryl or halogen, such as substituted or unsubstituted phenyl, chloro, idodo, or bromo.

In embodiments of Formula II, $R^1$ and $R^4$ are, independently, substituted or unsubstituted aryl or halogen, such as substituted or unsubstituted phenyl, chloro, idodo or bromo.

In embodiments of Formula II, $R^2$ is H, phenyl, naphthyl, methyl, ethyl, propyl, butyl, pentyl, hexyl, heptyl, octyl, nonyl, decyl, undecyl, dodecyl or an isomer thereof.

In embodiments of Formula II, $R^3$ is H, phenyl, naphthyl, methyl, ethyl, propyl, butyl, pentyl, hexyl, heptyl, octyl, nonyl, decyl, undecyl, dodecyl or an isomer thereof.

In embodiments of Formula II, $R^2$ and $R^3$ are, independently, H, phenyl, naphthyl, methyl, ethyl, propyl, butyl, pentyl, hexyl, heptyl, octyl, nonyl, decyl, undecyl, dodecyl or an isomer thereof.

In embodiments of Formula II, $R^1$ and $R^4$ are, independently, substituted or unsubstituted aryl or halogen, such as substituted or unsubstituted phenyl, chloro, idodo, or bromo, and $R^2$ and $R^3$ are, independently, H, phenyl, naphthyl, methyl, ethyl, propyl, butyl, pentyl, hexyl, heptyl, octyl, nonyl, decyl, undecyl, dodecyl or an isomer thereof.

Catalyst compounds useful herein include one or more of those represented by the formula:

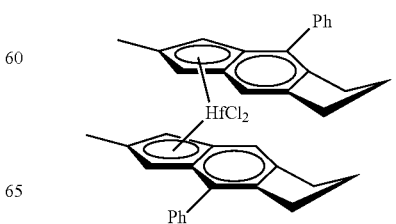

-continued

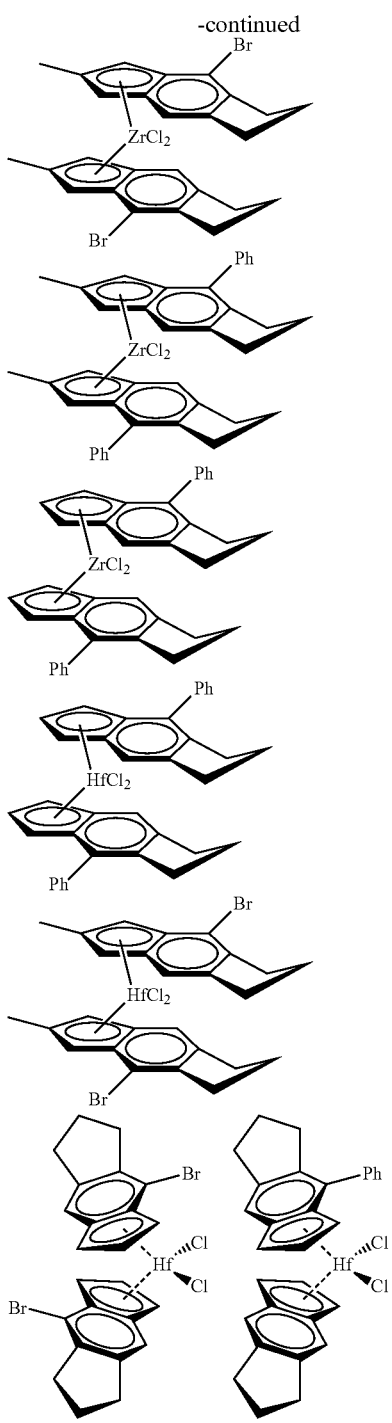

Support Material

In embodiments of the present disclosure, the catalyst systems can comprise a support material. Preferably, the support material is a porous support material, for example, talc, and inorganic oxides. Other support materials include zeolites, clays, organoclays, or any other organic or inorganic support material, or mixtures thereof. As used herein, "support" and "support material" are used interchangeably.

Preferably, the support material is an inorganic oxide in a finely divided form. Suitable inorganic oxide materials for use in the supported catalyst systems herein include Groups 2, 4, 13, and 14 metal oxides such as silica, alumina, and mixtures thereof. Other inorganic oxides that may be employed, either alone or in combination, with the silica or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably, $SiO_2$, $Al_2O_3$, or $SiO_2/Al_2O_3$.

It is preferred that the support material, most preferably, an inorganic oxide, has a surface area in the range of from about 10 $m^2/g$ to about 700 $m^2/g$, pore volume in the range of from about 0.1 cc/g to about 4.0 cc/g, and average particle size in the range of from about 5 m to about 500 m. More preferably, the surface area of the support material is in the range of from about 50 $m^2/g$ to about 500 $m^2/g$, pore volume of from about 0.5 cc/g to about 3.5 cc/g, and average particle size of from about 10 m to about 200 m. Most preferably, the surface area of the support material is in the range of from about 100 $m^2/g$ to about 400 $m^2/g$, pore volume from about 0.8 cc/g to about 3.0 cc/g, and average particle size is from about 5 m to about 100 μm. The average pore size of the support material can be from 10 to 1,000 Å, preferably, 50 to about 500 Å, and most preferably, 75 to about 350 Å. In some embodiments, the support material is a high surface area, amorphous silica (surface area ≥300 $m^2/gm$, pore volume ≥1.65 $cm^3/gm$), and is marketed under the tradenames of DAVISON 952 or DAVISON 955 by the Davison Chemical Division of W. R. Grace and Company, are particularly useful. In other embodiments, DAVIDSON 948 is used.

In some embodiments of the present disclosure, the support material may be dry, that is, free of absorbed water. Drying of the support material can be achieved by heating or calcining at about 100° C. to about 1000° C., preferably, at least about 600° C. When the support material is silica, it is typically heated to at least 200° C., preferably, about 200° C. to about 850° C., and most preferably, at about 600° C.; and for a time of about 1 minute to about 100 hours, from about 12 hours to about 72 hours, or from about 24 hours to about 60 hours. The calcined support material, preferably, has at least some reactive hydroxyl (OH) groups.

In a particularly useful embodiment, the support material is fluorided. Fluoriding agent containing compounds may be any compound containing a fluorine atom. Particularly desirable are inorganic fluorine containing compounds are selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$, and $NH_4HF_2$. Of these, ammonium hexafluorosilicate and ammonium tetrafluoroborate are useful. Combinations of these compounds may also be used.

Ammonium hexafluorosilicate and ammonium tetrafluoroborate fluorine compounds are typically solid particulates as are the silicon dioxide supports. A desirable method of treating the support with the fluorine compound is to dry mix the two components by blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after charging to a vessel for dehydration or calcining the support. Accordingly, the fluorine concentration present on the support is in the range of from 0.1 to 25 wt %, alternatively from 0.19 to 19 wt %, alternatively from 0.6 to 3.5 wt %, based upon the weight of the support.

The above two metal catalyst components described herein are generally deposited on the support material at a loading level of 10-100 micromoles of metal per gram of solid support; alternatively 20-80 micromoles of metal per gram of solid support; or 40-60 micromoles of metal per gram of support. But greater or lesser values may be used provided that the total amount of solid complex does not exceed the support's pore volume.

In at least one embodiment, the support material comprises a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

The electron-withdrawing component used to treat the support material can be any component that increases the Lewis or Brønsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, and the like, or any combination thereof, at least one embodiment of this disclosure. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In at least one embodiment, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, any of these activator-supports optionally can be treated with a metal ion.

Nonlimiting examples of cations suitable for use in the present disclosure in the salt of the electron-withdrawing anion include ammonium, trialkyl ammonium, tetraalkyl ammonium, tetraalkyl phosphonium, H+, $[H(OEt_2)_2]+$, or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in at least one embodiment, two or more electron-withdrawing anion source compounds in two or more separate contacting steps.

In one embodiment of the present disclosure, one example of a process by which a chemically-treated support material is prepared is as follows: a selected support material, or combination of support materials, can be contacted with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, typically a salt or an acid of an electron-withdrawing anion, can include, but is not limited to, gelling, co-gelling, impregnation of one compound onto another, and the like, or combinations thereof. Following a contacting method, the contacted mixture of the support material, electron-withdrawing anion, and optional metal ion, can be calcined.

According to another embodiment of the present disclosure, the support material can be treated by a process comprising: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

Activators

The catalyst systems may be formed by combining the above metal catalyst components with activators in any manner known from the literature including by supporting them for use in slurry or gas phase polymerization. Activators are defined to be any compound which can activate any one of the catalysts described above by converting the neutral metal compound to a catalytically active metal compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, G-bound, metal ligand making the metal compound cationic and providing a charge-balancing noncoordinating or weakly coordinating anion.

Alumoxane Activators

Alumoxane activators are utilized as activators in the catalyst systems described herein. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator typically at up to a 5000-fold molar excess Al/M over the catalyst (per metal catalytic site). The minimum activator-to-catalyst-compound is a 1:1 molar ratio. Alternate preferred ranges include from 1:1 to 500:1, alternatively from 1:1 to 200:1, alternatively from 1:1 to 100:1, or alternatively from 1:1 to 50:1.

In an alternate embodiment, little or no alumoxane is used in the polymerization processes described herein. Preferably, alumoxane is present at zero mol %, alternatively the alumoxane is present at a molar ratio of aluminum to catalyst compound transition metal less than 500:1, preferably less than 300:1, preferably less than 100:1, preferably less than 1:1.

Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with embodiments of the present disclosure are those that are compatible, stabilize the transition metal cation in the sense of balancing its ionic charge at +1, and yet retain sufficient lability to permit displacement during polymerization.

It is within the scope of the present disclosure to use an ionizing activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of the present disclosure to use neutral or ionic activators alone or in combination with alumoxane or modified alumoxane activators.

For descriptions of useful activators please see U.S. Pat. Nos. 8,658,556 and 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4^-$], 1-(4-(tris(pentafluorophenyl)borate)-2,3,5,6-tetrafluorophenyl)pyrrolidinium; and [Me$_3$NH$^+$][B(C$_6$F$_5$)$_4^-$], 1-(4-(tris(pentafluorophenyl)borate)-2,3,5,6-tetrafluorophenyl) pyrrolidinium; and sodium tetrakis(pentafluorophenyl) borate, potassium tetrakis(pentafluorophenyl)borate, 4-(tris(pentafluorophenyl)borate)-2,3,5,6-tetrafluoropyridinium, solidium tetrakis(perfluorophenyl)aluminate, potassium terakis(pentafluorophenyl), and N,N-dimethylanilinium tetrakis(perfluorophenyl)aluminate.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate preferred ranges include from 0.1:1 to 100:1, alternatively from 0.5:1 to 200:1, alternatively from 1:1 to 500:1 alternatively from 1:1 to 1000:1. A particularly useful range is from 0.5:1 to 10:1, preferably 1:1 to 5:1.

Optional Scavengers or Co-Activators

In addition to the activator compounds, scavengers, chain transfer agents or co-activators may be used. Aluminum alkyl or organoaluminum compounds which may be utilized as co-activators include, for example, trimethylaluminum, triethylaluminum, triisobutylaluminum, tri-n-hexylaluminum, tri-n-octylaluminum, and diethyl zinc.

In some embodiments, the catalyst systems will additionally comprise one or more scavenging compounds. Here, the term "scavenger" means a compound that removes polar impurities from the reaction environment. These impurities adversely affect catalyst activity and stability. Typically, the scavenging compound will be an organometallic compound such as the Group-13 organometallic compounds of U.S. Pat. Nos. 5,153,157; 5,241,025; and WO 91/09882; WO 94/03506; WO 93/14132; and that of WO 95/07941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or C$_6$-C$_{20}$ linear hydrocarbyl substituents connected to the metal or metalloid center usually minimize adverse interaction with the active catalyst. Examples include triethyl aluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, $[Me_2HNPh]^+[B(pfp)_4]^-$ or $B(pfp)_3$ (perfluorophenyl=pfp=$C_6F_5$).

Preferred aluminum scavengers include those where there is oxygen present. That is, the material per se or the aluminum mixture used as a scavenger, includes an aluminum/oxygen species, such as an alumoxane or alkylaluminum oxides, e.g., dialkyaluminum oxides, such as bis(diisobutylaluminum) oxide. In one aspect, aluminum containing scavengers can be represented by the formula $((R_z\text{—Al—})_y O\text{—})_x$, wherein z is 1-2, y is 1-2, x is 1-100, and R is a $C_1$-$C_{12}$ hydrocarbyl group. In another aspect, the scavenger has an oxygen to aluminum (O/Al) molar ratio of from about 0.25 to about 1.5, more particularly from about 0.5 to about 1.

Preparation of Catalyst Systems

The above catalyst compounds can be combined to form a catalyst system. One or more (such as two or more) metal catalyst compounds can be added together in a desired ratio when combined, contacted with an activator, or contacted with a support material or a supported activator. The metal catalyst compounds may be added to the mixture sequentially or at the same time.

Alternative preparations can include addition of a first metal catalyst compound to a slurry including a support or a supported activator mixture for a specified reaction time, followed by the addition of the second metal catalyst compound solution, mixed for another specified time, after which the mixture may be recovered for use in a polymerization reactor, such as by spray drying. Lastly, another additive, such as 1-hexene in about 10 vol % can be present in the mixture prior to the addition of the metal catalyst compound.

The catalyst compound may be supported via contact with a support material for a reaction time. The resulting supported catalyst composition may then be mixed with diluent to form a slurry, which may or may not include an activator. The slurry may then be optionally admixed with a second metal catalyst compound prior to introduction of the resulting mixed catalyst system to a polymerization reactor. The second metal catalyst compound may be admixed at any point prior to introduction to the reactor, such as in a polymerization feed vessel or in-line in a catalyst delivery system.

The catalyst system may be formed by combining the catalyst compound with a support and an activator, desirably in a first diluent such as an alkane or toluene, to produce a supported, activated catalyst compound. The supported activated catalyst compound, either isolated from the first diluent or not, is then combined in one embodiment with a high viscosity diluent such as mineral or silicon oil, or an alkane diluent comprising from 5 to 99 wt % mineral or silicon oil to form a slurry of the supported metal catalyst compound, followed by, or simultaneous to combining with an optional second metal catalyst compound (for example, a metal catalyst compound useful for producing a second polymer attribute, such as a low molecular weight polymer fraction or low comonomer content), either in a diluent or as the dry solid compound, to form a supported activated mixed catalyst system. In one embodiment, the diluent consists of mineral oil.

Mineral oil, or "high viscosity diluents," as used herein refers to petroleum hydrocarbons and mixtures of hydrocarbons that may include aliphatic, aromatic, and/or paraffinic components that are liquids at 23° C. and above, and typically have a molecular weight of at least 300 amu to 500 amu or more, and a viscosity at 40° C. of from 40 to 300 cSt or greater, or from 50 to 200 cSt in a particular embodiment. The term "mineral oil" includes synthetic oils or liquid polymers, polybutenes, refined naphthenic hydrocarbons, and refined paraffins known in the art, such as disclosed in BLUE BOOK 2001, MATERIALS, COMPOUNDING INGREDIENTS, MACHINERY AND SERVICES FOR RUBBER 189 247 (J. H. Lippincott, D. R. Smith, K. Kish & B. Gordon eds. Lippincott & Peto Inc. 2001). Preferred mineral and silicon oils are those that exclude moieties that are reactive with metallocene catalysts, examples of which include hydroxyl and carboxyl groups.

The diluent may comprise a blend of a mineral, silicon oil, and/or and a hydrocarbon selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof. When the diluent is a blend comprising mineral oil, the diluent may comprise from 5 to 99 wt % mineral oil. In some embodiments, the diluent may consist essentially of mineral oil.

In one embodiment, the catalyst compound is combined with an activator and a first diluent to form a catalyst slurry that is then combined with a support material. Until such contact is made, the support particles are preferably not previously activated. The catalyst compound can be in any desirable form such as a dry powder, suspension in a diluent, solution in a diluent, liquid, etc. The catalyst slurry and support particles are then mixed thoroughly, in one embodiment at an elevated temperature, so that both the catalyst compound and the activator are deposited on the support particles to form a support slurry.

A wide range of mixing temperatures may be used at various stages of making the catalyst system. For example, in a specific embodiment, when the catalyst compound and at least one activator, such as methylalumoxane, are combined with a first diluent to form a mixture, the mixture is preferably, heated to a first temperature of from 25° C. to 150° C., preferably, from 50° C. to 125° C., more preferably, from 75° C. to 100° C., most preferably, from 80° C. to 100° C. and stirred for a period of time from 30 seconds to 12 hours, preferably, from 1 minute to 6 hours, more preferably, from 10 minutes to 4 hours, and most preferably, from 30 minutes to 3 hours.

Next, that mixture is combined with a support material to provide a first support slurry. The support material can be heated, or dehydrated if desired, prior to combining. In one or more embodiments, the first support slurry is mixed at a temperature greater than 50° C., preferably, greater than 70° C., more preferably, greater than 80° C. and most preferably, greater than 85° C., for a period of time from 30 seconds to 12 hours, preferably, from 1 minute to 6 hours, more preferably, from 10 minutes to 4 hours, and most preferably, from 30 minutes to 3 hours. Preferably, the support slurry is mixed for a time sufficient to provide a collection of activated support particles that have the first metal catalyst compound deposited thereto. The first diluent can then be removed from the first support slurry to provide a dried supported first catalyst compound. For example, the first diluent can be removed under vacuum or by nitrogen purge.

Optionally, a second catalyst compound is combined with the activated the first catalyst compound in the presence of a diluent comprising mineral or silicon oil in one embodiment. Preferably, the second catalyst compound is added in a molar ratio to the first metal catalyst compound in the range from 1:1 to 3:1. Most preferably, the molar ratio is approximately 1:1. The resultant slurry (or first support slurry) is preferably, heated to a first temperature from 25° C. to 150° C., preferably, from 50° C. to 125° C., more preferably, from 75° C. to 100° C., most preferably, from 80° C. to 100° C. and stirred for a period of time from 30 seconds to 12 hours, preferably, from 1 minute to 6 hours, more preferably, from 10 minutes to 4 hours, and most preferably, from 30 minutes to 3 hours.

The first diluent is an aromatic or alkane, preferably, hydrocarbon diluent having a boiling point of less than 200° C. such as toluene, xylene, hexane, etc., may be removed from the supported first metal catalyst compound under vacuum or by nitrogen purge to provide a supported mixed catalyst system. Even after addition of the oil and/or the second (or other) catalyst compound, it may be desirable to treat the slurry to further remove any remaining solvents such as toluene. This can be accomplished by an $N_2$ purge or vacuum, for example. Depending upon the level of mineral oil added, the resultant catalyst system may still be a slurry or may be a free flowing powder that comprises an amount of mineral oil. Thus, the catalyst system, while a slurry of solids in mineral oil in one embodiment, may take any physical form such as a free flowing solid. For example, the catalyst system may range from 1 to 99 wt % solids content by weight of the catalyst system (mineral oil, support, all catalyst compounds and activator(s)) in one embodiment.

Polymerization Processes

In at least one embodiment, a polymerization process includes contacting a monomer (such as ethylene), and, optionally, comonomer (such as hexene), with a supported catalyst system comprising a group 4 (such as Hf) metallocene compound, an activator, and a support material as described above.

Monomers useful herein include substituted or unsubstituted $C_2$ to $C_{40}$ alpha olefins, preferably, $C_2$ to $C_{20}$ alpha olefins, preferably, $C_2$ to $C_{12}$ alpha olefins, preferably, ethylene, propylene, butene, pentene, hexene, heptene, octene, nonene, decene, undecene, dodecene and isomers thereof. In a preferred embodiment, the monomers comprise ethylene and, optional, comonomers comprising one or more $C_3$ to $C_{40}$ olefins, preferably, $C_4$ to $C_{20}$ olefins, or preferably, $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may, optionally, include heteroatoms and/or one or more functional groups.

Exemplary $C_3$ to $C_{40}$ comonomers include propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably, hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives.

In a preferred embodiment one or more dienes are present in the polymer produced herein at up to 10 wt %, preferably, at 0.00001 to 1.0 wt %, preferably, 0.002 to 0.5 wt %, even more preferably, 0.003 to 0.2 wt %, based upon the total weight of the composition. In some embodiments 500 ppm or less of diene is added to the polymerization, preferably, 400 ppm or less, preferably, or 300 ppm or less. In other embodiments, at least 50 ppm of diene is added to the polymerization, or 100 ppm or more, or 150 ppm or more.

Preferred diolefin monomers include any hydrocarbon structure, preferably, $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably, those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a particularly preferred embodiment, a process provides polymerization of ethylene and at least one comonomer having from 3 to 8 carbon atoms, preferably, 4 to 8 carbon atoms. Particularly, the comonomers are propylene, 1-butene, 4-methyl-1-pentene, 3-methyl-1-pentene, 1-hexene and 1-octene, the most preferred being 1-hexene, 1-butene and 1-octene.

In a particularly preferred embodiment, a process provides polymerization of one or more monomers selected from the group consisting of propylene, 1-butene, 1-pentene, 3-methyl-1-pentene, 4-methyl-1-pentene, 1-hexene, 1-octene, 1-decene, and combinations thereof.

Polymerization processes of the present disclosure can be carried out in any suitable manner known in the art. Any suspension, homogeneous, bulk, solution, slurry, or gas phase polymerization process known in the art can be used. Such processes can be run in a batch, semi-batch, or continuous mode. Gas phase polymerization processes and slurry processes are preferred. (A homogeneous polymerization process is a process where at least 90 wt % of the product is soluble in the reaction media.) A bulk homogeneous process is particularly preferred. (A bulk process is a process where monomer concentration in all feeds to the reactor is 70 volume % or more.) Alternatively, no solvent or diluent is present or added in the reaction medium (except for the small amounts used as the carrier for the catalyst system or other additives, or amounts typically found with the monomer; e.g., propane in propylene).

In another embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include noncoordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorided $C_{4-10}$ alkanes, chlorobenzene, and aromatic and alkylsubstituted aromatic compounds, such as benzene, toluene, mesitylene, and xylene. Suitable solvents also include liquid olefins, which may act as monomers or comonomers, including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably, aromatics are present in the solvent at less than 1 wt %, preferably, less than 0.5 wt %, preferably, less than 0 wt % based upon the weight of the solvents.

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228, all of which are fully incorporated herein by reference.)

This invention also relates to a process for the production of an ethylene alpha-olefin copolymer comprising: polymerizing ethylene and at least one alpha-olefin by contacting the ethylene and the at least one alpha-olefin with a catalyst system as described herein in at least one gas phase reactor at a reactor pressure of from 0.7 to 70 bar and a reactor temperature of from 20° C. to 150° C. to form an ethylene alpha-olefin copolymer.

This invention also relates to an ethylene alpha-olefin copolymer obtained by contacting ethylene, at least one alpha-olefin, and a catalyst system as described herein in at least one gas-phase reactor, the copolymer having a density of 0.890 g/cc or more (ASTM D 1505), a melt flow index from 0.1 to 80 g/10 min (ASTM 1238, 190° C., 2.16 kg), and a Mw/Mn from 2 to 12.5, preferably 2.5 to 12, preferably 2 to 7.

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers, along with catalysts, are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used, the process must be operated above the reaction diluent critical temperature and pressure. Preferably, a hexane or an isobutane medium is employed.

This invention also relates to a process for the production of an ethylene alpha-olefin copolymer comprising: polymerizing ethylene and at least one alpha-olefin by contacting the ethylene and the at least one alpha-olefin with a catalyst system described herein in at least one slurry phase reactor at a reactor pressure of from 0.7 to 70 bar and a reactor temperature of from 60° C. to 130° C. to form an ethylene alpha-olefin copolymer.

This invention also relates to an ethylene alpha-olefin copolymer obtained by contacting ethylene, at least one alpha-olefin, and a catalyst system described herein in at least one slurry phase reactor, the copolymer having a density of 0.890 g/cc or more (ASTM D 1505), a melt flow index from 0.1 to 80 g/10 min (ASTM 1238, 190° C., 2.16 kg), and an Mw/Mn from 2 to 12.

Polyolefin Products

The present disclosure further provides compositions of matter produced by the methods of the present disclosure.

In a preferred embodiment, the process described herein produces ethylene homopolymers or ethylene copolymers, such as ethylene-alpha-olefin (preferably $C_3$ to $C_{20}$) copolymers (such as ethylene-butene copolymers, ethylene-hexene and/or ethylene-octene copolymers).

Likewise, processes of the present disclosure can form ethylene copolymers. In a preferred embodiment, the copolymers produced herein have from 0 to 25 mol % (alternatively from 0.5 to 20 mol %, alternatively from 1 to 15 mol %, preferably from 3 to 10 mol %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene).

In a preferred embodiment, the monomer is ethylene and the comonomer is hexene, preferably from 1 to 15 mol % hexene, alternatively 1 to 10 mol %.

In particular, the present disclosure provides an in-situ ethylene polymer composition having: 1) at least 50 mol % ethylene; and 2) a density of 0.89 g/cc or more, preferably 0.910 g/cc or more (ASTM 1505). The copolymer produced herein preferably has a composition distribution breadth $T_{75}$-$T_{25}$, as measured by TREF, that is greater than 20° C., preferably greater than 30° C., preferably greater than 40° C. The $T_{75}$-$T_{25}$ value represents the homogeneity of the composition distribution as determined by temperature rising elution fractionation. A TREF curve is produced as described below. Then the temperature at which 75% of the polymer is eluted is subtracted from the temperature at which 25% of the polymer is eluted, as determined by the integration of the area under the TREF curve. The $T_{75}$-$T_{25}$ value represents the difference. The closer these temperatures comes together, the narrower the composition distribution.

In particular, the present disclosure provides an in-situ ethylene polymer composition having: 1) at least 50 mol % ethylene; and 2) a density of 0.89 g/cc or more, preferably having a density of 0.89 g/cc or more (alternately 0.90 g/cc or more, 0.908 g/cc or more, 0.91 g/cc or more, 0.918 g/cc or more, or 0.935 g/cc or more).

Typically, the polymers produced herein have an Mw of 5,000 to 1,000,000 g/mol (preferably 25,000 to 750,000 g/mol, preferably 50,000 to 500,000 g/mol), and/or an Mw/Mn of greater than 1 to 40 (alternatively 1.5 to 20, alternatively 2 to 12, alternatively 2 to 10, alternatively 2.5 to 7) as determined by GPC-4D.

In a preferred embodiment, the polymer produced herein has a unimodal or multimodal molecular weight distribution as determined by Gel Permeation Chromatography (GPC). By "unimodal" is meant that the GPC trace has one peak or two inflection points. By "multimodal" is meant that the GPC trace has at least two peaks or more than 2 inflection points. An inflection point is that point where the second derivative of the curve changes in sign (e.g., from negative to positive or vice versa).

In a preferred embodiment, the polymer produced herein has a bimodal molecular weight distribution as determined by Gel Permeation Chromatography (GPC). By "bimodal" is meant that the GPC trace has two peaks or at least 4 inflection points.

In another embodiment, the polymer produced herein has one, two or more peaks in the TREF measurement (see below). Two or more peaks in the TREF measurement as used in this specification and the appended claims is the presence of two or more distinct normalized IR response peaks in a graph of normalized IR (infrared) response (vertical or y axis) versus elution temperature (horizontal or x axis with temperature increasing from left to right) using the TREF method below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. Preferably, the distinct peaks are at least 3° C. apart, more preferably at least 4° C. apart, even more preferably at least 5° C. apart. Additionally, the distinct peaks occur at a temperature on the graph above 20° C. and below 120° C. where the elution temperature is run to 0° C. or lower. This avoids confusion with the apparent peak on the graph at low temperature caused by material that remains soluble at the lowest elution temperature. Multiple peaks on such a graph indicates a multi-modal composition distribution (CD). An alternate method for TREF measurement can be used if the method below does not show two peaks, i.e., see B. Monrabal, "Crystallization Analysis Fractionation: A New Technique for the Analysis of Branching Distribution in Polyolefins," Journal of Applied Polymer Science, Vol. 52, 491-499 (1994).

TREF Method

Temperature Rising Elution Fractionation (TREF) analysis is done using a Crystallization Elution Fractionation (CEF) instrument from Polymer Char, S.A., Valencia, Spain. The principles of CEF analysis and a general description of the particular apparatus used are given in the article Monrabal, B. et al. Crystallization Elution Fractionation. A New Separation Process for Polyolefin Resins. *Macromol. Symp.* 2007, 257, 71. In particular, a process conforming to the "TREF separation process" shown in FIG. 1a of this article, in which Fc=0, was used. Pertinent details of the analysis method and features of the apparatus used are as follows.

The solvent used for preparing the sample solution and for elution was 1,2-Dichlorobenzene (ODCB) which was stabilized by dissolving 1.6 g of 2,6-bis(1,1-dimethylethyl)-4-methylphenol (butylated hydroxytoluene) in a 4-L bottle of fresh solvent at ambient temperature. The stabilized solvent was then filtered using a 0.1-µm Teflon filter (Millipore). The sample (6-10 mg) to be analyzed was dissolved in 8 ml of ODCB metered at ambient temperature by stirring (Medium setting) at 150° C. for 90 min. A small volume of the polymer solution was first filtered by an inline filter (stainless steel, 10 µm), which is back-flushed after every filtration. The filtrate was then used to completely fill a 200-µl injection-valve loop. The volume in the loop was then introduced near the center of the CEF column (15-cm long SS tubing, ⅜" o.d., 7.8 mm i.d.) packed with an inert support (SS balls) at 140° C., and the column temperature was stabilized at 125° C. for 20 min. The sample volume was then allowed to crystallize in the column by reducing the temperature to 0° C. at a cooling rate of 1° C./min. The column was kept at 0° C. for 10 min before injecting the ODCB flow (1 ml/min) into the column for 10 min to elute and measure the polymer that did not crystallize (soluble fraction). The wide-band channel of the infrared detector used (Polymer Char IR5) generates an absorbance signal that is proportional to the concentration of polymer in the eluting flow. A complete TREF curve was then generated by increasing the temperature of the column from 0 to 140° C. at a rate of 2° C./min while maintaining the ODCB flow at 1 ml/min to elute and measure the concentration of the dissolving polymer.

GPC-4D Procedure: Molecular Weight, Comonomer Composition and Long Chain Branching Determination by GPC-IR Hyphenated with Multiple Detectors Unless otherwise indicated, the distributions and the moments of molecular weight (Mw, Mn, Mw/Mn, etc.), the comonomer content ($C_2$, $C_3$, $C_6$, etc.) and the branching index (g'vis) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-µm Teflon filter and degassed with an online degasser before entering the GPC instrument. The nominal flow rate is 1.0 ml/min and the nominal injection volume is 200 µL. The whole system including transfer lines, columns, and detectors are contained in an oven maintained at 145° C. The polymer sample is weighed and sealed in a standard vial with 80-µL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1}\log M_{PS},$$

where the variables with subscript "PS" stand for polystyrene while those without a subscript are for the test samples. In this method, $\alpha_{PS}=0.67$ and $K_{PS}=0.000175$ while $\alpha$ and K are for other materials as calculated and published in literature (Sun, T. et al. *Macromolecules* 2001, 34, 6812), except that for purposes of the present disclosure, $\alpha=0.695$ and $K=0.000579$ for linear ethylene polymers, $\alpha=0.705$ and $K=0.0002288$ for linear propylene polymers, $\alpha=0.695$ and $K=0.000181$ for linear butene polymers, $\alpha$ is 0.695 and K is $0.000579*(1-0.0087*w2b+0.000018*(w2b)^2)$ for ethylene-butene copolymer where w2b is a bulk weight percent of butene comonomer, $\alpha$ is 0.695 and K is $0.000579*(1-0.0075*w2b)$ for ethylene-hexene copolymer where w2b is a bulk weight percent of hexene comonomer, and $\alpha$ is 0.695 and K is $0.000579*(1-0.0077*w2b)$ for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3/1000TC$) as a function of molecular weight. The short-chain branch (SCB) content per 1000TC (SCB/1000TC) is then computed as a function of molecular weight by applying a chain-end correction to the $CH_3/1000TC$ function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

$$w2 = f*SCB/1000TC.$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk IR ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1000TC (bulk CH3end/1000TC) is obtained by weight-averaging the chain-end correction over the molecular-weight range. Then $$w2b = f*\text{bulk CH3/1000TC}$$

bulk SCB/1000TC=bulk CH3/1000TC−bulk CH3end/1000TC, and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and $\lambda=665$ nm. For analyzing polyethylene homopolymers, ethylene-hexene copolymers, and ethylene-octene copolymers, dn/dc=0.1048 ml/mg and $A_2=0.0015$; for analyzing ethylene-butene copolymers, $dn/dc=0.1048*(1-0.00126*w2)$ ml/mg and $A_2=0.0015$ where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the equation $[\eta]=\eta_s/c$, where c is concentration and is determined from the IR5 broadband channel output. The viscosity MW at each point is calculated as $M=K_{PS}M^{\alpha_{PS}+1}/[\eta]$, where $\alpha_{PS}$ is 0.67 and $K_{PS}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i},$$

where the summations are over the chromatographic slices, i, between the integration limits. The branching index $g'_{vis}$ is defined as $$g'_{vis} = \frac{[\eta]_{avg}}{KM_v^\alpha},$$

where $M_V$ is the viscosity-average molecular weight based on molecular weights determined by LS analysis and the K and a are for the reference linear polymer, which are, for purposes of the present disclosure, $\alpha=0.695$ and $K=0.000579$ for linear ethylene polymers, $\alpha=0.705$ and $K=0.0002288$ for linear propylene polymers, $\alpha=0.695$ and $K=0.000181$ for linear butene polymers, $\alpha$ is 0.695 and K is $0.000579*(1-0.0087*w2b+0.000018*(w2b)^2)$ for ethylene-butene copolymer where w2b is a bulk weight percent of butene comonomer, $\alpha$ is 0.695 and K is $0.000579*(1-0.0075*w2b)$ for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

The reversed-co-monomer index (RCI,m) is computed from x2 (mol % co-monomer $C_3$, $C_4$, $C_6$, $C_8$, etc.), as a function of molecular weight, where x2 is obtained from the following expression in which n is the number of carbon atoms in the comonomer (3 for $C_3$, 4 for $C_4$, 6 for $C_6$, etc.)

$$x2 = -\frac{200w2}{-100n - 2w2 + nw2}.$$

Then the molecular-weight distribution, W(z) where z=$\log_{10}$ M, is modified to W'(z) by setting to 0 the points in W that are less than 5% of the maximum of W; this is to effectively remove points for which the S/N in the composition signal is low. Also, points of W' for molecular weights below 2000 gm/mole are set to 0. Then W' is renormalized so that $$1 = \int_{-\infty}^{\infty} W' dz,$$

and a modified weight-average molecular weight ($M_w'$) is calculated over the effectively reduced range of molecular weights as follows:

$$M_w' = \int_{-\infty}^{\infty} 10^z * W' dz.$$

The RCI,m is then computed as $$RCI, m = \int_{-\infty}^{\infty} x2(10^z - M_w') W' dz.$$

A reversed-co-monomer index (RCI,w) is also defined on the basis of the weight fraction co-monomer signal (w2/100) and is computed as follows:

$$RCI, w = \int_{-\infty}^{\infty} \frac{w2}{100}(10^z - M_w') W' dz.$$

Note that in the above definite integrals the limits of integration are the widest possible for the sake of generality; however, in reality the function is only integrated over a finite range for which data is acquired, considering the function in the rest of the non-acquired range to be 0. Also, by the manner in which W' is obtained, it is possible that W' is a discontinuous function, and the above integrations need to be done piecewise.

Three co-monomer distribution ratios are also defined on the basis of the % weight (w2) comonomer signal, denoted as CDR-1,w, CDR-2,w, and CDR-3,w, as follows:

$$CDR\text{-}1, w = \frac{w2(Mz)}{w2(Mw)}$$

$$CDR\text{-}2, w = \frac{w2(Mz)}{w2\left(\frac{Mw+Mn}{2}\right)}$$

$$CDR\text{-}3, w = \frac{w2\left(\frac{Mz+Mw}{2}\right)}{w2\left(\frac{Mw+Mn}{2}\right)},$$

where w2(Mw) is the % weight co-monomer signal corresponding to a molecular weight of Mw, w2(Mz) is the % weight co-monomer signal corresponding to a molecular weight of Mz, w2[(Mw+Mn)/2)] is the % weight co-monomer signal corresponding to a molecular weight of (Mw+Mn)/2, and w2[(Mz+Mw)/2] is the % weight co-monomer signal corresponding to a molecular weight of Mz+Mw/2, where Mw is the weight-average molecular weight, Mn is the number-average molecular weight, and Mz is the z-average molecular weight.

Accordingly, the co-monomer distribution ratios can be also defined utilizing the % mole co-monomer signal, CDR-1,m, CDR-2,m, CDR-3,m, as:

$$CDR\text{-}1, m = \frac{x2(Mz)}{x2(Mw)}$$

$$CDR\text{-}2, m = \frac{x2(Mz)}{x2\left(\frac{Mw+Mn}{2}\right)}$$

$$CDR\text{-}3, m = \frac{x2\left(\frac{Mz+Mw}{2}\right)}{x2\left(\frac{Mw+Mn}{2}\right)},$$

where x2(Mw) is the % mole co-monomer signal corresponding to a molecular weight of Mw, x2(Mz) is the % mole co-monomer signal corresponding to a molecular weight of Mz, x2[(Mw+Mn)/2)] is the % mole co-monomer signal corresponding to a molecular weight of (Mw+Mn)/2, and x2[(Mz+Mw)/2] is the % mole co-monomer signal corresponding to a molecular weight of Mz+Mw/2, where Mw is the weight-average molecular weight, Mn is the number-average molecular weight, and Mz is the z-average molecular weight. For purposes of the claims, GPC-4D shall be used for Mw, Mn, Mz and g'vis.

End Uses

The multi-modal polyolefin produced by the processes disclosed herein and blends thereof are useful in such forming operations as sheet and fiber extrusion and co-extrusion as well as blow molding, injection molding, and rotary molding. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

Blends

The polymers produced herein may be further blended with additional ethylene polymers (referred to as "second ethylene polymers" or "second ethylene copolymers") and use in molded part and other typical polyethylene applications.

In one aspect of the present disclosure, the second ethylene polymer is selected from ethylene homopolymer, ethylene copolymers, and blends thereof. Useful second ethylene copolymers can comprise one or more comonomers in addition to ethylene and can be a random copolymer, a statistical copolymer, a block copolymer, and/or blends thereof. The method of making the second ethylene polymer is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In a preferred embodiment, the second ethylene polymers are made by the catalysts, activators and processes described in U.S. Pat. Nos. 6,342,566; 6,384,142; 5,741,563; PCT Publication Nos. WO 03/040201; and WO 97/19991. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000). Additional useful second ethylene polymers and copolymers are described at paragraph [00118] to [00126] at pages 30 to 34 of PCT/US2016/028271, filed Apr. 19, 2016.

This invention further relates to:

1. A catalyst represented by Formula (I):

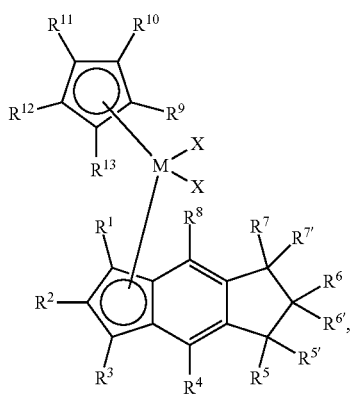

(I)

wherein:
M is a group 4 metal;
each of $R^1$, $R^2$, $R^3$, $R^4$, and $R^8$ is independently hydrogen, halogen, $C_1$-$C_{40}$ hydrocarbyl or $C_1$-$C_{40}$ substituted hydrocarbyl, —$NR'_2$, —$SR'$, —$OR$, —$OSiR'_3$, —$PR'_2$, —$R^\#$—$SiR'_3$, where $R^\#$ is $C_1$-$C_{10}$ alkyl and each $R'$ is hydrogen, halogen, $C_1$-$C_{10}$ alkyl, or $C_6$-$C_{10}$ aryl;
each of $R^5$, $R^{5'}$, $R^6$, $R^{6'}$, $R^7$ and $R^{7'}$ is independently hydrogen, halogen, $C_1$-$C_{40}$ hydrocarbyl or $C_1$-$C_{40}$ substituted hydrocarbyl, —$NR'_2$, —$SR'$, —$OR$, —$OSiR'_3$, —$PR'_2$, —$R^\#$—$SiR'_3$, where $R^\#$ is $C_1$-$C_{10}$ alkyl and each $R'$ is hydrogen, halogen, $C_1$-$C_{10}$ alkyl, or $C_6$-$C_{10}$ aryl;
each X is independently a leaving group, or two Xs are joined and bound to the metal atom to form a metallocycle ring, or two Xs are joined to form a chelating ligand, a diene, or an alkylidene; and
each of $R^9$, $R^{10}$, $R^{11}$, $R^{12}$ and $R^{13}$ is hydrogen, halogen, $C_1$-$C_{40}$ hydrocarbyl or $C_1$-$C_{40}$ substituted hydrocarbyl, —$NR'_2$, —$SR'$, —$OR$, —$OSiR'_3$, —$PR'_2$, —$R^\#$—$SiR'_3$, where $R^\#$ is $C_1$-$C_{10}$ alkyl and where each $R'$ is hydrogen, halogen, $C_1$-$C_{10}$ alkyl, or $C_6$-$C_{10}$ aryl, or $R^9$ and $R^{10}$ or $R^{12}$ and $R^{13}$ together form a substituted or unsubstituted 5-8 membered saturated or unsaturated cyclic or multicyclic ring structure.

2. The catalyst of paragraph 1, wherein:
M is a group 4 metal;
each of $R^1$, $R^2$, $R^3$, $R^4$, and $R^8$ is independently hydrogen, halogen, $C_1$-$C_{20}$ substituted or unsubstituted hydrocarbyl, halocarbyl or silylcarbyl;
each of $R^5$, $R^{5'}$, $R^6$, $R^{6'}$, $R^7$ and $R^{7'}$ is independently hydrogen or a $C_1$-$C_{10}$ alkyl;
each X is independently a leaving group, or two Xs are joined and bound to the metal atom to form a metallocycle ring, or two Xs are joined to form a chelating ligand, a diene, or an alkylidene; and
each of $R^9$, $R^{10}$, $R^{11}$, $R^{12}$ and $R^{13}$ is hydrogen or $C_1$-$C_{20}$ substituted or unsubstituted hydrocarbyl, or $R^9$ and $R^{10}$ or $R^{12}$ and $R^{13}$ together form a substituted or unsubstituted 5-8 membered saturated or unsaturated cyclic ring.

3. The catalyst of paragraphs 1 or 2, wherein $R^9$ and $R^{10}$ together form an unsaturated cyclic ring.

4. The catalyst of paragraph 3, wherein the unsaturated cyclic ring is substituted with bromo or phenyl which may be substituted or unsubstituted.

5. The catalyst of any of paragraphs 1 to 4, wherein $R^4$ is selected from aryl, alkyl, bromo, chloro, fluoro or —$R^\#$—$SiR'_3$, where $R^\#$ is $C_1$-$C_{10}$ alkyl and $R'$ is halogen, $C_1$-$C_{10}$ alkyl or $C_6$-$C_{10}$ aryl.

6. The catalyst of any of paragraphs 1 to 5, wherein $R^{12}$ is $C_1$-$C_{20}$ unsubstituted hydrocarbyl or —$R^\#$—$SiR'_3$, where $R^\#$ is $C_1$-$C_{10}$ alkyl and $R'$ is halogen, $C_1$-$C_{10}$ alkyl or $C_6$-$C_{10}$ aryl, preferably $R^{12}$ is butyl.

7. The catalyst of any of paragraphs 1 to 6, wherein $R^2$ is $C_1$-$C_{20}$ unsubstituted hydrocarbyl.

8. The catalyst of paragraph 7, wherein $R^2$ is methyl.

9. The catalyst of any of paragraphs 1 to 6, wherein $R^2$ is hydrogen.

10. The catalyst of paragraph 1, wherein the catalyst is represented by Formula (II):

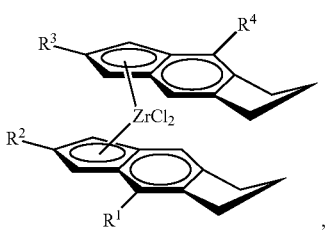

(II)

wherein:
each of $R^1$, $R^2$, $R^3$, and $R^4$ is independently halogen, $C_1$-$C_{40}$ hydrocarbyl or $C_1$-$C_{40}$ substituted hydrocarbyl, —$NR'_2$, —$SR'$, —$OR$, —$OSiR'_3$, —$PR'_2$, where each $R'$ is hydrogen, halogen, $C_1$-$C_{10}$ alkyl, or $C_6$-$C_{10}$ aryl.

11. The catalyst of paragraph 1, wherein the catalyst is selected from:

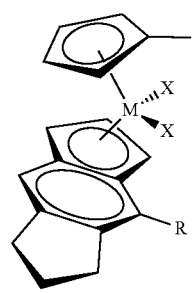

M = Zr or Hf
R = Cl, Br, Me, nPr, Ph or
Cyclopropyl
X = Cl, Br or Me

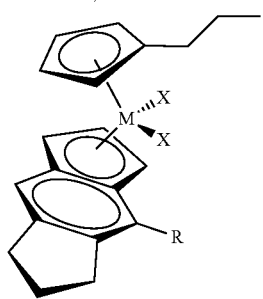

M = Zr or Hf
R = Cl, Br, Me, nPr, Ph or
Cyclopropyl
X = Cl, Br or Me

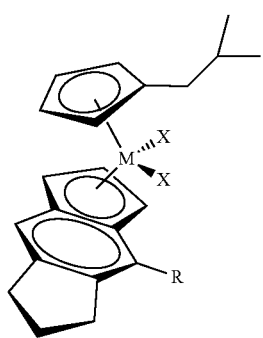

M = Zr or Hf
R = Cl, Br, Me, nPr, Ph or
Cyclopropyl
X = Cl, Br or Me

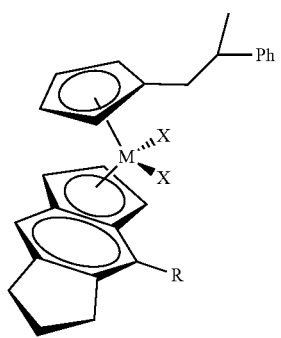

M = Zr or Hf
R = Cl, Br, Me, nPr, Ph or
Cyclopropyl
X = Cl, Br or Me

-continued

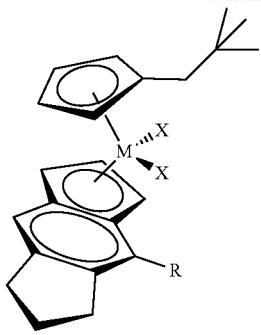

M = Zr or Hf
R = Cl, Br, Me, nPr, Ph or
Cyclopropyl
X = Cl, Br or Me

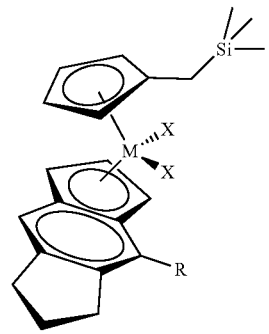

M = Zr or Hf
R = Cl, Br, Me, nPr, Ph or
Cyclopropyl
X = Cl, Br or Me

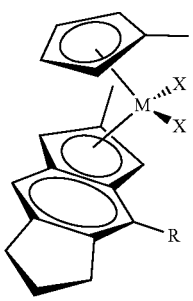

M = Zr or Hf
R = Cl, Br, Me, nPr, Ph or
Cyclopropyl
X = Cl, Br or Me

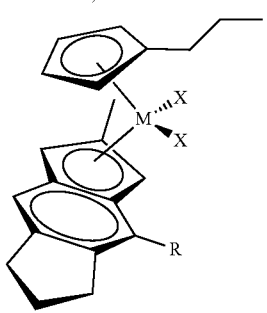

M = Zr or Hf
R = Cl, Br, Me, nPr, Ph or
Cyclopropyl
X = Cl, Br or Me

-continued

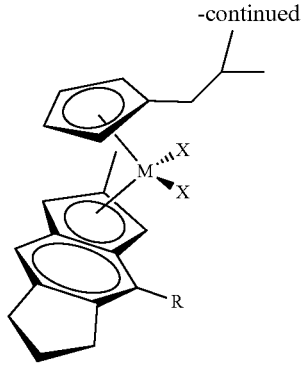

M = Zr or Hf
R = Cl, Br, Me, nPr, Ph or
Cyclopropyl
X = Cl, Br or Me

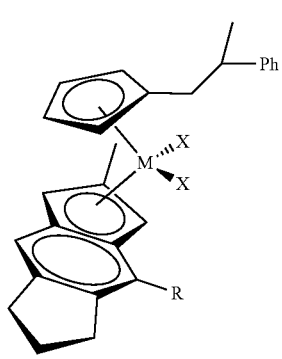

M = Zr or Hf
R = Cl, Br, Me, nPr, Ph or
Cyclopropyl
X = Cl, Br or Me

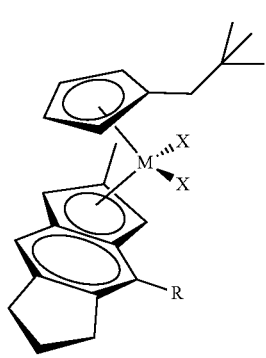

M = Zr or Hf
R = Cl, Br, Me, nPr, Ph or
Cyclopropyl
X = Cl, Br or Me

-continued

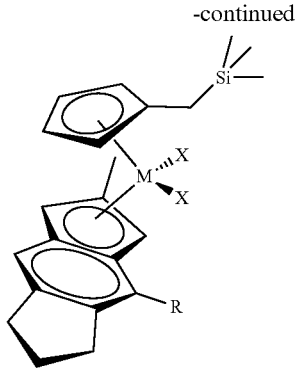

M = Zr or Hf
R = Cl, Br, Me, nPr, Ph or
Cyclopropyl
X = Cl, Br or Me

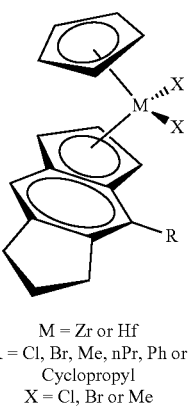

M = Zr or Hf
R = Cl, Br, Me, nPr, Ph or
Cyclopropyl
X = Cl, Br or Me

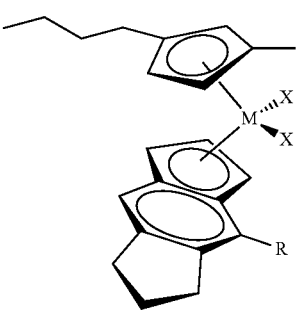

M = Zr or Hf
R = Cl, Br, Me, nPr, Ph or
Cyclopropyl
X = Cl, Br or Me

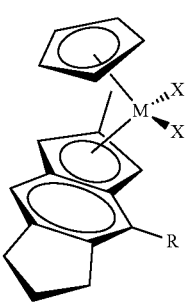

M = Zr or Hf
R = Cl, Br, Me, nPr, Ph or
Cyclopropyl
X = Cl, Br or Me

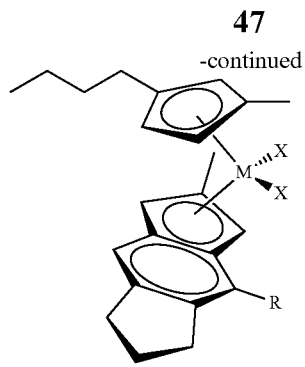
M = Zr or Hf
R = Cl, Br, Me, nPr, Ph or Cyclopropyl
X = Cl, Br or Me
12. The catalyst of paragraph 1, wherein the catalyst is selected from:
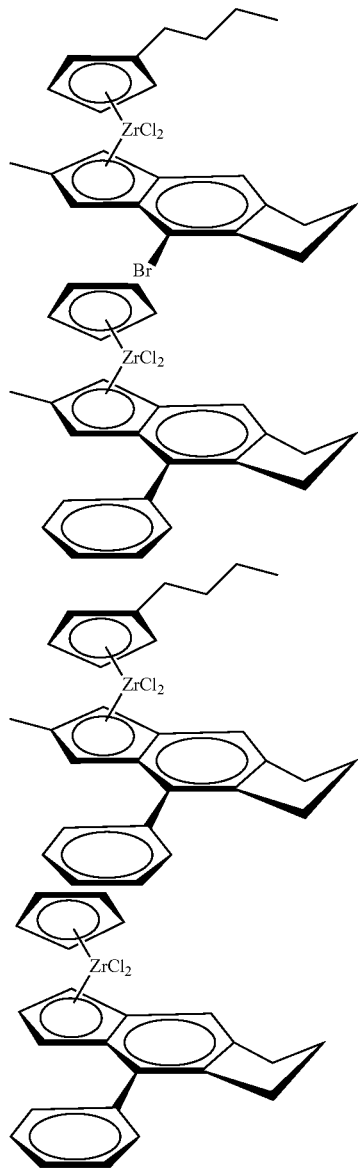
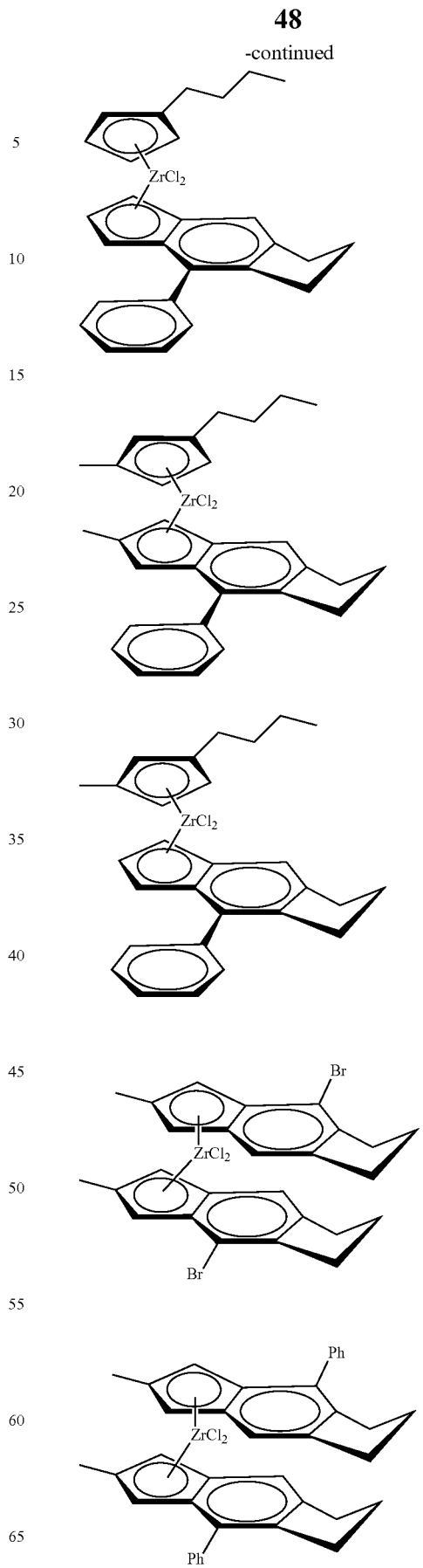

-continued
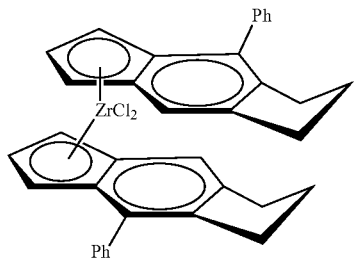
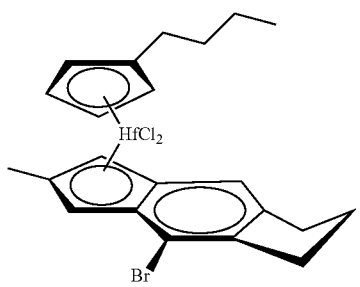
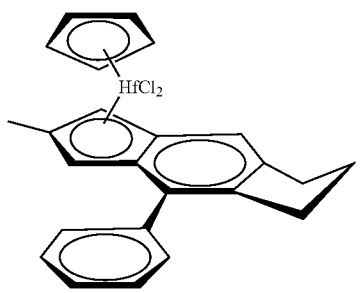
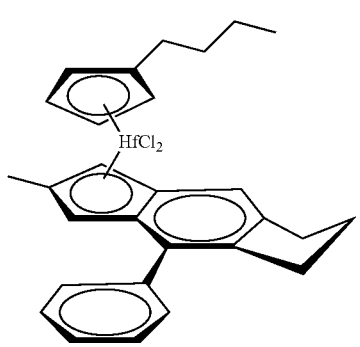
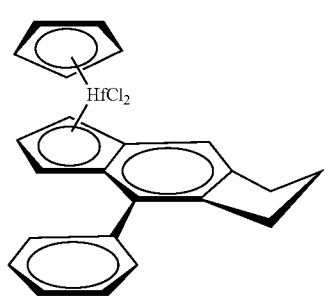
-continued
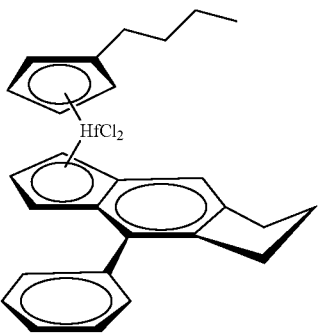
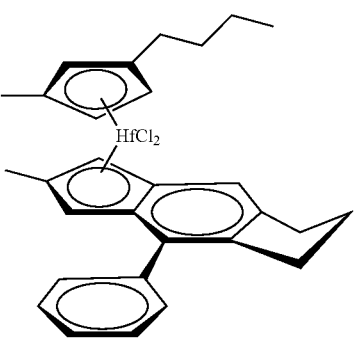
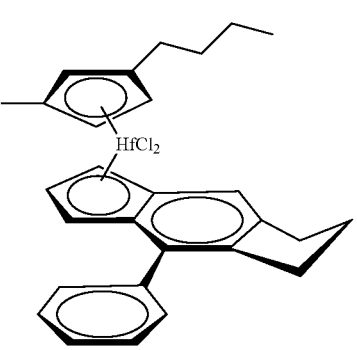
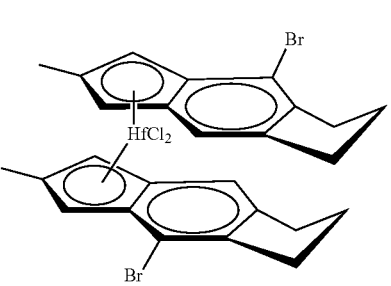
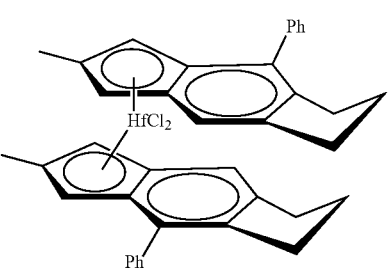

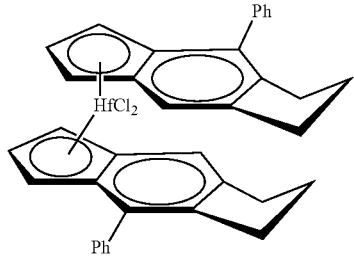
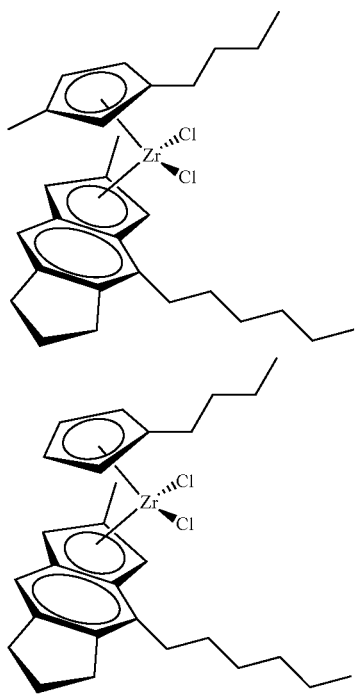
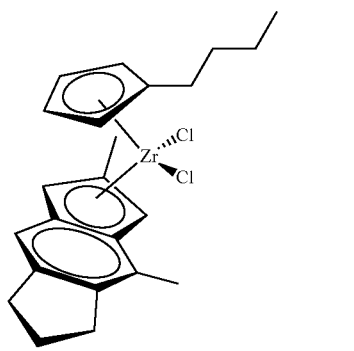
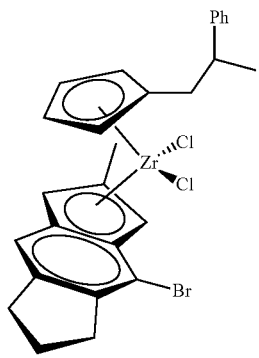
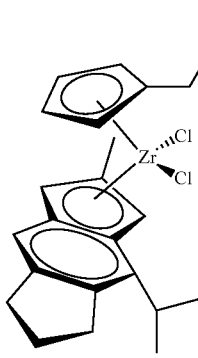
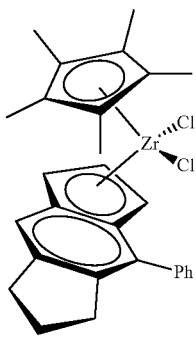
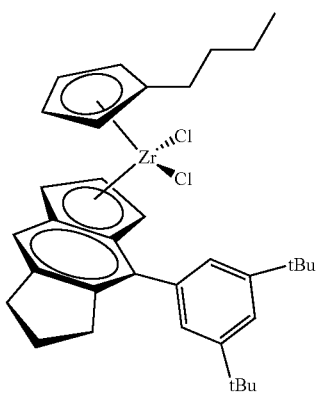
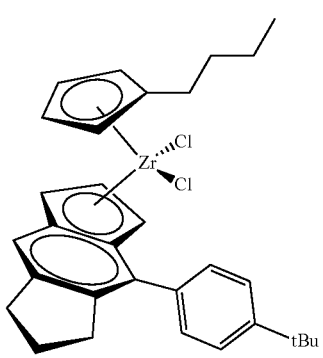

-continued
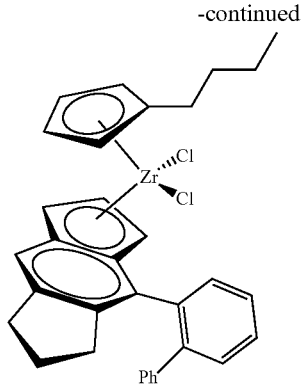
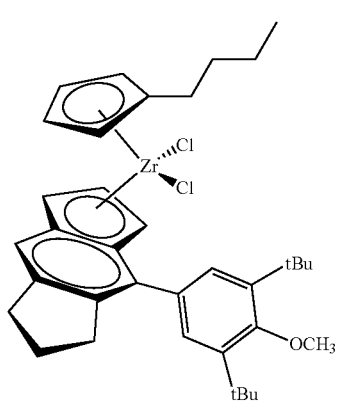
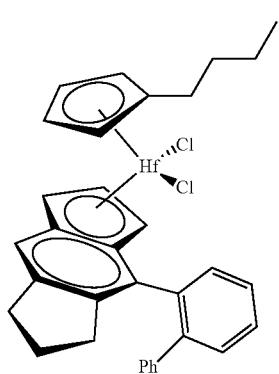
-continued
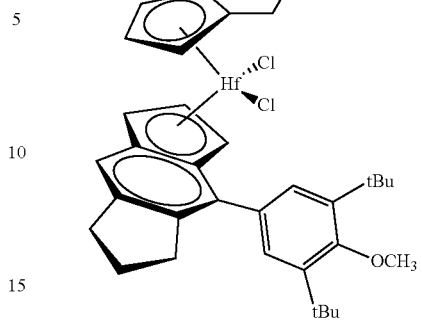
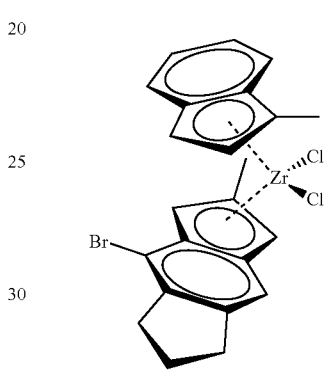
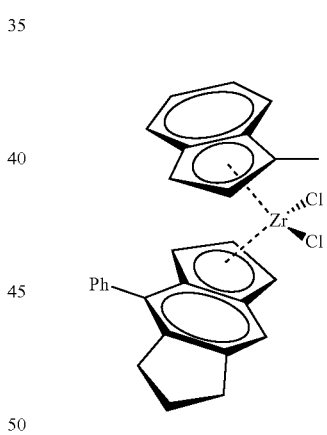
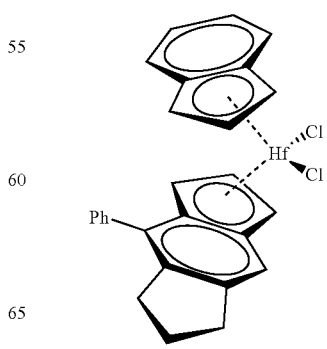

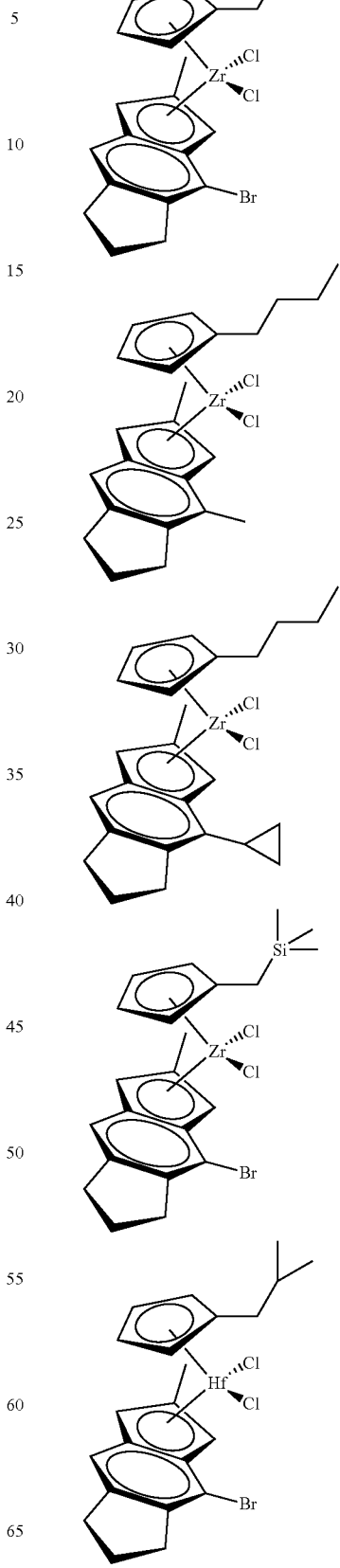

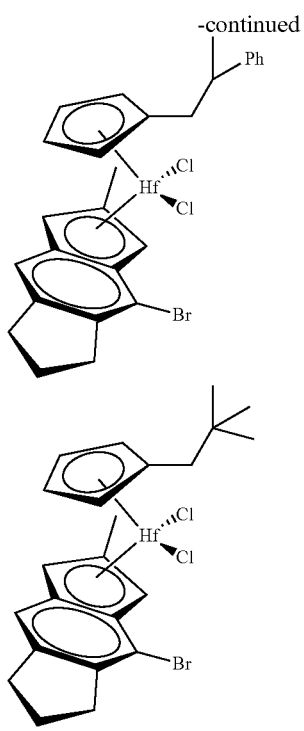

13. A catalyst system comprising: a catalyst of any of paragraphs 1 to 12; a support material; and an activator.
14. The catalyst system of paragraph 13, wherein the support material is selected from the group consisting of silica, alumina, silica-alumina, zirconia, and combinations thereof.
15. The catalyst system of paragraphs 13 or 14, wherein the activator comprises alumoxane or a non-coordinating anion.
16. The catalyst system of any of paragraphs 14 to 15, wherein the activator is methylalumoxane.
17. The catalyst system of any of paragraphs 13 to 16, wherein the support is a silica aluminate and comprises an electron withdrawing anion such as fluoride or sulphate.
18. The catalyst system of any of paragraphs 13 to 17, wherein the support is treated with an alkyl aluminum.
19. The catalyst system of any of paragraphs 13 to 18, wherein the catalyst represented by formula (I) is present in the catalyst system as at least two isomers.
20. The catalyst system of any of paragraphs 13 to 19 wherein the support is silica.
21. The catalyst system of any of paragraphs 13 to 20, wherein the activator is one or more of: N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH+][B(C$_6$F$_5$)$_4$$^-$], 1-(4-(tris(pentafluorophenyl)borate)-2,3,5,6-tetrafluorophenyl) pyrrolidinium, 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, 4-(tris(pentafluorophenyl)borate)-2,3,5,6-tetrafluoropyridinium, sodium tetrakis(perfluorophenyl)aluminate, potassium terakis(pentafluorophenyl), and N,N-dimethylanilinium tetrakis(perfluorophenyl)aluminate.
22. A process for polymerization of olefin monomers comprising contacting one or more olefin monomers with a catalyst system of any of paragraphs 13 to 21.
23. The process of paragraph 22, wherein polymerization of the olefin monomers forms linear low density polyethylene.
24. A process for the production of an ethylene alpha-olefin copolymer comprising: polymerizing ethylene and at least one alpha-olefin by contacting the ethylene and the at least one alpha-olefin with a catalyst system of any of paragraphs 13 to 21 in at least one gas phase reactor at a reactor pressure of from 0.7 to 70 bar and a reactor temperature of from 20° C. to 150° C. to form an ethylene alpha-olefin copolymer.
25. An ethylene alpha-olefin copolymer obtained by contacting ethylene, at least one alpha-olefin, and a catalyst system of any of paragraphs 13 to 21 in at least one gas-phase reactor, the copolymer having a density of 0.890 g/cc or more, a melt flow index from 0.1 to 80 g/10 min, and a Mw/Mn of 2 to 15.
26. An ethylene alpha-olefin copolymer obtained by contacting ethylene, at least one alpha-olefin selected from propylene, butene, pentene, hexene, heptene, octene, nonene, decene, undecene, and dodecene, and a catalyst system of any of paragraphs 13 to 21 in at least one gas-phase reactor, the copolymer having a density of 0.890 g/cc or more, a melt flow index from 0.1 to 80 g/10 min, and a Mw/Mn of 1.5 to 7.
27. The copolymer of any of paragraphs 25 to 26, wherein the copolymer has an Mw value of 50,000 to 1,000,000 g/mol.
28. A process for the production of an ethylene alpha-olefin copolymer comprising: polymerizing ethylene and at least one alpha-olefin by contacting the ethylene and the at least one alpha-olefin with a catalyst system of any of paragraphs 13 to 21 in at least one slurry phase reactor at a reactor pressure of from 0.7 to 70 bar and a reactor temperature of from 60° C. to 130° C. to form an ethylene alpha-olefin copolymer.
29. An ethylene alpha-olefin copolymer obtained by contacting ethylene, at least one alpha-olefin, and a catalyst system of any of paragraphs 13 to 21 in at least one slurry phase reactor, the copolymer having a density of 0.890 g/cc or more, a melt flow index from 0.1 to 80 g/10 min, and an Mw/Mn from 2 to 12.
30. The catalyst of paragraph 11, wherein $R^2$ and $R^3$ are hydrogen, one of the $R^1$ and $R^4$ are hydrogen, or $R^2$, $R^3$ and at least one of $R^1$ and $R^4$ are hydrogen.

Experimental

General Procedure for High Throughput Ethylene/1-hexene Polymerization and Polymer Characterization (Table 1)

Unless stated otherwise ethylene homopolymerization and ethylene-hexene copolymerizations are carried out in a parallel pressure reactor, as generally described in U.S. Pat. Nos. 6,306,658; 6,455,316; PCT Publication No. WO 00/09255; and Murphy et al., J. Am. Chem. Soc., 2003, Vol. 125, pp. 4306-4317, each of which is incorporated by reference herein in its entirety. Although specific quantities, temperatures, solvents, reactants, reactants ratios, pressures, and other variables may need to be adjusted from one reaction to the next, the following describes a typical polymerization performed in a parallel, pressure reactor.

Preparation of Catalyst Slurry for High Throughput Run

In a dry box, 45 mg of supported catalyst is weighed into a 20 mL glass vial. 15 mL of toluene is added to the vial to make a slurry that contained 3 mg supported catalyst/mL slurry. The resulting mixture is vortexed prior to injection.

Starting Material Preparations

Solvents, polymerization grade toluene and isohexane were supplied by ExxonMobil Chemical Company and thoroughly dried and degassed prior to use. Polymerization grade ethylene was used and further purified by passing it through a series of columns: 500 cc Oxyclear cylinder from Labclear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company.

TnOAl (tri-n-octylaluminum, neat) was used as a 2 mmol/L solution in toluene.

Polymerizations were conducted in an inert atmosphere (N$_2$) drybox using autoclaves equipped with an external heater for temperature control, glass inserts (internal volume of reactor=22.5 mL), septum inlets, regulated supply of nitrogen, ethylene and hexene, and equipped with disposable PEEK mechanical stirrers (800 RPM). The autoclaves were prepared by purging with dry nitrogen prior to use.

Ethylene/1-hexene Copolymerization

The reactor was prepared as described above, and then purged with ethylene. Isohexane, 1-hexene and TnOAl were added via syringe at room temperature (approx. 23° C.) and atmospheric pressure. The reactor was then brought to process temperature (85° C.) and charged with ethylene to process pressure (130 psig=896 kPa) while stirring at 800 RPM. The transition metal compound "TMC" (100 µL of a 3 mg/mL toluene slurry, unless indicated otherwise) was added via syringe with the reactor at process conditions. TnOAl was used as 200 µL of a 20 mmol/L in isohexane solution. Amounts of reagents not specified above are given in Table 1. Ethylene was allowed to enter (through the use of computer controlled solenoid valves) the autoclaves during polymerization to maintain reactor gauge pressure (+/−2 psig). Reactor temperature was monitored and typically maintained within +/−1° C. Polymerizations were halted by addition of approximately 50 psi O$_2$/Ar (5 mol % 02) gas mixture to the autoclaves for approximately 30 seconds. The polymerizations were quenched after a predetermined cumulative amount of ethylene had been added or at a maximum of 45 minutes polymerization time. In addition to the quench time for each run, the reactors were cooled and vented. The polymer was isolated after the solvent was removed in-vacuo. Yields reported include total weight of polymer and residual catalyst. The resultant polymer was analyzed by Rapid GPC to determine the molecular weight and by DSC to determine the melting point.

To determine various molecular weight related values of the high throughput samples by GPC, high temperature size exclusion chromatography was performed using an automated "Rapid GPC" system. This apparatus has a series of three 30 cm×7.5 mm linear columns, each containing PLgel 10 um, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.1-0.9 mg/mL. 250 uL of a polymer solution was injected into the system. The concentration of the polymer in the eluent was monitored using a Polymer Char IR4 detector. The molecular weights presented are relative to linear polystyrene standards and are uncorrected.

The amount of hexene incorporated in the polymers (wt %) was estimated by rapid FTIR spectroscopy on a Bruker Vertex 70 IR in reflection mode. Samples were prepared in a thin film format by evaporative deposition techniques. Weight percent hexene was obtained from the ratio of peak heights in the ranges of 1377-1382 cm$^{-1}$ to 4300-4340 cm$^{-1}$. This method was calibrated using a set of ethylene hexene copolymers with a range of known wt % hexene content.

Differential Scanning Calorimetry (DSC) measurements were performed on a TA-Q200 instrument to determine the melting point of the polymers. Samples were pre-annealed at 220° C. for 15 minutes and then allowed to cool to room temperature overnight. The samples were then heated to 220° C. at a rate of 100° C./minutes and then cooled at a rate of 50° C./min. Melting points were collected during the heating period.

Catalyst A
(n-butylCp)(2-methyl-4-phenyl-1,5,6,7-tetrahydro-s-indacenyl) ZrCl$_2$

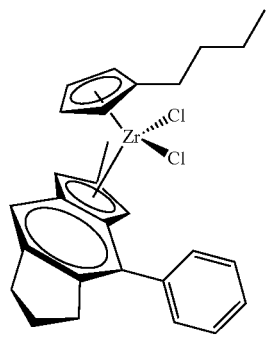

Catalyst B
(Cp)(4-phenyl-1,5,6,7-tetrahydro-s-indacenyl) ZrCl$_2$

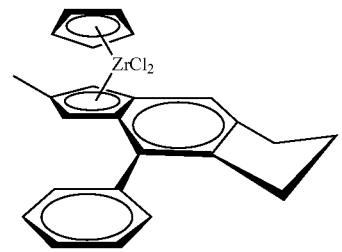

Catalyst C
(n-butylCp)(2-methyl-4-bromo-1,5,6,7-tetrahydro-s-indacenyl)ZrCl$_2$

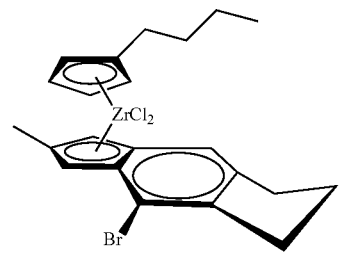

Catalyst D
bis(2-methyl-4-phenyl-1,5,6,7-tetrahydro-s-indacenyl)ZrCl₂

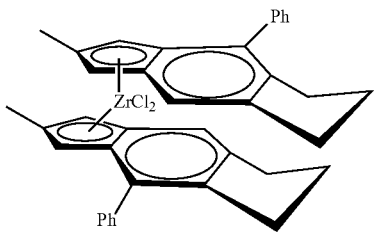

Catalyst E
(n-butylCp)(4-phenyl-1,5,6,7-tetrahydro-s-indacenyl) ZrCl₂

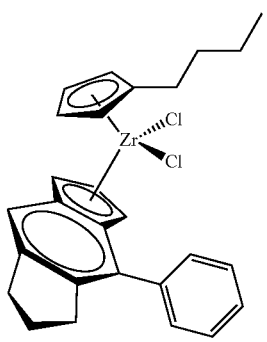

Catalyst F
bis(4-phenyl-1,5,6,7-tetrahydro-s-indacenyl)ZrCl₂

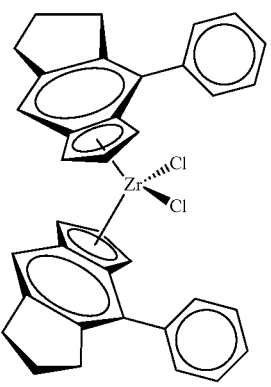

Catalyst G
(1-butyl-3-methyl-Cp)(4-phenyl-1,5,6,7-tetrahydro-s-indacenyl) ZrCl₂

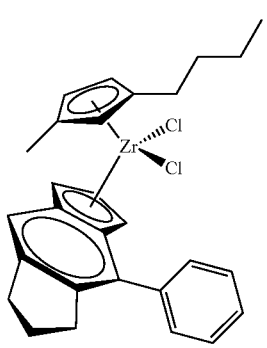

Catalyst H
(1-butyl-3-phenyl-Cp)(2-methyl-4-bromo-1,5,6,7-tetrahydro-s-indacenyl) ZrCl₂

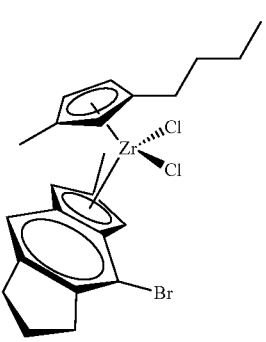

Catalyst I
(1-Methyl-Ind)(2-methyl-4-bromo-1,5,6,7-tetrahydro-s-indacenyl) ZrCl₂

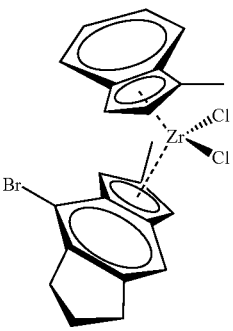

Catalyst J
(n-ButylCp)(2,4-dimethyl-1,5,6,7-tetrahydro-s-indacenyl)ZrCl₂

Comparative Catalyst Compounds:

CC1 is Bis (1-n-butyl-3-methyl-Cp)ZrCl₂, CC2 is Bis(n-propylCp)HfMe₂, and CC3 is (n-butylCp)[(2-Me-4-(3',5'-di'Bu-4'-MeO-phenyl)indenyl]ZrCl₂.

Catalyst Synthesis

All reactions were performed in an inert N₂ purged glove box unless otherwise stated. All anhydrous solvents were purchased from Sigma-Aldrich and were degassed and dried over molecular sieves prior to use. Deutrated solvents were purchased from Cambridge Isotope Laboratories and dried over molecular sieves prior to use. 2-Bromobutane, (1-bromoethyl)benzene, 2-bromopentane, 2-bromopropane, (1-bromopropan-2-yl)benzene, chlorotrimethylsilane, iodoethane, methylmagnesium bromide (3 M solution in diethyl ether), and n-butyl lithium (2.5 M solution in hexane) were purchased from Sigma-Aldrich. (nBuCp)ZrCl₃, CpZrCl₃, ZrCl₄, HfCl₄, tetrakis(dimethylamino)zirconium, and lithium cyclopentadienide were purchased from Strem Chemicals and used as received. 2-Me-4-phenyl-1,2,3,5-tetrahydro-s-indacene, 4-phenyl-1,2,3,5-tetrahydro-s-indacene and 2-Me-4-Br-1,2,3,5-tetrahydro-s-indacene were purchased from GLSyntech and used as received. The ¹H NMR measurements were recorded on a 400 MHz Bruker spectrometer.

EXPERIMENTAL

Synthesis of (Butyl-cyclopenta-2,4-dien-1-yl)(2-methyl-4-phenyl-1,5,6,7-tetrahydro-s-indacen-1-yl) Zirconium(IV) Dichloride (Catalyst A)

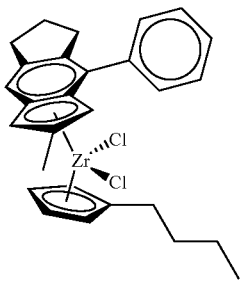

Lithium 2-Me-4-phenyl-1,5,6,7-tetrahydro-s-indacen-1-ide

To a stirring precooled solution of 2-Me-4-phenyl-1,2,3,5-tetrahydro-s-indacene (5.7 g, 23.14 mmol) in diethyl ether (60 mL), n-butyllithium (2.5M solution in hexane, 10 mL, 25 mmol) was added. The reaction was stirred at room temperature for 15 h. Volatiles were removed under a stream of nitrogen and then under high vacuum. The residue was washed with hexane (20 mL three times) and then concentrated in vacuo to afford the product containing 0.03 eq. of diethyl ether (5.85 g).

(Butyl-cyclopenta-2,4-dien-1-yl)(2-methyl-4-phenyl-1,5,6,7-tetrahydro-s-indacen-1-yl) Zirconium(IV) Dichloride To a stirring solution of (nBuCp)ZrCl$_3$ (1.25 g) in toluene (40 mL), the above lithium 2-Me-4-phenyl-1,5,6,7-tetrahydro-s-indacen-1-ide (1 g) was added. The reaction was stirred at room temperature for 19 h. The mixture was filtered and the filtrates were collected. The solution was evaporated to dryness and the solid was washed with hexane (20 mL). To the solid was added hexane (15 mL) and the mixture was stirred at r.t. (room temperature) overnight. The precipitates were collected and dried in vacuo to give the product (0.68 g). $^1$H NMR (400 MHz, CD$_2$Cl$_2$): ☐ 7.58-7.34 (m, 6H), 6.38 (m, 1H), 6.24 (m, 1H), 5.92 (m, 1H), 5.87 (m, 1H), 5.84 (m, 1H), 5.79 (m, 1H), 3.13-2.98 (m, 3H), 2.79-2.72 (m, 1H), 2.43 (m, 2H), 2.28 (s, 3H), 2.15-2.06 (m, 1H), 1.99-1.88 (m, 1H), 1.44-1.36 (m, 2H), 1.31-1.22 (m, 2H), 0.87 (t, 3H).

Synthesis of (cyclopenta-2,4-dien-1-yl)(2-methyl-4-phenyl-1,5,6,7-tetrahydro-s-indacen-1-yl) Zirconium (IV) Dichloride (Catalyst B)

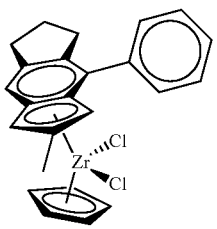

(Cyclopenta-2,4-dien-1-yl)(2-methyl-4-phenyl-1,5,6,7-tetrahydro-s-indacen-1-yl) Zirconium(IV) Dichloride To a stirring solution of CpZrCl$_3$ (0.53 g) in toluene (15 mL), the above lithium 2-Me-4-phenyl-1,5,6,7-tetrahydro-s-indacen-1-ide (0.53 g) was added. The reaction was stirred at room temperature for 24 h. The mixture was filtered and the filtrates were collected. The solution was evaporated to dryness and the solid was washed with hexane (10 mL three times). To the solid was added toluene (1 mL) and hexane (25 mL) and the mixture was stirred at r.t. overnight. The precipitates were collected and dried in vacuo to give the product containing 0.08 eq. of toluene (0.51 g). $^1$H NMR (400 MHz, C$_6$D$_6$): ☐ 7.54-7.52 (m, 2H), 7.30-7.26 (m, 2H), 7.20-7.13 (m, 2H), 6.13-6.11 (m, 2H), 5.83 (m, 5H), 2.88-2.74 (m, 2H), 2.71-2.54 (m, 2H), 2.05 (s, 3H), 1.84-1.74 (m, 1H), 1.67-1.56 (m, 1H).

Synthesis of (Butyl-cyclopenta-2,4-dien-1-yl)(2-methyl-4-bromo-1,5,6,7-tetrahydro-s-indacen-1-yl) Zirconium(IV) Dichloride (Catalyst C)

Lithium 2-Me-4-Br-1,5,6,7-tetrahydro-s-indacen-1-ide

To a stirring precooled solution of 2-Me-4-Br-1,2,3,5-tetrahydro-s-indacene (5 g, 20.07 mmol) in diethyl ether (50 mL), n-butyllithium (2.5M solution in hexane, 8.4 mL, 21 mmol) was added. The reaction was stirred at room temperature for 2 h. Volatiles were removed under a stream of nitrogen and then under high vacuum. The residue was washed with hexane (20 mL twice) and then concentrated in vacuo to afford the crude product containing 0.08 eq. of diethyl ether (5.3 g). The product was used without further purification.

(Butyl-cyclopenta-2,4-dien-1-yl)(2-methyl-4-bromo-1,5,6,7-tetrahydro-s-indacen-1-yl)zirconium(IV) Dichloride To a stirring solution of (nBuCp)ZrCl$_3$ (1.22 g) in toluene (35 mL), the above lithium 2-Me-4-Br-1,5,6,7-tetrahydro-s-indacen-1-ide (1 g) was added. The reaction was stirred at room temperature for 5 d. The mixture was filtered and the filtrates were concentrated to dryness. The residue was washed with hexane (5 mL four times) and dried in vacuo to give the product (1.14 g). $^1$H NMR (400 MHz, CD$_2$Cl$_2$): ☐ 7.31 (m, 1H), 6.40 (m, 1H), 6.25 (m, 1H), 6.09 (m, 1H), 6.03 (m, 1H), 5.91 (m, 1H), 5.85 (m, 1H), 3.08-2.98 (m, 4H), 2.48 (m, 2H), 2.32 (s, 3H), 2.15-2.07 (m, 2H), 1.46-1.39 (m, 2H), 1.34-1.25 (m, 2H), 0.89 (t, 3H).

Synthesis of Bis(2-methyl-4-phenyl-1,5,6,7-tetra-hydro-s-indacen-1-yl)zirconium(IV) Dichloride (Catalyst D)

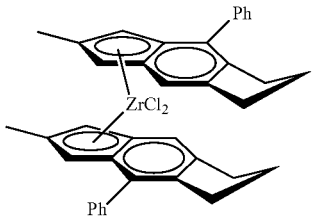

Bis(2-methyl-4-phenyl-1,5,6,7-tetrahydro-s-indacen-1-yl) Zirconium(IV) Dichloride Toluene (30 mL) was added to a solid mixture of $ZrCl_4$ (0.22 g) and the above lithium 2-Me-4-phenyl-1,5,6,7-tetrahydro-s-indacen-1-ide (0.5 g). The slurry was stirred at r.t. for 21 h. The slurry was filtered and the filtrates were concentrated to dryness. Hexane (25 mL) was added and the yellow slurry was stirred at r.t. After 20 h at r.t., the slurry was filtered. The yellow solid was collected and dried to give the product (0.43 g, two isomers in 1:1 ratio as suggested by $CH_3$—Ind groups).

$^1$H NMR (400 MHz, $C_6D_6$) of two isomers in about 1:1 ratio: ☐☐ 7.68-7.61 (m, 8H), 7.30-7.12 (m, 12H), 7.03 (s, 2H), 6.96 (s, 2H), 6.36 (s, 2H), 6.34 (s, 2H), 6.03 (s, 2H), 5.97 (s, 2H), 2.94-2.63 (m, 16H), 1.97 (s, 6H, $CH_3$—Ind of isomer 1), 1.88 (s, 6H, $CH_3$—Ind of isomer 2), 1.80 (m, 4H), 1.70 (m, 4H).

Synthesis of (Butyl-cyclopenta-2,4-dien-1-yl)(4-phenyl-1,5,6,7-tetrahydro-s-indacen-1-yl) Zirconium (IV) Dichloride (Catalyst E)

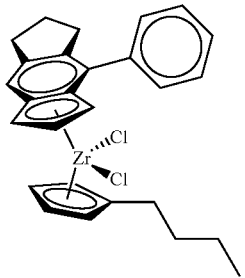

(Butyl-cyclopenta-2,4-dien-1-yl)(4-phenyl-1,5,6,7-tetrahydro-s-indacen-1-yl)zirconium(IV) Dichloride To a solid mixture of (nBuCp)$ZrCl_3$ (0.58 g) and lithium 4-phenyl-1,5,6,7-tetrahydro-s-indacen-1-ide (containing 0.053 eq. of Et2O and 0.25 eq. of hexane) (0.5 g) was added toluene (20 mL). The orange slurry was stirred at r.t. After 19 h at r.t., the mixture was concentrated to dryness. $CH_2Cl_2$ (25 mL) was used to extract the product. $CH_2Cl_2$ filtrates were concentrated to dryness. The yellow solid was washed with hexane (20 mL twice) and dried in vacuo to give crude product (0.66 g). To this crude product was added $CH_2Cl_2$ (4 mL) and hexane (30 mL) and the yellow slurry was stirred at r.t. After 2 h, the slurry was filtered. The precipitates were washed with hexane (10 mL twice) and dried in vacuo. To the solid was added hexane (8 mL) and the slurry was stirred at r.t. for 4 h. The mixture was concentrated to dryness in vacuo to give the product (0.53 g).

$^1$H NMR (400 MHz, $CD_2Cl_2$): 7.50-7.38 (m, 6H), 6.65 (m, 1H), 6.55 (m, 1H), 6.34 (m, 1H), 6.05 (m, 1H), 6.03 (m, 1H), 5.98 (m, 2H), 3.11-2.95 (m, 3H), 2.77-2.70 (m, 1H), 2.41 (m, 2H), 2.16-2.07 (m, 1H), 2.00-1.89 (m, 1H), 1.44-1.36 (m, 2H), 1.30-1.21 (m, 2H), 0.86 (t, 3H).

Synthesis of Bis(4-phenyl-1,5,6,7-tetrahydro-s-indacen-1-yl) Zirconium(IV) Dichloride (Catalyst F)

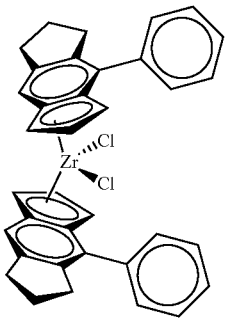

Lithium 4-phenyl-1,5,6,7-tetrahydro-s-indacen-1-ide

To a stirring solution of 4-phenyl-1,2,3,5-tetrahydro-s-indacene (1.916 g, 0.008 mol) in diethyl ether (20 mL), n-butyllithium (2.5M solution in hexane, 3.3 mL, 0.008 mol) was added. The reaction was stirred at room temperature for 65 minutes. Volatiles were removed under a stream of nitrogen and then under high vacuum. The residue was washed with hexane (10 mL) and diethyl ether (4×2 mL). The residue was then concentrated under high vacuum to afford the product as an off-white solid, containing diethyl ether (0.08 eq) and hexane (0.03 eq) (1.203 g).

Bis(4-phenyl-1,5,6,7-tetrahydro-s-indacen-1-yl) Zirconium(IV) Dichloride

A slurry of $ZrCl_4$ (0.185 g) in toluene (20 mL) was added to above lithium 4-phenyl-1,5,6,7-tetrahydro-s-indacen-1-ide (0.4 g). The orange slurry was stirred at r.t. After 20 h the mixture was filtered. The toluene filtrates were concentrated to oily residue. Hexane (20 mL) and toluene (4 mL) were added and the mixture was stirred for 5 min and concentrated to dryness again. To the residue was added hexane (25 mL) and the yellow slurry was stirred at r.t. After 2 h, the precipitates were collected on a frit, washed with hexane (10 mL) and dried in vacuo to give pale yellow solid (0.28 g, 1:1 isomer in about 1:1 ratio).

$^1$H NMR (400 MHz, $C_6D_6$) of two isomers in about 1:1 ratio: ☐☐ 7.43-7.17 (m, 24H), 6.35 (m, 2H), 6.22 (m, 4H), 6.00-5.96 (m, 4H), 5.60 (m, 2H), 2.89-2.48 (m, 16H), 1.80-1.70 (m, 4H), 1.65-1.51 (m, 4H).

Synthesis of (1-Butyl-3-methylcyclopenta-2,4-dien-1-yl)(4-phenyl-1,5,6,7-tetrahydro-s-indacen-1-yl) Zirconium(IV) Dichloride (Catalyst G)

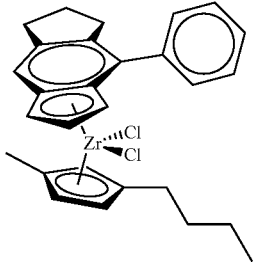

(1-Butyl-3-methylcyclopenta-2,4-dien-1-yl)(4-phenyl-1,5,6,7-tetrahydro-s-indacen-1-yl)zirconium(IV) Dichloride To a stirring solution of (1-butyl-3-methylcyclopenta-2,4-dien-1-yl)zirconium(IV) trichloride (0.733 g, 0.002 mol, as an adduct of 1,2-dimethoxyethane) in diethyl ether (20 mL), lithium 4-phenyl-1,5,6,7-tetrahydro-s-indacen-1-ide (0.456 g, 0.002 mol, 1.04 eq) was added with diethyl ether (20 mL). The reaction was stirred at room temperature for 55 minutes. Then, dichloromethane (30 mL) was added to improve solubility. The reaction was stirred at room temperature for an additional 3.5 h. Volatiles were removed under a stream of nitrogen and then under high vacuum. The residue was extracted with dichloromethane (10 mL, then 5 mL) and filtered over Celite. The combined dichloromethane extracts were concentrated under a stream of nitrogen and then under high vacuum. The dichloromethane extract was extracted with hexane. The hexane extract was partially concentrated under a stream of nitrogen, and the resulting suspension was cooled to −35° C. The precipitate was collected and concentrated under high vacuum to afford the product as an orange-yellow solid (0.268 g, 30%, in a ratio 1:1 diastereomers A and B). $^1$H NMR (400 MHz, CD$_2$Cl$_2$): □ 7.49-7.43 (m, 10H), 7.42-7.34 (m, 2H), 6.58-6.51 (m, 4H), 6.31-6.27 (m, 2H), 5.95-5.92 (m, 2H), 5.85 (t, 1H, J=2.7 Hz), 5.78 (s, 1H), 5.77 (s, 1H), 5.75 (t, 1H, J=2.6 Hz), 3.11-2.93 (m, 6H), 2.77-2.67 (m, 2H), 2.40-2.05 (m, 6H), 2.02 (s, 3H), 2.01 (s, 3H), 1.99-1.88 (m, 2H), 1.44-1.17 (m, 8H), 0.91-0.83 (m, 6H).

Synthesis of (4-bromo-2-methyl-1,5,6,7-tetrahydro-s-indacen-1-yl) (1-butyl-3-methylcyclopentadienyl) Zirconium(IV) Dichloride (Catalyst H)

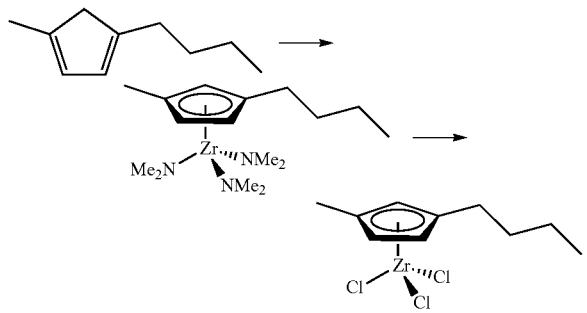

Tris(dimethylamino)(1-butyl-3-methylcyclopentadienyl)zirconium(IV)

To a stirring solution of tetrakis(dimethylamino)zirconium(IV) (1.020 g, 0.004 mol) in toluene (30 mL), 3-butyl-1-methylcyclopenta-1,3-diene (0.519 g, 0.004 mol, mixed isomers) was added, washing with toluene (10 mL). The reaction was stirred and heated to 90° C. for 29.5 h. The reaction was filtered over Celite and concentrated under high vacuum to afford the product as an orange oil (1.102 g).

(1-Butyl-3-methylcyclopentadienyl)zirconium(IV) Triichloride

To a stirring solution of tris(dimethylamino)(1-butyl-3-methylcyclopentadienyl)zirconium(IV) (1.102 g, 0.003 mol) in toluene (20 mL), chlorotrimethylsilane (2.8 mL, 0.022 mol) was added. The reaction was stirred and heated to 45° C. for 3 h. Then, 1,2-dimethoxyethane (3.2 mL, 0.031 mol) was added. The reaction was stirred and heated to 45° C. for 17 minutes. Volatiles were removed under reduced pressure to afford the product as an orange oil as a 1,2-dimethoxyethane adduct (1 eq) (1.294 g).

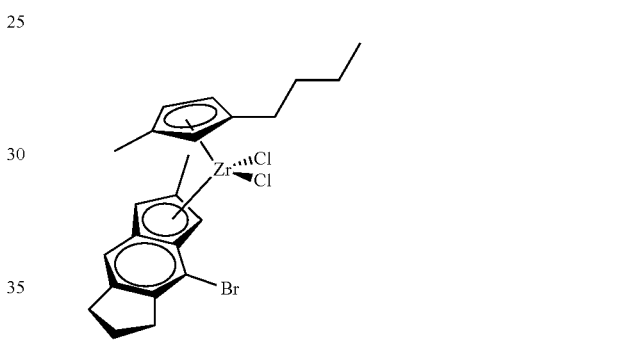

(4-bromo-2-methyl-1,5,6,7-tetrahydro-s-indacen-1-yl)(1-butyl-3-methylcyclopentadienyl) Zirconium (IV) Dichloride To a precooled, stirring solution of lithium 4-bromo-2-methyl, 1,5,6,7-tetrahydro-s-indacen-1-ide (0.499 g, 0.002 mol) in diethyl ether (50 mL), (1-butyl-3-methylcyclopentadienyl)zirconium(IV) chloride (as an adduct with 1,2-dimethoxyethane, 0.816 g, 0.002 mol) was added with diethyl ether (10 mL) and 1,2-dimethoxyethane (5 mL). The reaction was stirred at room temperature for 4 h. Volatiles were removed under a stream of nitrogen and then under high vacuum. The residue was extracted with dichloromethane and filtered over Celite. The extract was concentrated under a stream of nitrogen and then under high vacuum. The residue was extracted with pentane. The pentane extract was concentrated under a stream of nitrogen. The pentane extract was dissolved in pentane (5 mL) and cooled to −35° C., forming a yellow precipitate. The pentane was decanted while cold, and the precipitate was concentrated under high vacuum to afford the product as a yellow solid (0.202 g, 19%, 1:1.6 ratio of isomers A and B); $^1$H NMR (400 MHz, CD$_2$Cl$_2$): □ 7.28 (m, 1H isomer A, 1H, isomer B), 6.37 (m, 1H isomer A, 1H isomer B), 6.27-6.26 (m, 1H isomer B), 6.25 (m, 1H, isomer A), 5.95-5.90 (m, 2H isomer A, 2H isomer B), 5.39-5.38 (m, 1H isomer A), 5.38-5.36 (m, 1H, isomer B), 3.09-2.89 (m, 4H from isomer A, 4H from isomer B), 2.48-2.22 (m, 2H from isomer A, 2H from isomer B), 2.30 (s, 3H from isomer A, 3H from isomer B), 2.17-2.04 (m, 2H from isomer A, 2H from isomer B), 2.06 (s, 3H, isomer A), 2.02 (s, 3H, isomer B), 1.50-1.22 (m, 4H from isomer A, 4H from isomer B), 0.89 (t, 3H, J=7.2 Hz, isomer B), 0.88 (t, 3H, J=7.1 Hz, isomer A).

Synthesis of (4-Bromo-2-methyl-1,5,6,7-tetrahydro-s-indacen-1-yl)(1-methyl-1H-inden-1-yl) Zirconium (IV) Dichloride (Catalyst I)

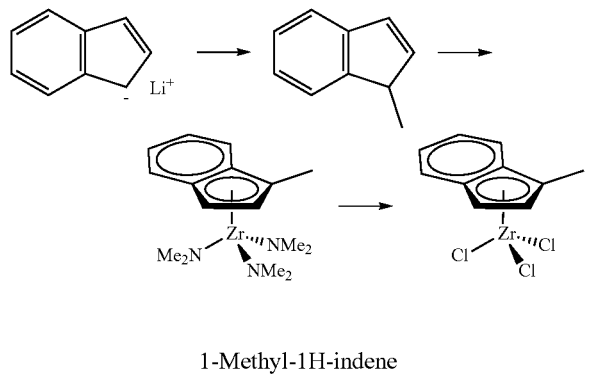

1-Methyl-1H-indene

To a precooled, stirring solution of iodomethane (4.206 g, 0.030 mol) in diethyl ether (60 mL), lithium indenide (1.235 g) was added in portions with diethyl ether (5 mL). The reaction was stirred at room temperature for 4 h. Volatiles were removed under a stream of nitrogen and then under high vacuum. The residue was extracted with hexane (20 mL) and filtered over Celite. The extract was concentrated under a stream of nitrogen and then under high vacuum. The residue was again extracted with hexane (10 mL) and filtered over Celite. The extract was concentrated under a stream of nitrogen and then under high vacuum to afford a mixture of oil and solid. The oil was filtered over Celite and concentrated under high vacuum to afford the product as a clear, colorless oil (0.397 g).

A separate manifestation is as follows: To a precooled, stirring solution of iodomethane (3.476 g, 0.024 mol) in tetrahydrofuran (90 mL), a precooled solution of lithium indenide (2.389 g, 0.020 mol) in tetrahydrofuran (20 mL) was added. The reaction was stirred at room temperature for 16.5 h. Volatiles were removed under a stream of nitrogen and then under high vacuum. The residue was extracted with hexane (40 mL) and filtered over Celite. The extract was concentrated under a stream of nitrogen and then under high vacuum. The residue was extracted again with hexane (10 mL) and filtered over Celite. The extract was concentrated under a stream of nitrogen and then under high vacuum to afford a mixture of oil and solid. The oil was separated from the solid by pipette to afford the product as a clear, colorless oil (0.972 g, mixture of isomers).

Tris(dimethylamino)(1-methyl-1H-inden-1-yl)zirconium(IV)

To a stirring solution of 1-methyl-1H-indene (0.972 g, 0.007 mol) in toluene (20 mL), tetrakis(dimethylamino) zirconium (1.997 g, 0.007 mol) was added with toluene (20 mL). The reaction was stirred and heated to 90° C. for 16 h. Volatiles were removed under high vacuum. The residue was extracted with hexane (10 mL) and filtered through a plastic fritted funnel. Volatiles were removed from the filtrate under high vacuum to afford the product as a viscous orange-red oil (2.284 g).

(1-Methyl-1H-inden-1-yl)zirconium(IV) Trichloride

To a stirring solution of tris(dimethylamino)(1-methyl-1H-inden-1-yl)zirconium(IV) (2.284 g, 0.006 mol) in toluene (50 mL), chlorotrimethylsilane (4.8 mL, 0.038 mol) was added. The reaction was stirred and heated to 45° C. Then 1,2-dimethoxyethane (6.8 mL, 0.065 mol) was added. The reaction was stirred and heated to 45° C. for 22 h. Volatiles were removed under high vacuum. Hexane (10 mL) was added to the residue to facilitate precipitation and aid in toluene removal, and volatiles were again removed under high vacuum to afford the product as an orange solid as an adduct with 1,2-dimethoxyethane (1 eq), containing diethyl ether (0.08 eq) and toluene (0.11 eq) (2.342 g).

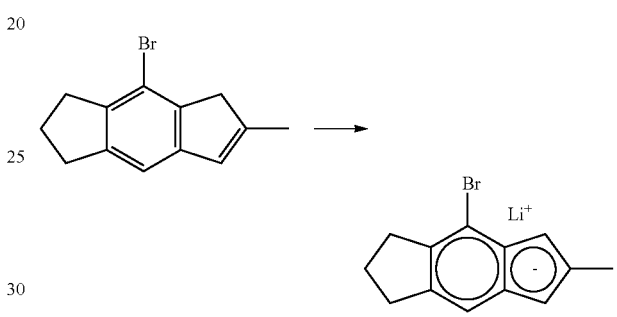

Lithium 4-bromo-2-methyl-1,5,6,7-tetrahydro-s-indacen-1-ide

To a stirring solution of 4-bromo-1,2,3,5-tetrahydro-s-indacene (1.259 g, 0.005 mol) in diethyl ether (40 mL), n-butyllithium (2.5M in hexanes, 2.1 mL, 0.005 mol, 1.04 eq) was added. The reaction was stirred at room temperature for 43 minutes. Volatiles were removed under a stream of nitrogen and then under high vacuum to afford the product as a white solid, containing diethyl ether (0.06 eq) (1.337 g).

(4-Bromo-2-methyl-1,5,6,7-tetrahydro-s-indacen-1-yl)(1-methyl-1H-inden-1-yl)zirconium(IV) Dichloride To a stirring suspension of lithium 4-bromo-2-methyl-1,5,6,7-tetrahydro-s-indacen-1-ide (0.928 g, 0.002 mol) in toluene (40 mL), (1-methyl-1H-inden-1-yl)zirconium(IV) chloride (0.553 g, 0.002 mol, 1,2-dimethoxyethane (1 eq) adduct) and toluene (10 mL) were added. The reaction was stirred at room temperature for 18 h. The reaction was filtered over Celite. Volatiles were removed from the filtrated under high vacuum. The residue was washed with hexane and then extracted with dichloromethane. The dichloromethane extract was concentrated under a stream of nitrogen and then under high vacuum. The residue was washed with cold (−35° C.) dichloromethane and concentrated to afford the product (0.278 g, 24%, 1:1 mixture of isomers); $^1$H NMR (400 MHz, CD$_2$Cl$_2$): ☐ 7.55-7.46 (m, 3H), 7.40-7.36 (m, 1H), 7.33-7.29 (m, 1H), 7.27-7.17 (m, 5H), 6.32 (dd, 1H, J=3.1, 0.7 Hz), 6.30 (dt, 1H, J=2.5 Hz, 0.7 Hz), 6.26 (dd, 1H, J=2.5, 0.6 Hz), 6.24 (dd, 1H, J=2.5, 0.6 Hz), 6.23 (dd, 1H, J=3.1, 0.9 Hz), 6.20 (ddd, 1H, J=2.5, 0.8, 0.6 Hz), 5.76 (dd, 1H, J=3.0, 0.7 Hz), 5.59 (dd, 1H, J=3.0, 0.9 Hz), 3.12-2.93 (m, 8H), 2.37 (d, 3H, J=0.5 Hz), 2.28 (d, 3H, J=0.6 Hz), 2.20 (s, 3H), 2.17 (s, 3H), 2.17-2.04 (m, 4H).

Synthesis of (2,4-Dimethyl-1,5,6,7-tetrahydro-s-indacen-1-yl)(n-butylcyclopentadienyl) Zirconium (IV) Dichloride (Catalyst J)

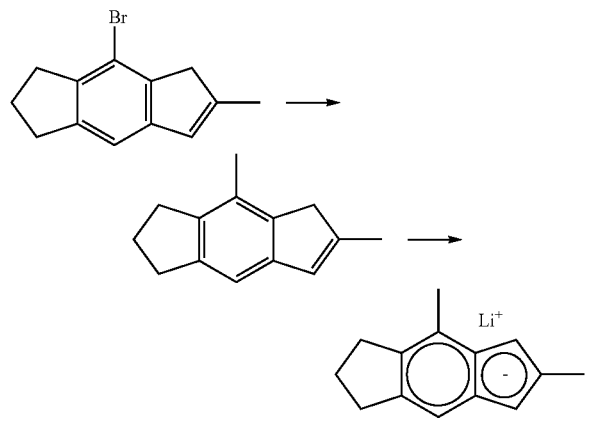

4,6-Dimethyl-1,2,3,5-tetrahydro-s-indacene (The following procedure is modified from a similar procedure described in *J. Org. Chem.*, 1984, 49(22), 4226-4237.) To a stirring solution of 4-bromo-6-methyl-1,2,3,5-tetrahydro-s-indacene (2.122 g, 0.009 mol) in diethyl ether (15 mL), dichloro(1,3-bis(diphenylphosphino)propane) nickel (0.046 g, 0.085 mmol, 0.01 eq) was added with diethyl ether (5 mL). Then, methylmagnesium bromide (3.0M in diethyl ether, 2.9 mL, 0.009 mol, 1.02 eq) was added. The reaction was stirred and heated to reflux for 22 h. The reaction was allowed to cool to room temperature. The reaction was quenched with hydrochloric acid (16% in water) and extracted with hexane (3×50 mL). The combined hexane extracts were dried with anhydrous magnesium sulfate and filtered. The dried hexane extract was concentrated under a stream of nitrogen and then under high vacuum to afford the product as a white solid (1.072 g).

Lithium 2,4-dimethyl-1,5,6,7-tetrahydro-s-indacen-1-ide

To a stirring solution of 4,6-dimethyl-1,2,3,5-tetrahydro-s-indacene (1.072 g, 0.006 mol) in diethyl ether (30 mL), n-butyllithium (2.5M in hexanes, 2.4 mL, 0.006 mol, 1.03 eq) was added. The reaction was stirred at room temperature for 72 minutes. Volatiles were removed under a stream of nitrogen and then under high vacuum to give the product as a white solid, containing diethyl ether (0.07 eq) (1.201 g).

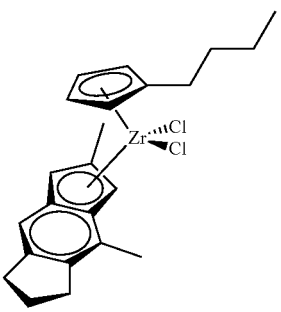

(2,4-Dimethyl-1,5,6,7-tetrahydro-s-indacen-1-yl)(n-butylcyclopentadienyl)zirconium(IV) Dichloride To a stirring slurry of lithium 2,4-dimethyl-1,5,6,7-tetrahydro-s-indacen-1-ide (1.201 g, 0.006 mol) in toluene (40 mL), n-butylcyclopentadienylzirconium(IV) chloride (1.958 g, 0.006 mol, 1 eq) was added with toluene (10 mL). The reaction was stirred at room temperature for 22 h. The reaction was filtered over Celite. The filtrate was concentrated under high vacuum and heat (30° C.). The residue was stirred in pentane (10 mL) until the mixture became a bright yellow suspension. The suspension was filtered over a frit, and the solid was washed further with pentane (2×5 mL). The solid was collected and concentrated under high vacuum to afford the product as a yellow powder (1.843 g, 64%). $^1$H NMR (400 MHz, CD$_2$Cl$_2$): ☐ 7.27 (dt, 1H, J=1.5, 0.7 Hz), 6.33 (dt, 1H, J=2.3, 0.8 Hz), 6.09 (dd, 1H, J=2.4, 0.6 Hz), 5.92-5.89 (m, 1H), 5.78-5.74 (m, 2H), 5.74-5.71 (m, 1H), 3.02-2.96 (m, 2H), 2.94-2.87 (m, 2H), 2.45 (dd, 2H, J=8.7, 6.8 Hz), 2.41 (d, 3H, J=0.9 Hz), 2.31 (d, 3H, J=0.6 Hz), 2.16-1.99 (m, 2H), 1.46-1.34 (m, 2H), 1.32-1.22 (m, 2H), 0.88 (t, 3H, J=7.3 Hz).

Synthesis of (1-(2-Phenylpropyl)cyclopenta-2,4-dien-1-yl)(4-bromo-2-methyl-1,5,6,7-tetrahydro-s-indacenyl) Zirconium(IV) Dichloride

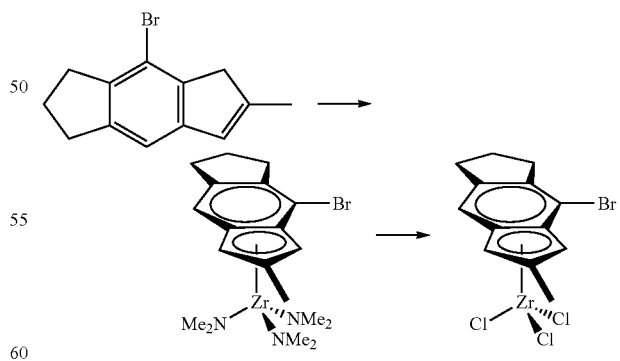

Tris(dimethylamino)(4-bromo-2-methyl-1,5,6,7-tetrahydro-s-indacen-1-yl)zirconium(IV)

To a stirring solution of tetrakis(dimethylamino)zirconium (2.603 g, 0.010 mol) in toluene (20 mL), 4-bromo-6- methyl-1,2,3,5-tetrahydro-s-indacene (2.424 g, 0.010 mol, 1 eq) was added with toluene (10 mL). The reaction was stirred and heated to 90° C. for 3 h. The reaction was allowed to cool while volatiles were removed under high vacuum to afford the product as an amber oil (4.531 g).

(4-Bromo-2-methyl-1,5,6,7-tetrahydro-s-indacenyl) zirconium(IV) Trichloride 1,2-dimethoxyethane Adduct To a stirring solution of tris(dimethylamino)(4-bromo-2-methyl-1,5,6,7-tetrahydro-s-indacenyl)zirconium(IV) (4.531 g, 0.010 mol) in toluene (40 mL), chlorotrimethylsilane (8.5 mL, 0.067 mol, 6.97 eq) was added. The reaction was stirred and heated to 45° C. for 3 h. Then, 1,2-dimethoxyethane (10 mL, 0.096 mol, 10.01 eq) was added. The reaction was stirred and heated at 45° C. for 4.5 h. Volatiles were removed under high vacuum and heat (45° C.) to give a brown oil. The oil was stirred in pentane (20 mL), leading to the precipitation of a yellow solid. The solid was concentrated under high vacuum to afford the product as a yellow solid containing toluene (0.11 eq) and pentane (0.05 eq) (4.939 g).

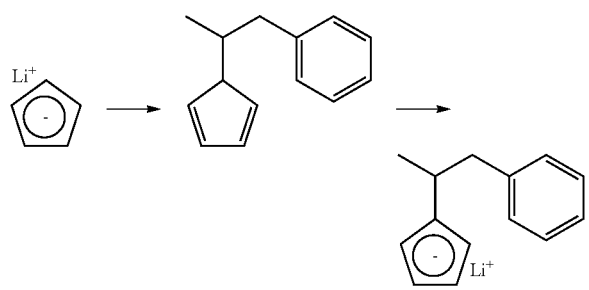

(1-(Cyclopenta-2,4-dien-1-yl)propan-2-yl)benzene

To a precooled, stirring solution of (1-bromopropan-2-yl) benzene (1.049 g, 0.005 mol, 1 eq) in tetrahydrofuran (10 mL), a precooled solution of lithium cyclopentadienide (0.380 g, 0.005 mol) in tetrahydrofuran (10 mL) was added. The reaction was stirred and heated to 60° C. for 15 h. Volatiles were removed under a stream of nitrogen and then under high vacuum. The residue was extracted with pentane (2×10 mL) and filtered over Celite. The combined pentane extracts were concentrated under a stream of nitrogen and then under high vacuum to afford the product as a mixture with unidentified impurities (0.955 g). The product was used without further purification.

Lithium 1-(2-phenylpropyl)cyclopenta-2,4-dien-1-ide

To a precooled, stirring solution of (1-(cyclopenta-2,4-dien-1-yl)propan-2-yl)benzene (0.955, 0.005 mol) in diethyl ether (30 mL), n-butyllithium (2.5M in hexanes, 2.1 mL, 0.005 mol, 1.01 eq) was added. The reaction was stirred at room temperature for 1 h. Volatiles were removed under a stream of nitrogen and then under high vacuum. The residue was washed with a mixture of hexane (10 mL) and pentane (10 mL) and then concentrated under high vacuum to afford a red-orange foam as a mixture of the product with an unknown impurity (0.535 g).

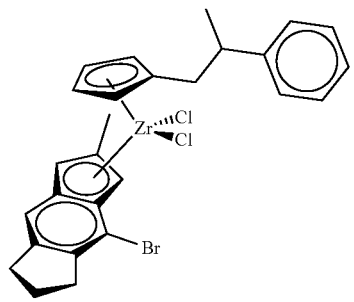

(1-(2-Phenylpropyl)cyclopenta-2,4-dien-1-yl)(4-bromo-2-methyl-1,5,6,7-tetrahydro-s-indacenyl) zirconium(IV) Dichloride To a stirring suspension of (4-bromo-2-methyl-1,5,6,7-tetrahydro-s-indacenyl)zirconium(IV) chloride (as an adduct with 1,2-dimethoxyethane, 0.392 g, 0.713 mmol) in toluene (10 mL), lithium 1-(2-phenylpropyl)cyclopenta-2,4-dien-1-ide (0.142 g, 0.747 mmol, 1.05 eq) was added with toluene (10 mL). The reaction was stirred at room temperature for 18.5 h. The reaction was filtered over Celite. The toluene extract was concentrated under high vacuum with heat (30° C.). The residue was stirred in hexane (10 mL). The resulting suspension was concentrated under high vacuum to give a yellow solid. The solid was washed with hexane and concentrated under high vacuum to afford the product as a yellow solid, containing diethyl ether (0.03 eq) and hexane (0.14 eq) (0.313 g, 72%, 1:1.1 ratio of diastereomers). $^1$H NMR (400 MHz, $C_6D_6$): □ 7.29-7.20 (m, 6H), 7.18-7.12 (m, 2H), 7.11-7.05 (m, 4H), 6.40-6.35 (m, 2H), 6.22-6.18 (m, 2H), 6.05 (dt, 1H, J=3.1, 2.3 Hz), 6.02 (td, 1H, J=3.1, 2.3 Hz), 5.95 (td, 1H, J=3.1, 2.3 Hz), 5.85 (q, 1H, J=2.6 Hz), 5.78-5.74 (m, 2H), 5.69 (td, 1H, J=3.1, 2.3 Hz), 5.52 (dt, 1H, J=3.1, 2.3 Hz), 3.08-2.94 (m, 8H), 2.90-2.79 (m, 2H), 2.79-2.63 (m, 4H), 2.29 (d, 3H, J=0.7 Hz), 2.28 (d, 3H, J=0.5 Hz), 2.15-2.03 (m, 4H), 1.22 (d, 3H, J=6.9 Hz), 1.21 (d, 3H, J=6.9 Hz).

Synthesis of (4-(3,5-Di-tert-butyl-4-methoxyphenyl)-2-methyl-1H-inden-1-yl)(n-butylcyclpentadienyl) Zirconium(IV) Dichloride (Catalyst CC3)

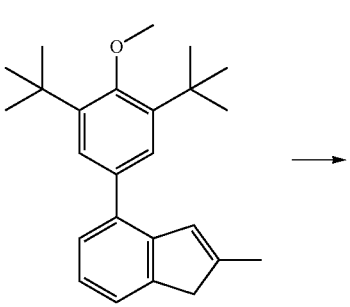

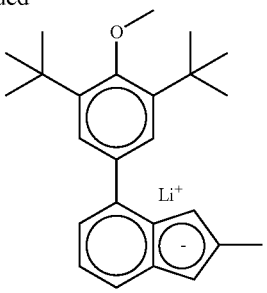

Lithium 4-(3,5-di-tert-butyl-4-methoxyphenyl)-2-methyl-1H-inden-1-ide

To a stirring solution of 4-(3,5-di-tert-butyl-4-methoxyphenyl)-2-methyl-1H-indene (0.502 g, 0.001 mol) in diethyl ether (20 mL), n-butyllithium (2.5M in hexanes, 0.6 mL, 0.002 mol, 1.04 eq) was added. The reaction was stirred at room temperature for 51 minutes. Volatiles were removed under a stream of nitrogen and then under high vacuum to afford the product as a yellow foam, containing diethyl ether (0.34 eq) and pentane (0.07 eq) (0.551 g). Note: Addition of pentane to the foam generates a gel.

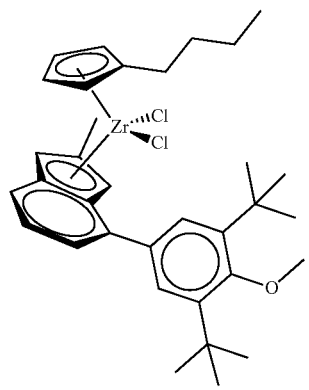

(4-(3,5-Di-tert-butyl-4-methoxyphenyl)-2-methyl-1H-inden-1-yl)(n-butylcyclpentadienyl)zirconium (IV) Dichloride To a precooled, stirring suspension of n-butylcyclopentadienylzirconium(IV) chloride (0.904 g, 2.8 mmol) in diethyl ether (10 mL), a precooled solution of lithium 4-(3,5-di-tert-butyl-4-methoxyphenyl)-2-methyl-1H-inden-1-ide (1.016 g, 2.9 mmol, 1.01 equiv) in diethyl ether (10 mL) was added over the course of 5 minutes. The reaction was stirred at room temperature for 17 h. The reaction was filtered over Celite and washed with diethyl ether (10 mL). The combined diethyl ether extracts were concentrated under a stream of nitrogen and then under high vacuum. The residue was extracted with hexane. The hexane extract began to precipitate yellow solid, so the supernatant was removed, and the yellow precipitate was washed once more with hexane to afford the product as a yellow solid (0.488 g, 27%). $^1$H NMR (400 MHz, $C_6D_6$): ☐ 7.85 (s, 2H), 7.26 (dd, 1H, J=7.0, 0.9 Hz), 7.19 (dt, 1H, J=8.5, 0.9 Hz), 6.94 (dd, 1H, J=8.5, 6.9 Hz), 6.63 (dt, 1H, J=2.3, 0.8 Hz), 6.09 (dd, 1H, J=2.3, 0.6 Hz), 5.86-5.81 (m, 1H), 5.77 (dt, 1H, J=2.8, 2.3 Hz), 5.58 (ddd, 2H, J=3.0, 2.4, 0.6 Hz), 3.42 (s, 3H), 2.61-2.54 (m, 2H), 2.16 (d, 3H, J=0.6 Hz), 1.54 (s, 18H), 1.39-1.28 (m, 2H), 1.19-1.07 (m, 2H), 0.77 (t, 3H, J=7.3 Hz).

General Supportation Procedure

For Supported Catalysts A-J and CC3:

Methylalumoxane treated silica (SMAO) prepared as follows.

In a 4 L stirred vessel in the drybox methylaluminoxane (MAO) (30 wt % in toluene) was added along with 2400 g of toluene. This solution was then stirred at 60 RPM for 5 minutes. Next, ES-70™ silica (PQ Corporation, Conshohocken, Pa.) that had been calcined at 875° C. was added to the vessel. This slurry was heated at 100° C. and stirred at 120 RPM for 3 hours. The temperature was then lowered to 25° C. and cooled to temperature over 2 hours. Once cooled, the vessel was set to 8 RPM and placed under vacuum for 72 hours. After emptying the vessel and sieving the supported MAO, 1079 g was collected.

For each sample, the desired amount of catalyst (typically, 40 mol catalyst/g SMAO) was transferred to a 20 mL glass vial. Then, toluene (about 3 g) was added. Finally, SMAO (0.5 g) was added. The contents of the vial were mixed (60-90 minutes) on a shaker. The contents of the vial were allowed to settle. The supernatant was decanted into solvent waste. If necessary, the remnants of each vial were stored in a freezer (−35° C.) until needed.

The vials were uncapped and loaded into the sample trays in a SpeedVac™. The SpeedVac was set to run at 45° C. for 45 min at 0.1 vacuum setting and run for 2-3 h. Once complete, the vials were removed, and the powder contents of each vial were poured into a separate pre-weighed 4 mL vial. The vials were capped, sealed with electrical tape, and stored in the dry box freezer for future use.

For Supported Catalysts CC2 and CC1:

Supported CC2 was made according to the general procedures described in U.S. Pat. No. 7,179,876 using (nPrCp)$_2$HfMe$_2$ and SMAO. Supported CC1 was a supported catalyst made in a manner analogous to that described in U.S. Pat. No. 6,180,736 using the (1-Me-3-$^n$BuCp)$_2$ZrCl$_2$ metallocene and Silica 948 from Grace Davison.

TABLE 1

High Throughput Ethylene Polymerization and Ethylene 1-Hexene Copolymerization Using Supported Catalysts. Conditions: 0.3 mg supported catalysts, isohexane solvent, total volume = 5 mL. Polymerization temperature ($T_p$) = 85° C., 130 psi ethylene.

| Ex | Cat | C6 (µL) | C6 wt % | Mw (Rapid GPC) | Mn (Rapid GPC) | Mw/Mn (Rapid GPC) | Tm (° C.) | time (s) | yield (g) | Activity (g pol/g cat. h) | C6 wt % (average) |
|---|---|---|---|---|---|---|---|---|---|---|---|
| 1 | A | 0 | 0.0 | 426622 | 163455 | 2.6 | 136.2 | 2352 | 0.0799 | 408 | |
| 2 | A | 60 | 2.2 | 423311 | 111597 | 3.8 | 126.2 | 2701 | 0.0557 | 248 | 2.1 |
| 3 | A | 60 | 2.1 | 404009 | 100176 | 4.0 | 126.1 | 2626 | 0.0592 | 271 | |
| 4 | A | 180 | 6.9 | 384674 | 74611 | 5.2 | 121.0 | 2700 | 0.0572 | 255 | 7.0 |

TABLE 1-continued

High Throughput Ethylene Polymerization and Ethylene 1-Hexene Copolymerization Using Supported Catalysts. Conditions: 0.3 mg supported catalysts, isohexane solvent, total volume = 5 mL. Polymerization temperature ($T_p$) = 85° C., 130 psi ethylene.

| Ex | Cat | C6 (µL) | C6 wt % | Mw (Rapid GPC) | Mn (Rapid GPC) | Mw/Mn (Rapid GPC) | Tm (° C.) | time (s) | yield (g) | Activity (g pol/g cat. h) | C6 wt % (average) |
|---|---|---|---|---|---|---|---|---|---|---|---|
| 5  | A   | 180 | 7.2  | 369674  | 86529  | 4.3 | 121.0 | 2700 | 0.058  | 258  |     |
| 6  | A   | 240 | 8.5  | 336660  | 64160  | 5.2 | 120.2 | 2700 | 0.0462 | 206  |     |
| 7  | B   | 0   | 0.0  | 687732  | 236999 | 2.9 | 135.4 | 2700 | 0.0377 | 168  |     |
| 8  | B   | 60  | 2.6  | 465078  | 134933 | 3.4 | 124.9 | 2701 | 0.0382 | 170  | 3.1 |
| 9  | B   | 60  | 3.7  | 453757  | 142610 | 3.2 | 124.6 | 1567 | 0.0346 | 266  |     |
| 10 | B   | 180 | 8.1  | 358407  | 83817  | 4.3 | 119.8 | 2701 | 0.0375 | 167  | 8.2 |
| 11 | B   | 180 | 8.3  | 332710  | 83717  | 4.0 | 119.3 | 2701 | 0.0568 | 253  |     |
| 12 | B   | 240 | 7.1  | 344106  | 103126 | 3.3 | 119.7 | 373  | 0.0117 | 377  |     |
| 13 | C   | 0   | 0.0  | 583344  | 224821 | 2.6 | 136.0 | 2217 | 0.0769 | 417  |     |
| 14 | C   | 60  | 1.3  | 445546  | 182727 | 2.4 | 124.8 | 1107 | 0.0893 | 970  | 1.2 |
| 15 | C   | 60  | 1.2  | 479329  | 227249 | 2.1 | 125.3 | 1302 | 0.0925 | 854  |     |
| 16 | C   | 180 | 5.4  | 482654  | 196787 | 2.5 | 118.6 | 812  | 0.0915 | 1355 |     |
| 17 | D   | 0   | 0.0  | 968511  | 312564 | 3.1 | 136.0 | 2700 | 0.0297 | 132  |     |
| 18 | D   | 60  | 1.2  | 564983  | 117777 | 4.8 | 128.9 | 2700 | 0.0189 | 84   | 1.4 |
| 19 | D   | 60  | 1.5  | 487107  | 95000  | 5.1 | 129.0 | 2700 | 0.0147 | 65   |     |
| 20 | D   | 180 | 5.1  | 287901  | 54249  | 5.3 | 125.6 | 2701 | 0.0133 | 59   | 4.9 |
| 21 | D   | 180 | 4.7  | 302986  | 43449  | 7.0 | 125.9 | 2700 | 0.0124 | 55   |     |
| 22 | D   | 240 | 8.0  | 226490  | 45617  | 5.0 | 124.8 | 2701 | 0.0128 | 57   |     |
| 23 | E   | 60  | 1.1  | 299064  | 128491 | 2.3 | 126.4 | 905  | 0.0942 | 1252 |     |
| 24 | E   | 180 | 4.3  | 241971  | 105803 | 2.3 | 121.0 | 604  | 0.0842 | 1675 |     |
| 25 | E   | 240 | 5.7  | 264409  | 111304 | 2.4 | 119.9 | 621  | 0.0904 | 1749 |     |
| 26 | F   | 0   | 0.0  | 428516  | 167606 | 2.6 | 135.4 | 1344 | 0.0505 | 452  |     |
| 27 | F   | 60  | 3.9  | 185128  | 64554  | 2.9 | 124.6 | 1084 | 0.0953 | 1057 |     |
| 28 | F   | 180 | 10.8 | 110594  | 29869  | 3.7 | 123.9 | 1008 | 0.1001 | 1194 |     |
| 29 | F   | 360 | 16.4 | 86061   | 19557  | 4.4 | 123.3 | 1906 | 0.1034 | 652  |     |
| 30 | G   | 0   | 0.0  | 417814  | 176183 | 2.4 | 135.6 | 1775 | 0.093  | 630  |     |
| 31 | G   | 60  | 1.2  | 263121  | 112249 | 2.3 | 127.4 | 1003 | 0.0926 | 1111 |     |
| 32 | G   | 180 | 3.9  | 218262  | 95571  | 2.3 | 122.3 | 572  | 0.0915 | 1922 |     |
| 33 | G   | 240 | 7.4  | 214764  | 95499  | 2.2 | 121.0 | 648  | 0.0946 | 1756 |     |
| 34 | G   | 300 | 6.8  | 220701  | 87682  | 2.5 | 120.2 | 712  | 0.0964 | 1628 |     |
| 35 | G   | 360 | 7.0  | 213721  | 76312  | 2.8 | 118.7 | 808  | 0.0929 | 1382 |     |
| 36 | H   | 0   | 0.0  | 589888  | 251618 | 2.3 | 135.0 | 2700 | 0.0607 | 270  |     |
| 37 | H   | 60  | 1.7  | 568097  | 276972 | 2.1 | 125.3 | 2125 | 0.0909 | 514  |     |
| 38 | H   | 60  | 1.7  | 550956  | 250382 | 2.2 | 123.9 | 1481 | 0.072  | 585  |     |
| 39 | H   | 180 | 4.4  | 503492  | 204440 | 2.5 | 118.2 | 1541 | 0.0884 | 690  |     |
| 40 | H   | 180 | 3.7  | 525829  | 178466 | 2.9 | 117.6 | 1443 | 0.0958 | 799  |     |
| 41 | H   | 240 | 5.8  | 498614  | 156738 | 3.2 | 116.1 | 2312 | 0.1026 | 534  |     |
| 42 | I   | 0   | 0.0  | 420289  | 195580 | 2.1 | 135.5 | 2701 | 0.0534 | 238  |     |
| 43 | I   | 60  | 0.5  | 383019  | 192493 | 2.0 | 128.6 | 2660 | 0.0755 | 341  |     |
| 44 | I   | 60  | 0.8  | 376204  | 188895 | 2.0 | 128.9 | 2701 | 0.0782 | 348  |     |
| 45 | I   | 180 | 3.1  | 358830  | 151378 | 2.4 | 124.3 | 2702 | 0.0812 | 361  |     |
| 46 | I   | 180 | 3.6  | 357563  | 144073 | 2.5 | 123.3 | 2700 | 0.0842 | 375  |     |
| 47 | I   | 240 | 4.6  | 329911  | 122096 | 2.7 | 122.2 | 2701 | 0.0832 | 370  |     |
| 48 | J   | 0   | 0.0  | 615164  | 207577 | 3.0 | 135.9 | 2701 | 0.0796 | 354  |     |
| 49 | J   | 60  | 3.5  | 491589  | 145723 | 3.4 | 126.3 | 2275 | 0.0907 | 479  |     |
| 50 | J   | 180 | 7.7  | 376094  | 77214  | 4.9 | 121.3 | 1649 | 0.0555 | 405  |     |
| 51 | CC1 | 0   | 0.0  | 595381  | 264421 | 2.3 | 136.4 | 2498 | 0.0887 | 427  |     |
| 52 | CC1 | 60  | 2.1  | 482338  | 223939 | 2.2 | 125.4 | 1386 | 0.0928 | 805  | 2.2 |
| 53 | CC1 | 60  | 2.4  | 462870  | 218017 | 2.1 | 125.6 | 1332 | 0.0905 | 817  |     |
| 54 | CC1 | 180 | 5.6  | 505142  | 252255 | 2.0 | 117.9 | 1001 | 0.0963 | 1157 | 5.6 |
| 55 | CC1 | 180 | 5.7  | 546395  | 289367 | 1.9 | 117.9 | 927  | 0.0975 | 1265 |     |
| 56 | CC1 | 240 | 6.8  | 588707  | 305332 | 1.9 | 115.8 | 871  | 0.0961 | 1327 | 6.5 |
| 57 | CC1 | 240 | 6.1  | 533791  | 288487 | 1.9 | 114.6 | 803  | 0.0995 | 1489 |     |
| 58 | CC2 | 0   | 0.0  | 1353958 | 659383 | 2.1 | 136.5 | 532  | 0.0948 | 2144 | 0.0 |
| 59 | CC2 | 60  | 4.2  | 1231134 | 535748 | 2.3 | 120.0 | 605  | 0.0986 | 1960 | 4.1 |
| 60 | CC2 | 60  | 4.1  | 1266190 | 609847 | 2.1 | 120.0 | 604  | 0.0906 | 1805 |     |
| 61 | CC2 | 180 | 9.9  | 1657034 | 732820 | 2.3 | 108.6 | 1165 | 0.0961 | 992  | 9.7 |
| 62 | CC2 | 180 | 9.5  | 1748845 | 752980 | 2.3 | 108.8 | 922  | 0.098  | 1279 |     |
| 63 | CC2 | 240 | 11.9 | 1681855 | 768666 | 2.2 | 109.2 | 2701 | 0.0749 | 333  |     |
| 64 | CC3 | 0   | 0.0  | 490897  | 244083 | 2.0 | 135.4 | 2700 | 0.0683 | 304  | 0.0 |
| 65 | CC3 | 60  | 2.8  | 413364  | 176824 | 2.3 | 123.9 | 1076 | 0.0861 | 962  | 2.9 |
| 66 | CC3 | 60  | 3.0  | 410065  | 198910 | 2.1 | 124.2 | 1243 | 0.0905 | 875  |     |
| 67 | CC3 | 180 | 5.2  | 434486  | 206429 | 2.1 | 117.4 | 927  | 0.0945 | 1226 |     |

Figure 2:
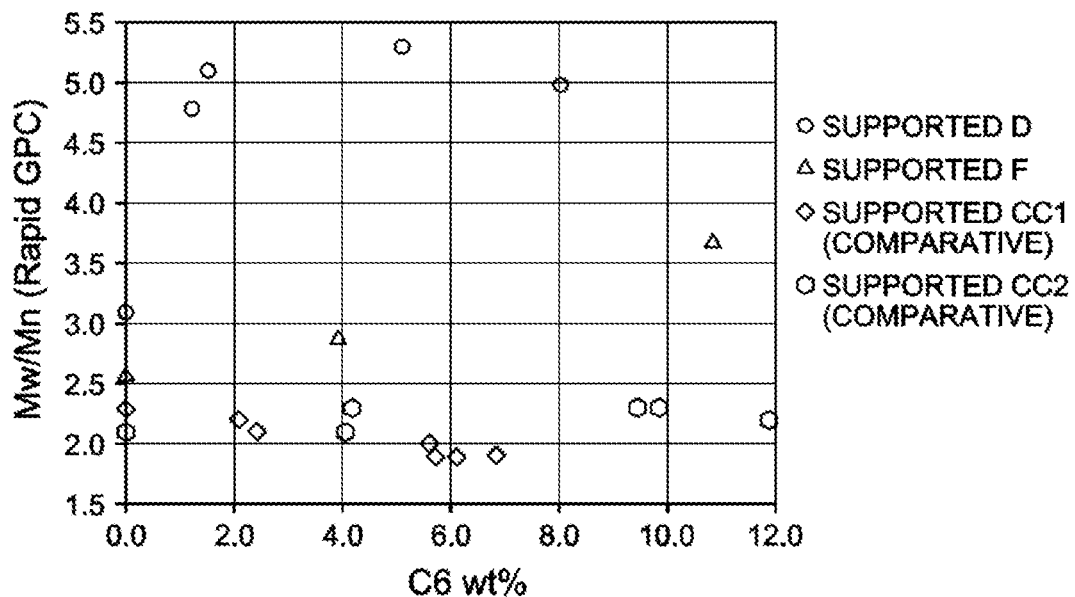
FIG. 2 is a graph comparing the polydispersity index (Mw/Mn) at various $C_6$ wt % for polymers prepared with catalysts of the present disclosure with polymers made under the same conditions prepared with comparative catalysts.
Figure 3:
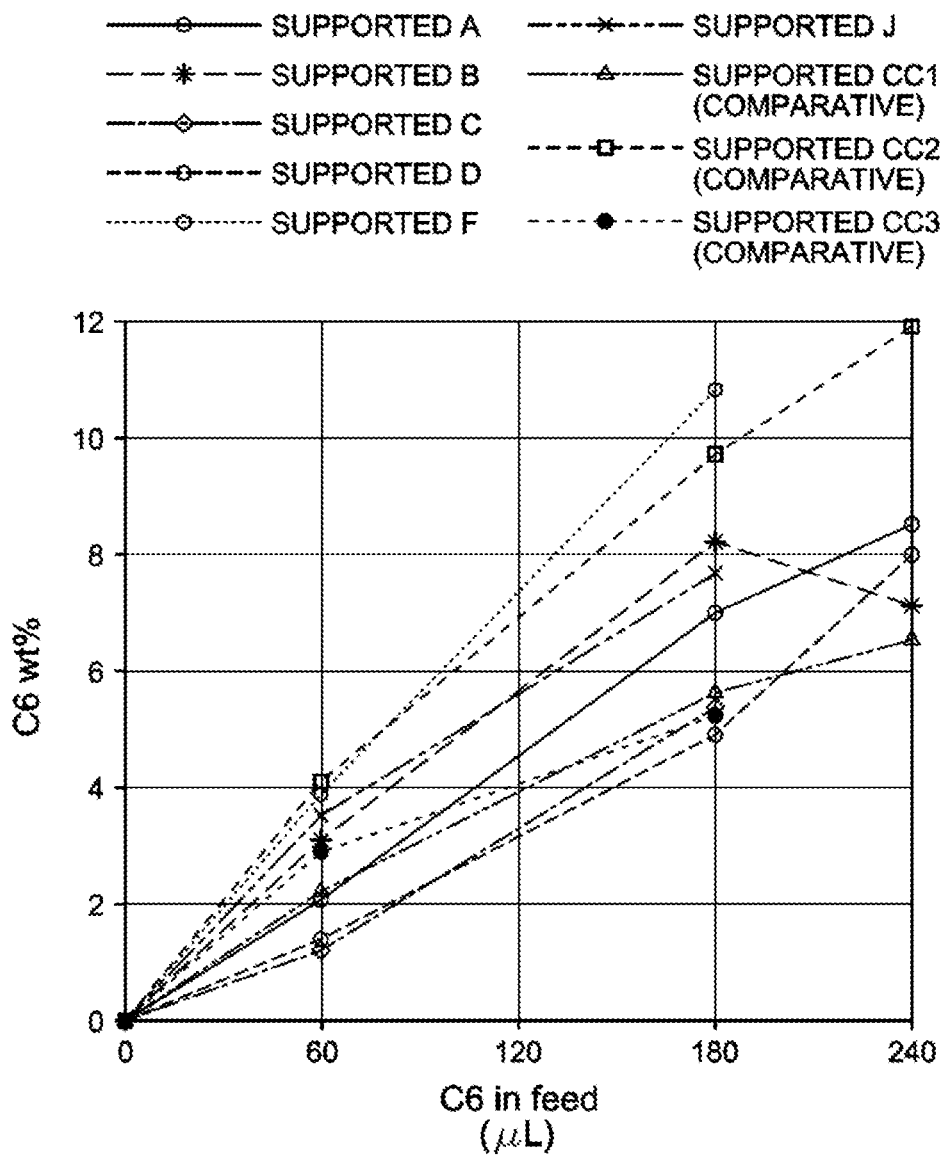
FIG. 3 is a graph comparing the comonomer incorporation at various hexene concentrations in the feed for polymers prepared with catalysts of the present disclosure with polymers made under the same conditions prepared with comparative catalysts.

As illustrated in FIG. 1, catalyst systems with unsymmetrical unbridged metallocene catalyst compounds A, B and J, featuring a combination of 4-phenyl-1,5,6,7-tetrahydro-s-indacenyl or 4-methyl-1,5,6,7-tetrahydro-s-indacenyl fragment and a Cp ligand, produced polyethylene with much broader MWD than the polyethylene made from catalyst systems with comparative catalyst systems with compounds CC1 and CC2 at similar C6 wt %. Replacing the 2-Me-4-phenyl-1,5,6,7-tetrahydro-s-indacenyl ligand in A with a 2-Me-4-(3',5'-di$^t$Bu-4'-MeO-phenyl) indenyl group (catalyst compound CC3), led to PE with narrower MWD (vs. A) under similar polymerization conditions. Furthermore, replacing the 4-Ph substituent in A with a smaller 4-Br group (catalyst compound C), reduced PE MWD as well (vs. A). As shown in FIG. 2, symmetrical unbridged metallocene bis(2-Me-4-phenyl-1,5,6,7-tetrahydro-s-indacenyl)ZrCl$_2$ (D) and bis(4-phenyl-1,5,6,7-tetrahydro-s-indacenyl)ZrCl$_2$ (F) also produced polyethylene with much broader Mw/Mn in comparison to polyethylene from symmetrical unbridged metallocene CC1 and CC2. Note that under similar conditions, catalyst systems with metallocene catalyst compounds A, B, C, D, F and J showed comparable or better 1-hexene incorporation capabilities than comparative catalyst systems with compound CC1 (FIG. 3).

Figure 4:
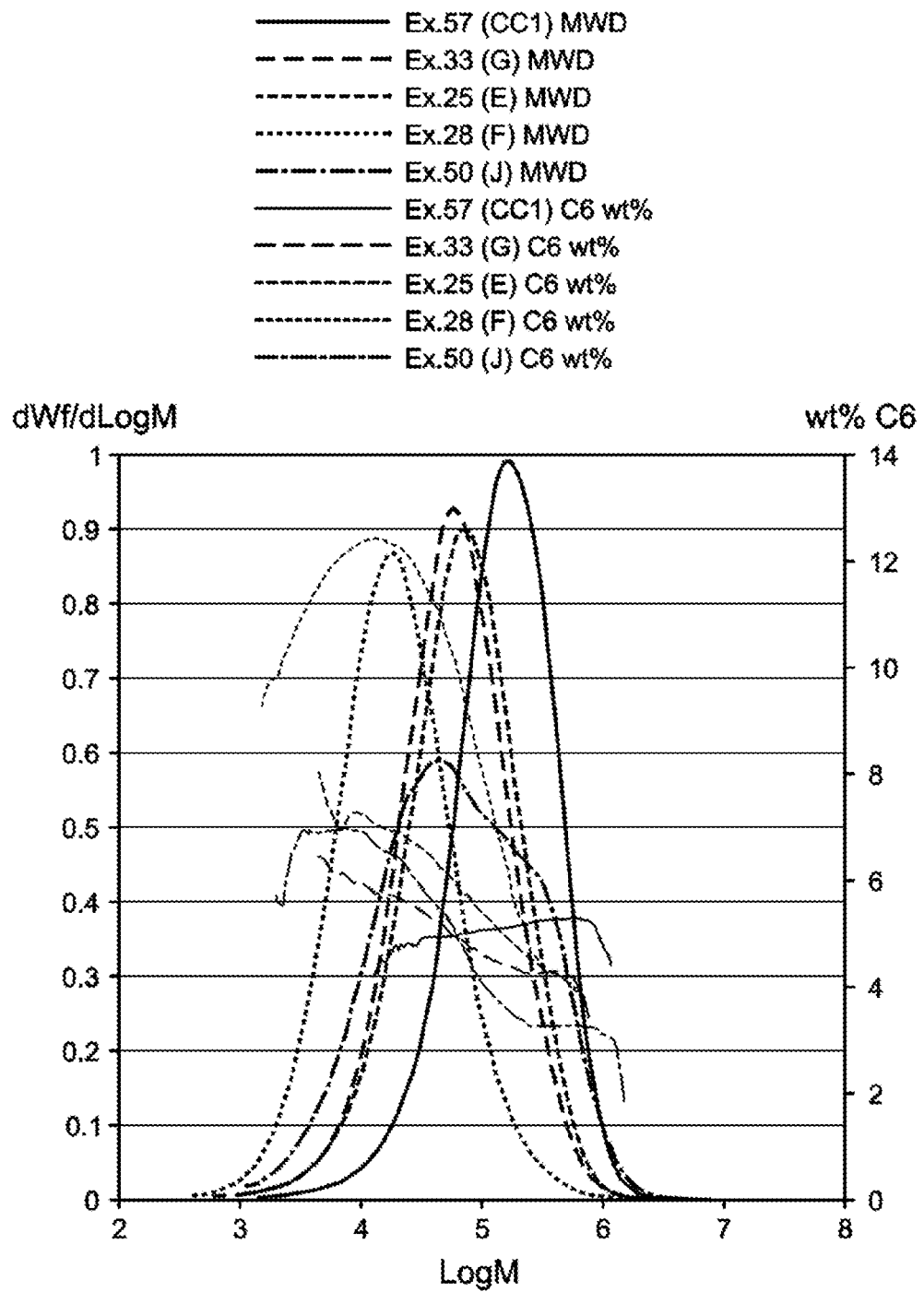
FIG. 4 is a graph comparing the GPC4D of polymers made by inventive catalysts in Ex. 25, 28, 33, and 50 with polymers made by comparative catalyst in Ex. 57.

In addition, polymers made in Ex. 25, 28, 33, 50 and 57 have been further analyzed by GPC-4D. Polymers made by inventive catalysts E, F, G, and J not only have higher Mw/Mn vs. comparative catalyst CC1, but more importantly show different types of comonomer distribution than polymers from CC1 (see FIG. 4, e.g., polymers from CC1 have similar C6 wt % at various Log M, while polymers from E, F, G and J generally show decreasing C6 wt % at increasing Log M).

| Ex. | Cat. | C6 (µL) | Mw (GPC-4D) kg/mol | Mw/Mn (GPC-4D) |
|---|---|---|---|---|
| 25 | E | 240 | 114 | 3.3 |
| 28 | F | 180 | 37 | 3.5 |
| 33 | G | 240 | 98 | 3.2 |
| 50 | J | 180 | 158 | 6.7 |
| 57 | CC1 | 240 | 226 | 2.7 |

Overall, catalyst systems of the present disclosure can provide either broader (e.g., higher) Mw/Mn (for better processability), altered polymer properties (e.g. Mw, comonomer incorporation) or altered comonomer distribution. Catalyst systems and processes of the present disclosure could potentially provide ethylene polymers having the unique properties of good processability, high stiffness etc.

All documents described herein are incorporated by reference herein, including any priority documents and/or testing procedures to the extent they are not inconsistent with this text. As is apparent from the foregoing general description and the specific embodiments, while forms of the embodiments have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," and the terms "comprising," "consisting essentially of," "consisting of" also include the product of the combinations of elements listed after the term.

We claim:
1. A catalyst represented by Formula (I):

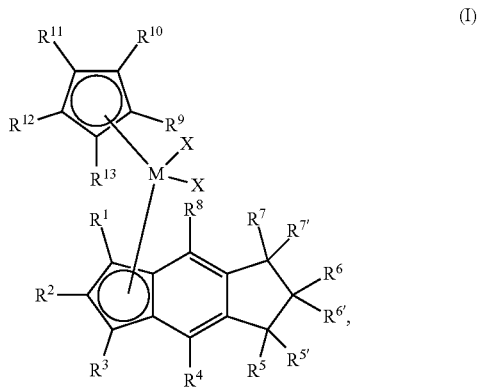

wherein:
M is a group 4 metal;
each of $R^1$, $R^2$, $R^3$, and $R^8$ is independently hydrogen, halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, or —R$^\#$—SiR'$_3$, where R$^\#$ is $C_1$-$C_{10}$ alkyl and each R' is hydrogen, halogen, $C_1$-$C_{10}$ alkyl, or $C_6$-$C_{10}$ aryl;
$R^4$ is selected from aryl, alkyl, bromo, chloro, fluoro or —R$^\#$—SiR'$_3$, where R$^\#$ is $C_1$-$C_{10}$ alkyl and R' is halogen, $C_1$-$C_{10}$ alkyl or $C_6$-$C_{10}$ aryl;
each of $R^5$, $R^{5'}$, $R^6$, $R^{6'}$, $R^7$ and $R^{7'}$ is independently hydrogen, halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, or —R$^\#$—SiR'$_3$, where R$^\#$ is $C_1$-$C_{10}$ alkyl and each R' is hydrogen, halogen, $C_1$-$C_{10}$ alkyl, or $C_6$-$C_{10}$ aryl;
each X is independently a leaving group, or two Xs are joined and bound to the metal atom to form a metallocycle ring, or two Xs are joined to form a chelating ligand, a diene, or an alkylidene; and
each of $R^9$, $R^{10}$, $R^{11}$, $R^{12}$ and $R^{13}$ is hydrogen, halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, or —R$^\#$—SiR'$_3$, where R$^\#$ is $C_1$-$C_{10}$ alkyl and where each R' is hydrogen, halogen, $C_1$-$C_{10}$ alkyl, or $C_6$-$C_{10}$ aryl, or $R^9$ and $R^{10}$ or $R^{12}$ and $R^{13}$ together form a substituted or unsubstituted 5-8 membered saturated or unsaturated cyclic ring structure,
wherein the catalyst is asymmetric.

2. The catalyst of claim 1, wherein;
M is a group 4 metal;
each of $R^1$, $R^2$, $R^3$, and $R^8$ is independently hydrogen, halogen, $C_1$-$C_{20}$ substituted or unsubstituted hydrocarbyl, halocarbyl or silylcarbyl;
each of $R^5$, $R^{5'}$, $R^6$, $R^{6'}$, $R^7$ and $R^{7'}$ is independently hydrogen or a $C_1$-$C_{10}$ alkyl;
each X is independently a leaving group, or two Xs are joined and bound to the metal atom to form a metallocycle ring, or two Xs are joined to form a chelating ligand, a diene, or an alkylidene; and
each of $R^9$, $R^{10}$, $R^{11}$, $R^{12}$ and $R^{13}$ is hydrogen or $C_1$-$C_{20}$ substituted or unsubstituted hydrocarbyl, or $R^9$ and $R^{10}$ or $R^{12}$ and $R^{13}$ together form a substituted or unsubstituted 5-8 membered saturated or unsaturated cyclic ring.

3. The catalyst of claim 1, wherein $R^9$ and $R^{10}$ together form an unsaturated cyclic ring.

4. The catalyst of claim 1, wherein $R^9$ and $R^{10}$ or $R^{12}$ and $R^{13}$ together form a substituted or unsubstituted 5-8 membered saturated or unsaturated cyclic ring and the unsaturated cyclic ring is substituted with bromo or phenyl which is optionally substituted or unsubstituted.

5. The catalyst of claim 1, wherein $R^{12}$ is $C_1$-$C_{20}$ unsubstituted hydrocarbyl or —$R^\#$—$SiR'_3$, where $R^\#$ is $C_1$-$C_{10}$ alkyl and R' is halogen, $C_1$-$C_{10}$ alkyl or $C_6$-$C_{10}$ aryl.

6. The catalyst of claim 5, wherein $R^{12}$ is butyl.

7. The catalyst of claim 1, wherein $R^2$ is $C_1$-$C_{20}$ unsubstituted hydrocarbyl.

8. The catalyst of claim 7, wherein $R^2$ is methyl.

9. The catalyst of claim 1, wherein $R^2$ is hydrogen.

10. A catalyst represented by Formula (II):

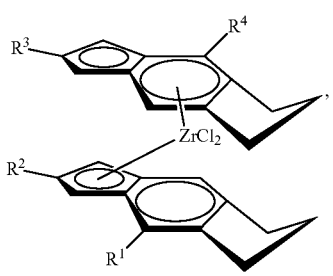

(II)

wherein:
each of $R^1$, $R^2$, $R^3$, and $R^4$ is independently halogen, $C_1$-$C_{40}$ hydrocarbyl or $C_1$-$C_{40}$ substituted hydrocarbyl, —$NR'_2$, —SR', —OR, —$OSiR'_3$, —$PR'_2$, where each R' is hydrogen, halogen, $C_1$-$C_{10}$ alkyl, or $C_6$-$C_{10}$ aryl, wherein $R^2$ and $R^3$ are optionally hydrogen.

11. A catalyst system comprising:
the catalyst of claim 1;
a support material; and
an activator.

12. The catalyst system of claim 11, wherein the support material is selected from the group consisting of silica, alumina, silica-alumina, zirconia, and combinations thereof.

13. The catalyst system of claim 11, wherein the activator comprises alumoxane or a non-coordinating anion.

14. The catalyst system of claim 11, wherein the activator is methylalumoxane.

15. The catalyst system of claim 11, wherein the support is a silica aluminate and comprises an electron withdrawing anion such as fluoride or sulphate.

16. The catalyst system of claim 11, wherein the support is treated with an alkyl aluminum.

17. The catalyst system of claim 11, wherein the catalyst represented by Formula (I) is present in the catalyst system as at least two isomers.

18. The catalyst system of claim 11, wherein the activator is one or more of: N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH+][B(C$_6$F$_5$)$_4^-$], 1-(4-(tris(pentafluorophenyl)borate)-2,3,5,6-tetrafluorophenyl) pyrrolidinium, 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, 4-(tris(pentafluorophenyl)borate)-2,3,5,6-tetrafluoropyridinium, sodium tetrakis(perfluorophenyl)aluminate, potassium terakis(pentafluorophenyl), and N,N-dimethylanilinium tetrakis(perfluorophenyl)aluminate.

19. A process for polymerization of olefin monomers comprising contacting one or more olefin monomers with a catalyst system of claim 11.

20. The process of claim 19, wherein polymerization of the olefin monomers forms linear low density polyethylene.

21. A process for the production of an ethylene alpha-olefin copolymer comprising: polymerizing ethylene and at least one alpha-olefin by contacting the ethylene and the at least one alpha-olefin with the catalyst system of claim 11 in at least one gas phase reactor at a reactor pressure of from 0.7 to 70 bar and a reactor temperature of from 20° C. to 150° C. to form an ethylene alpha-olefin copolymer.

22. A process for the production of an ethylene alpha-olefin copolymer comprising: polymerizing ethylene and at least one alpha-olefin by contacting the ethylene and the at least one alpha-olefin with the catalyst system of claim 11 in at least one slurry phase reactor at a reactor pressure of from 0.7 to 70 bar and a reactor temperature of from 60° C. to 130° C. to form an ethylene alpha-olefin copolymer.

23. The catalyst of claim 10, wherein $R^2$ and $R^3$ are hydrogen, one of the $R^1$ and $R^4$ are hydrogen, or $R^2$, $R^3$ and at least one of $R^1$ and $R^4$ are hydrogen.

24. The catalyst of claim 1, wherein the catalyst is selected from:

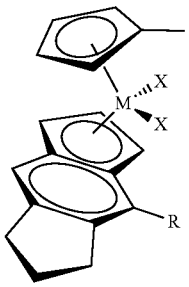

M = Zr or Hf
R = Cl, Br, Me, nPr, Ph or Cyclopropyl
X = Cl, Br or Me

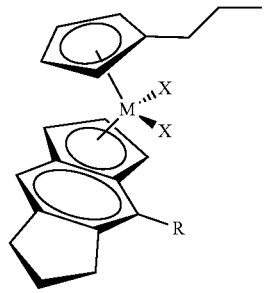

M = Zr or Hf
R = Cl, Br, Me, nPr, Ph or Cyclopropyl
X = Cl, Br or Me

-continued

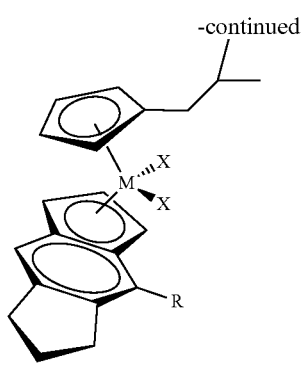

M = Zr or Hf
R = Cl, Br, Me, nPr, Ph or
Cyclopropyl
X = Cl, Br or Me

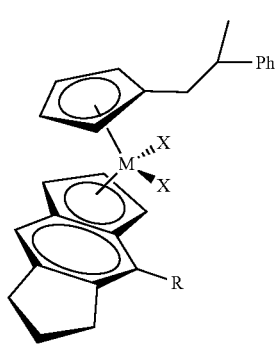

M = Zr or Hf
R = Cl, Br, Me, nPr, Ph or
Cyclopropyl
X = Cl, Br or Me

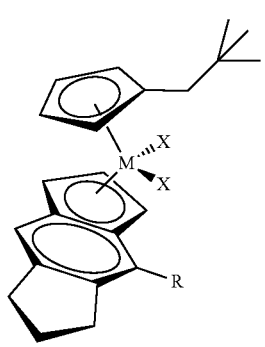

M = Zr or Hf
R = Cl, Br, Me, nPr, Ph or
Cyclopropyl
X = Cl, Br or Me

-continued

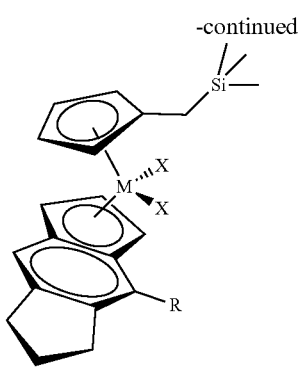

M = Zr or Hf
R = Cl, Br, Me, nPr, Ph or
Cyclopropyl
X = Cl, Br or Me

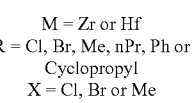
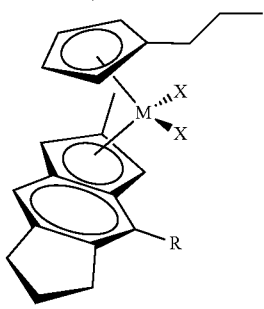

M = Zr or Hf
R = Cl, Br, Me, nPr, Ph or
Cyclopropyl
X = Cl, Br or Me

M = Zr or Hf
R = Cl, Br, Me, nPr, Ph or
Cyclopropyl
X = Cl, Br or Me

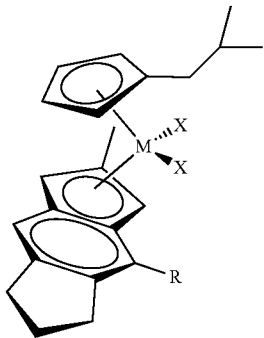

M = Zr or Hf
R = Cl, Br, Me, nPr, Ph or
Cyclopropyl
X = Cl, Br or Me

-continued

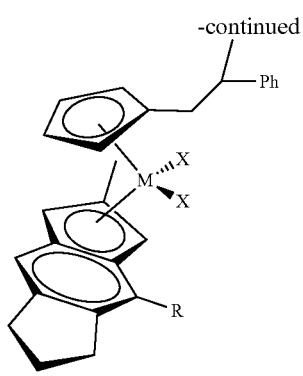

M = Zr or Hf
R = Cl, Br, Me, nPr, Ph or Cyclopropyl
X = Cl, Br or Me

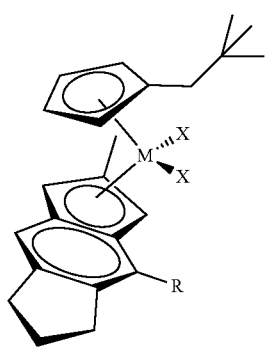

M = Zr or Hf
R = Cl, Br, Me, nPr, Ph or Cyclopropyl
X = Cl, Br or Me

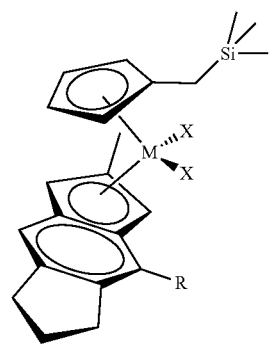

M = Zr or Hf
R = Cl, Br, Me, nPr, Ph or Cyclopropyl
X = Cl, Br or Me

-continued

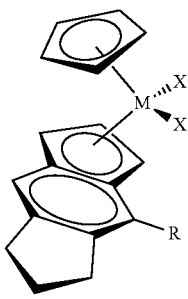

M = Zr or Hf
R = Cl, Br, Me, nPr, Ph or Cyclopropyl
X = Cl, Br or Me

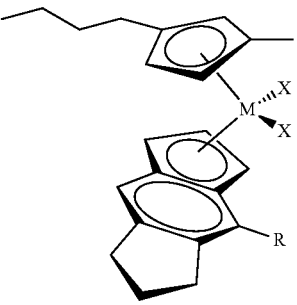

M = Zr or Hf
R = Cl, Br, Me, nPr, Ph or Cyclopropyl
X = Cl, Br or Me

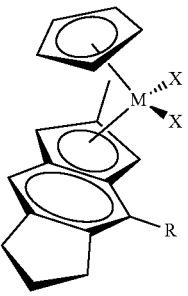

M = Zr or Hf
R = Cl, Br, Me, nPr, Ph or Cyclopropyl
X = Cl, Br or Me

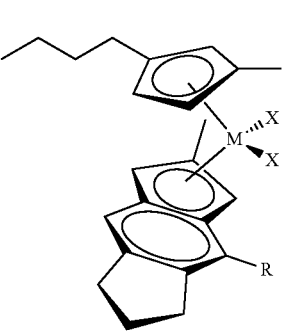

M = Zr or Hf
R = Cl, Br, Me, nPr, Ph or Cyclopropyl
X = Cl, Br or Me

25. A catalyst represented by the formula:
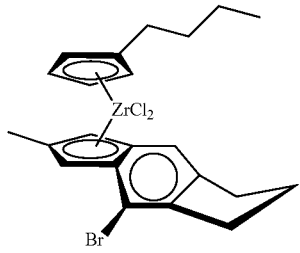
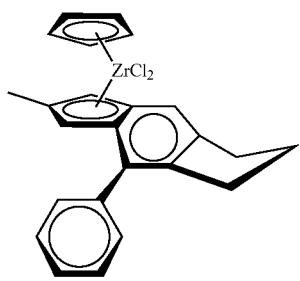
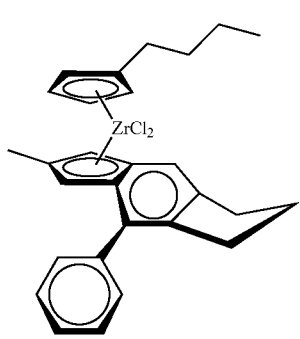
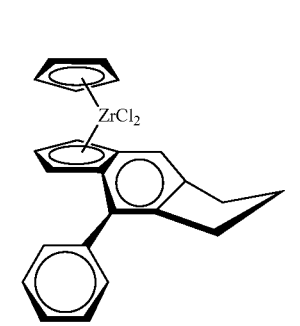
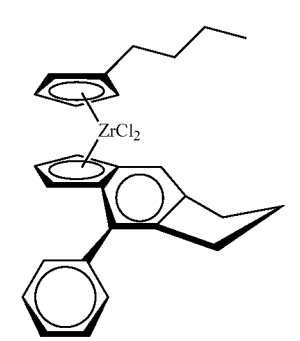
-continued
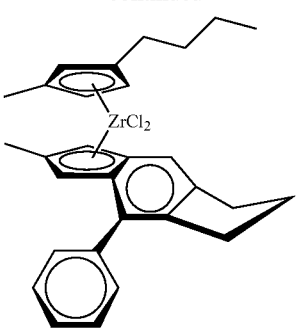
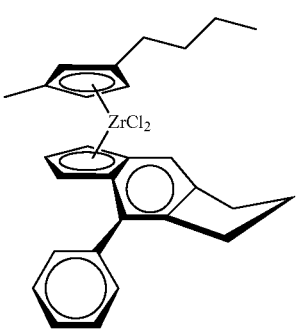
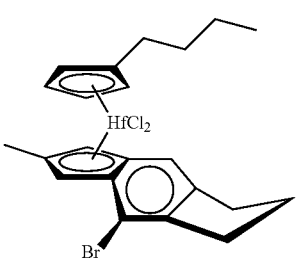
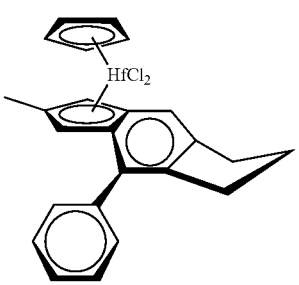
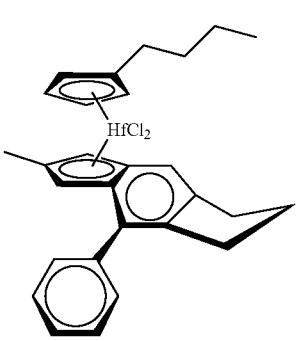

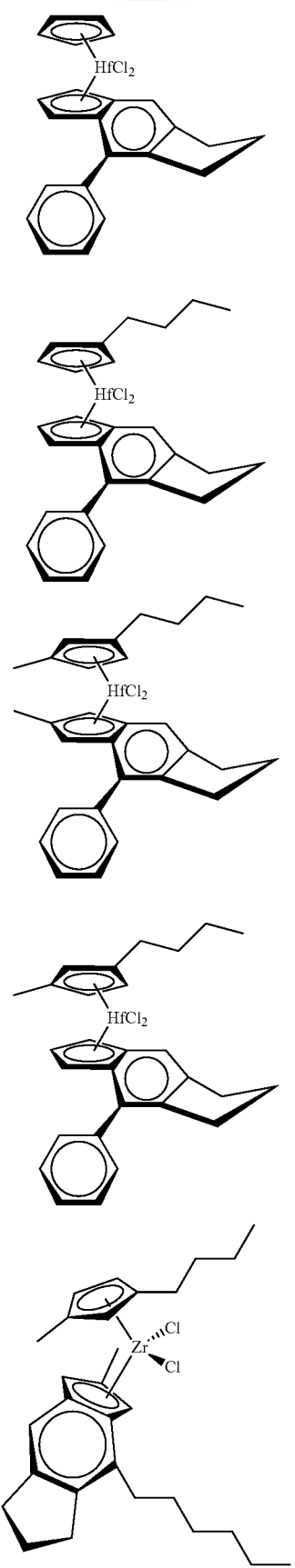
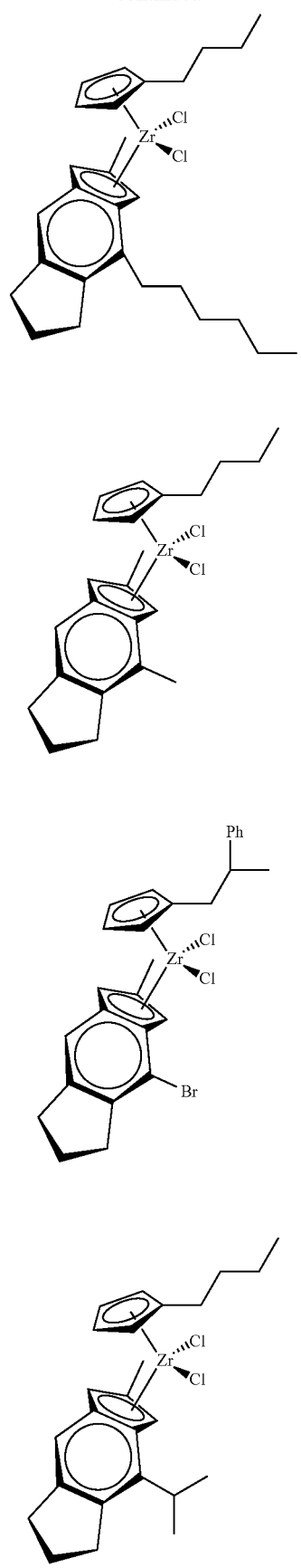

91
-continued
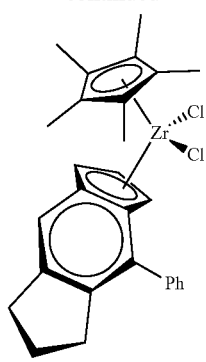
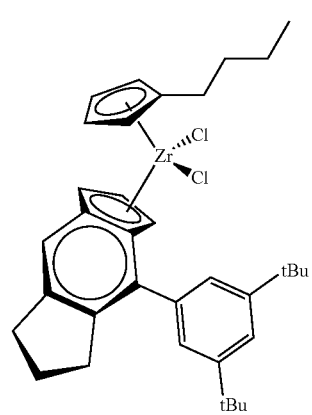
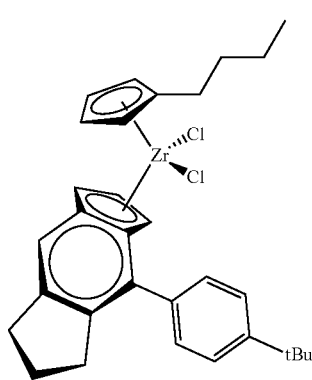
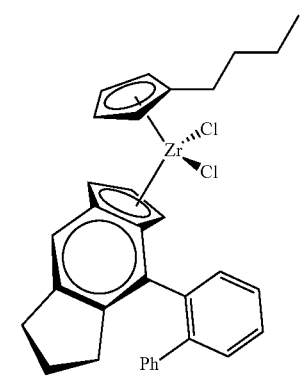
92
-continued
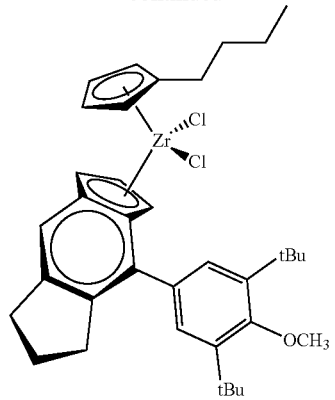
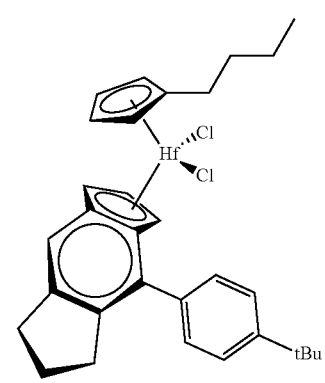
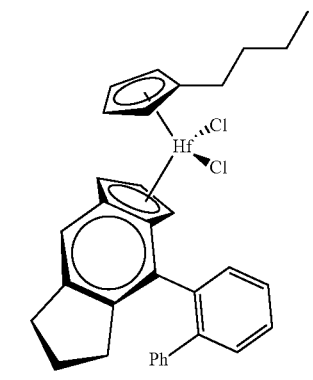
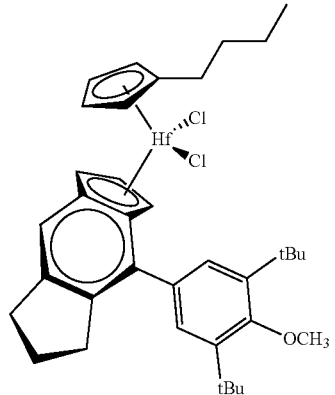

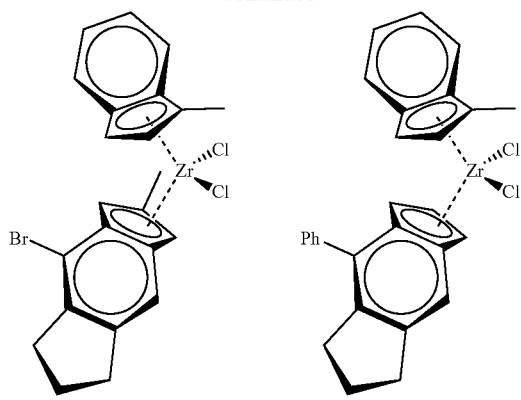
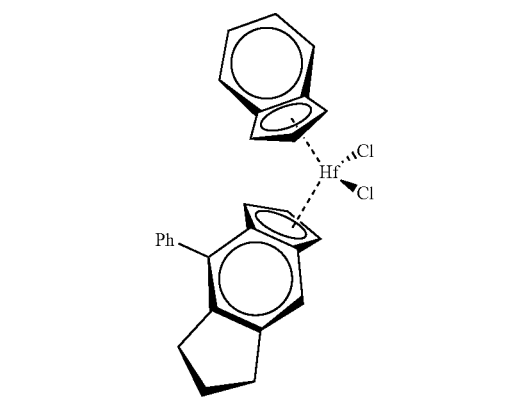
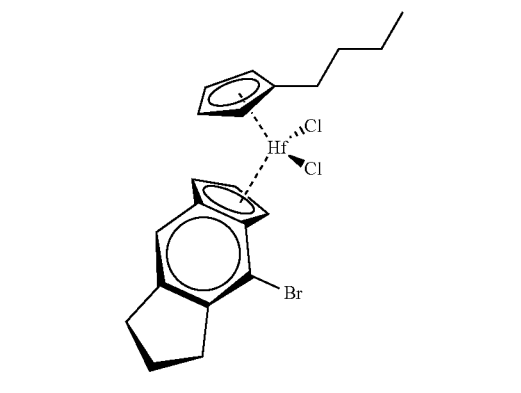
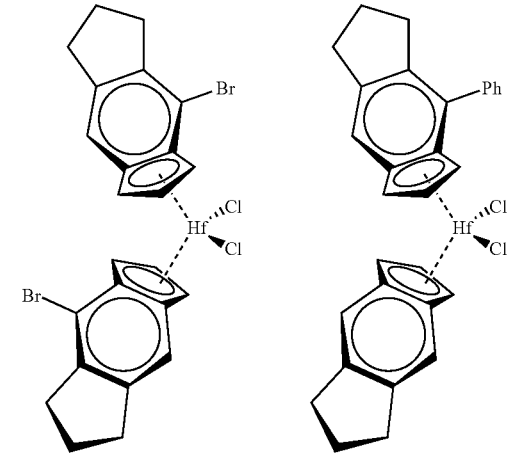
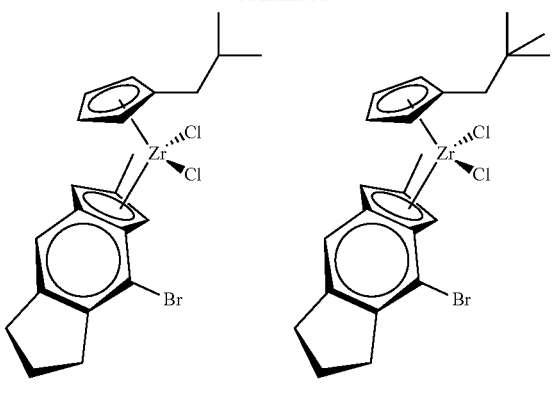
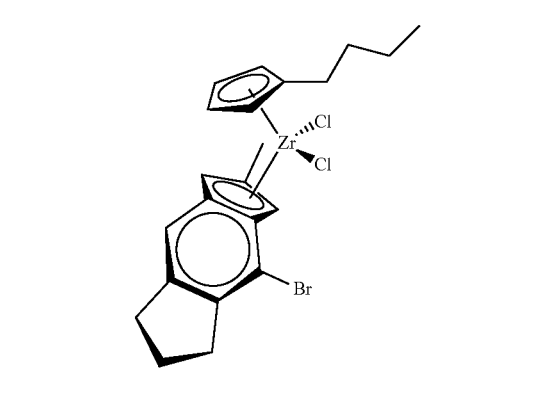
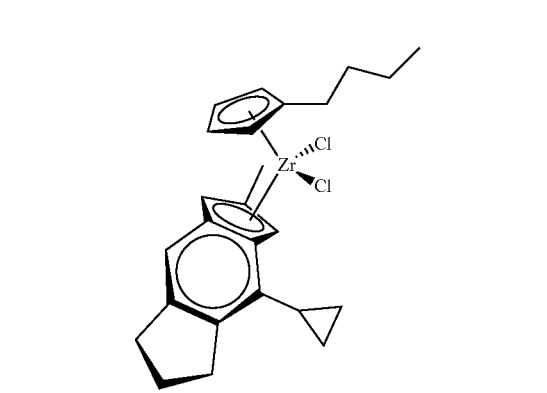
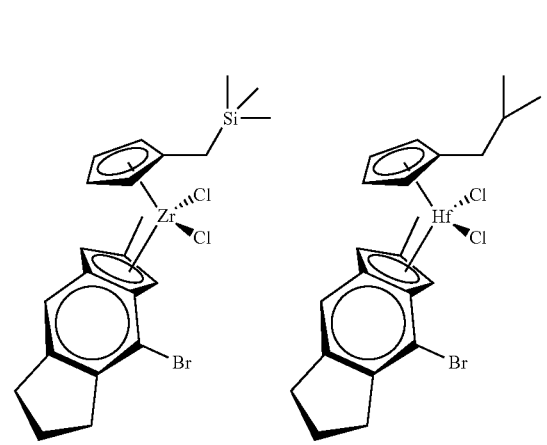

-continued

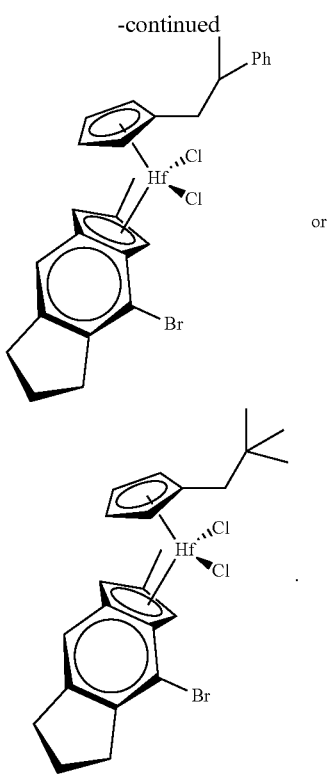

26. A catalyst represented by Formula (I):

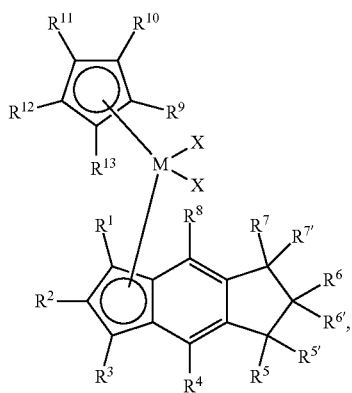

(I)

wherein:
M is a group 4 metal;
each of $R^1$, $R^2$, $R^3$, and $R^8$ is independently hydrogen, halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, or —R$^\#$—SiR'$_3$, where R$^\#$ is $C_1$-$C_{10}$ alkyl and each R' is hydrogen, halogen, $C_1$-$C_{10}$ alkyl, or $C_6$-$C_{10}$ aryl;

$R^4$ is selected from aryl, alkyl, bromo, chloro, fluoro or —R$^\#$—SiR'$_3$, where R$^\#$ is $C_1$-$C_{10}$ alkyl and R' is halogen, $C_1$-$C_{10}$ alkyl or $C_6$-$C_{10}$ aryl;

each of $R^5$, $R^{5'}$, $R^6$, $R^{6'}$, $R^7$ and $R^{7'}$ is independently hydrogen, halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, or —R$^\#$—SiR'$_3$, where R$^\#$ is $C_1$-$C_{10}$ alkyl and each R' is hydrogen, halogen, $C_1$-$C_{10}$ alkyl, or $C_6$-$C_{10}$ aryl;

each X is independently a leaving group, or two Xs are joined and bound to the metal atom to form a metallocycle ring, or two Xs are joined to form a chelating ligand, a diene, or an alkylidene; and $R^{12}$ is $C_1$-$C_{20}$ unsubstituted hydrocarbyl or —R$^\#$—SiR'$_3$, where R$^\#$ is $C_1$-$C_{10}$ alkyl and R' is halogen, $C_1$-$C_{10}$ alkyl or $C_6$-$C_{10}$ aryl;

each of $R^9$, $R^{10}$, $R^{11}$, and $R^{13}$ is hydrogen, halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, or —R$^\#$—SiR'$_3$, where R$^\#$ is $C_1$-$C_{10}$ alkyl and where each R' is hydrogen, halogen, $C_1$-$C_{10}$ alkyl, or $C_6$-$C_{10}$ aryl, or $R^9$ and $R^{10}$ or $R^{12}$ and $R^{13}$ together form a substituted or unsubstituted 5-8 membered saturated or unsaturated cyclic or multicyclic ring structure, wherein the catalyst is asymmetric.

27. The catalyst of claim 1, wherein each of $R^9$, $R^{10}$, $R^{11}$, $R^{12}$ and $R^{13}$ is hydrogen, halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, or —R$^\#$—SiR'$_3$, where R$^\#$ is $C_1$-$C_{10}$ alkyl and where each R' is hydrogen, halogen, $C_1$-$C_{10}$ alkyl, or $C_6$-$C_{10}$ aryl.

28. The catalyst of claim 1, wherein $R^4$ is selected from bromo, chloro, fluoro or —R$^\#$—SiR'$_3$, where R$^\#$ is $C_1$-$C_{10}$ alkyl and R' is halogen, $C_1$-$C_{10}$ alkyl or $C_6$-$C_{10}$ aryl.

29. The catalyst of claim 1, wherein $R^8$ is hydrogen.

30. The catalyst of claim 1, wherein $R^2$ is halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, or —R$^\#$—SiR'$_3$, where R$^\#$ is $C_1$-$C_{10}$ alkyl and each R' is hydrogen, halogen, $C_1$-$C_{10}$ alkyl, or $C_6$-$C_{10}$ aryl.

* * * * *